Sept. 8, 1925.
W. B. HARSEL
TIRE BUILDING MACHINE
Filed June 24, 1920
1,552,987
30 Sheets-Sheet 16
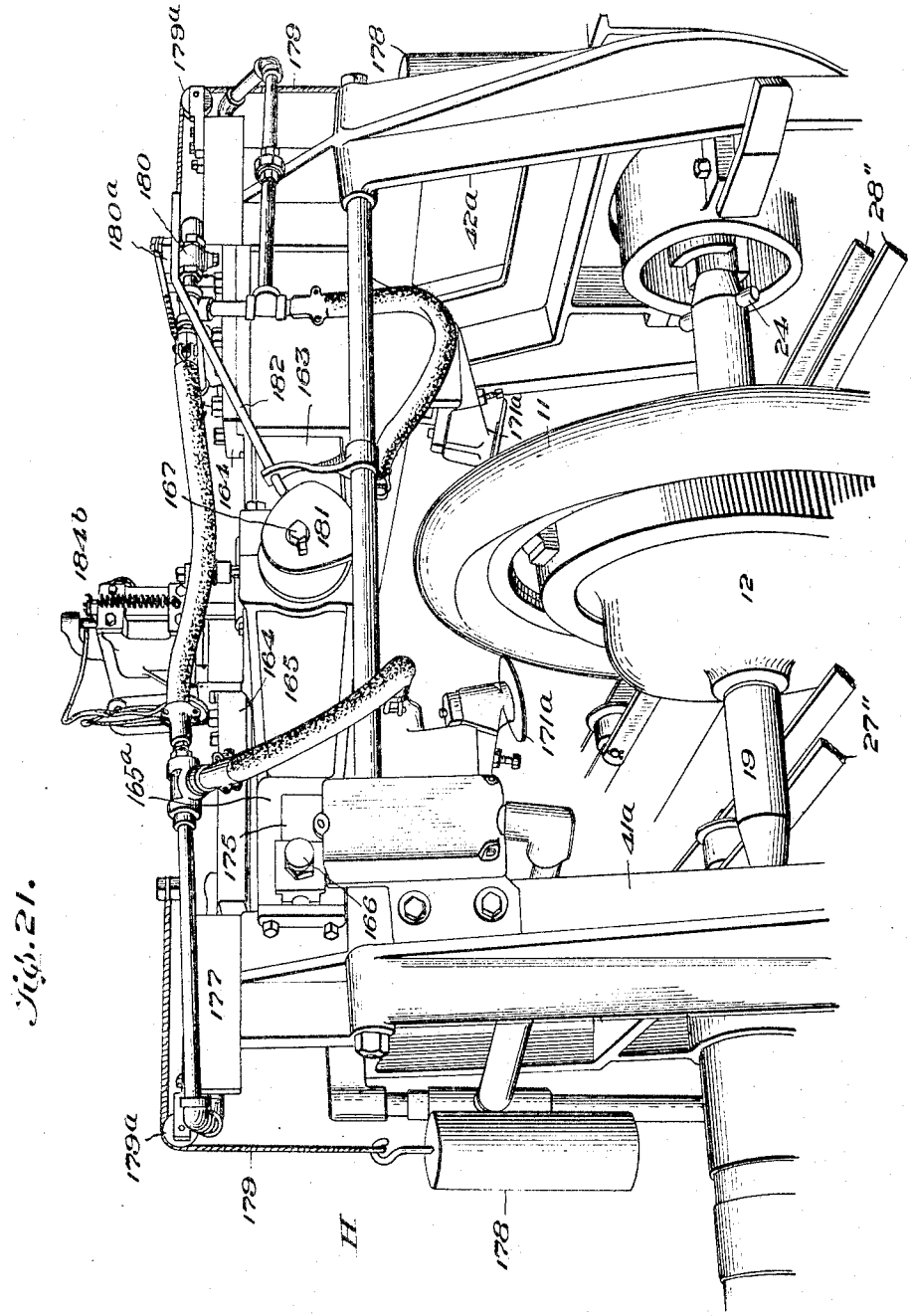
Inventor
WILLIAM B. HARSEL
By R. S. Trogner.
his Attorney.

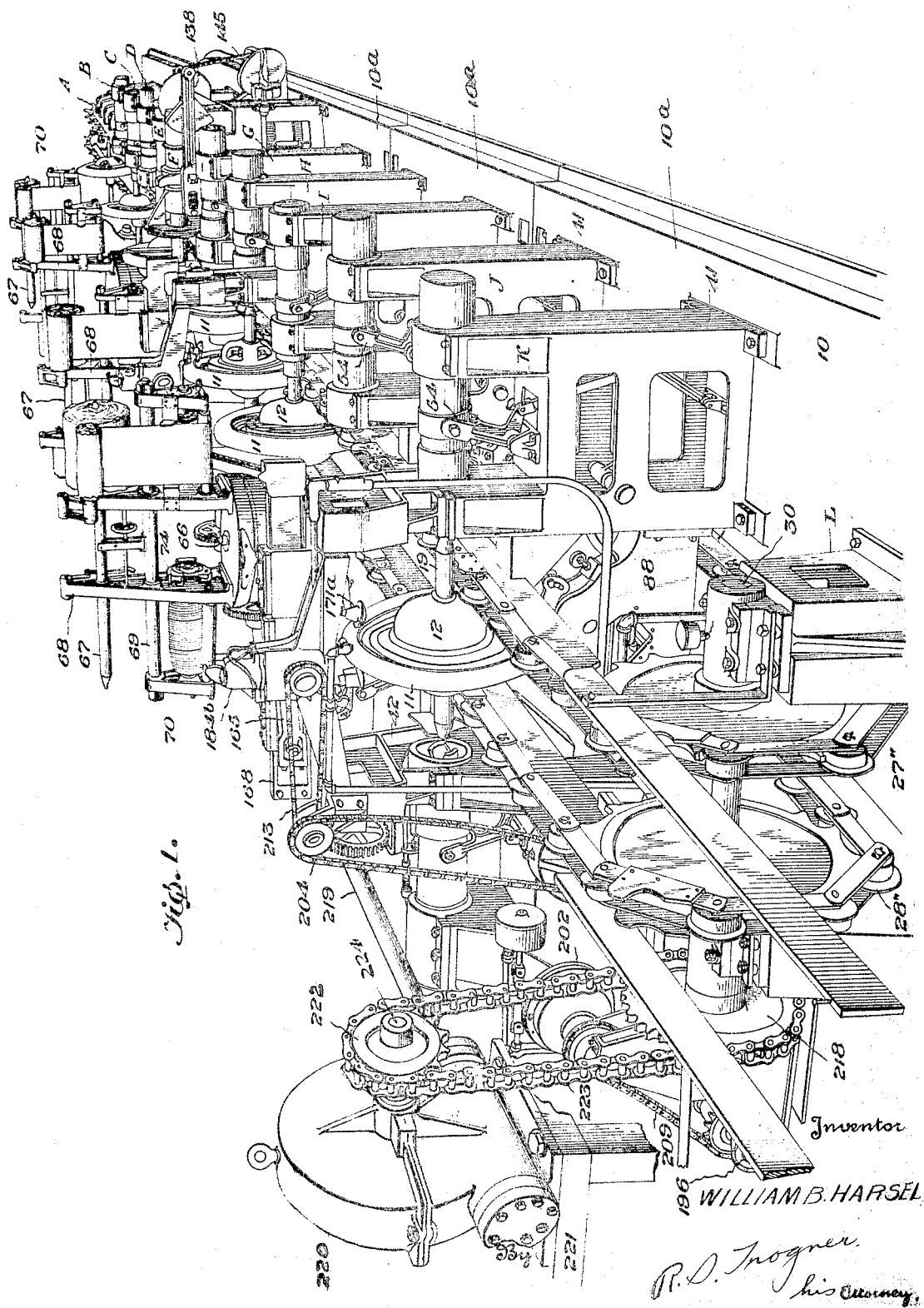

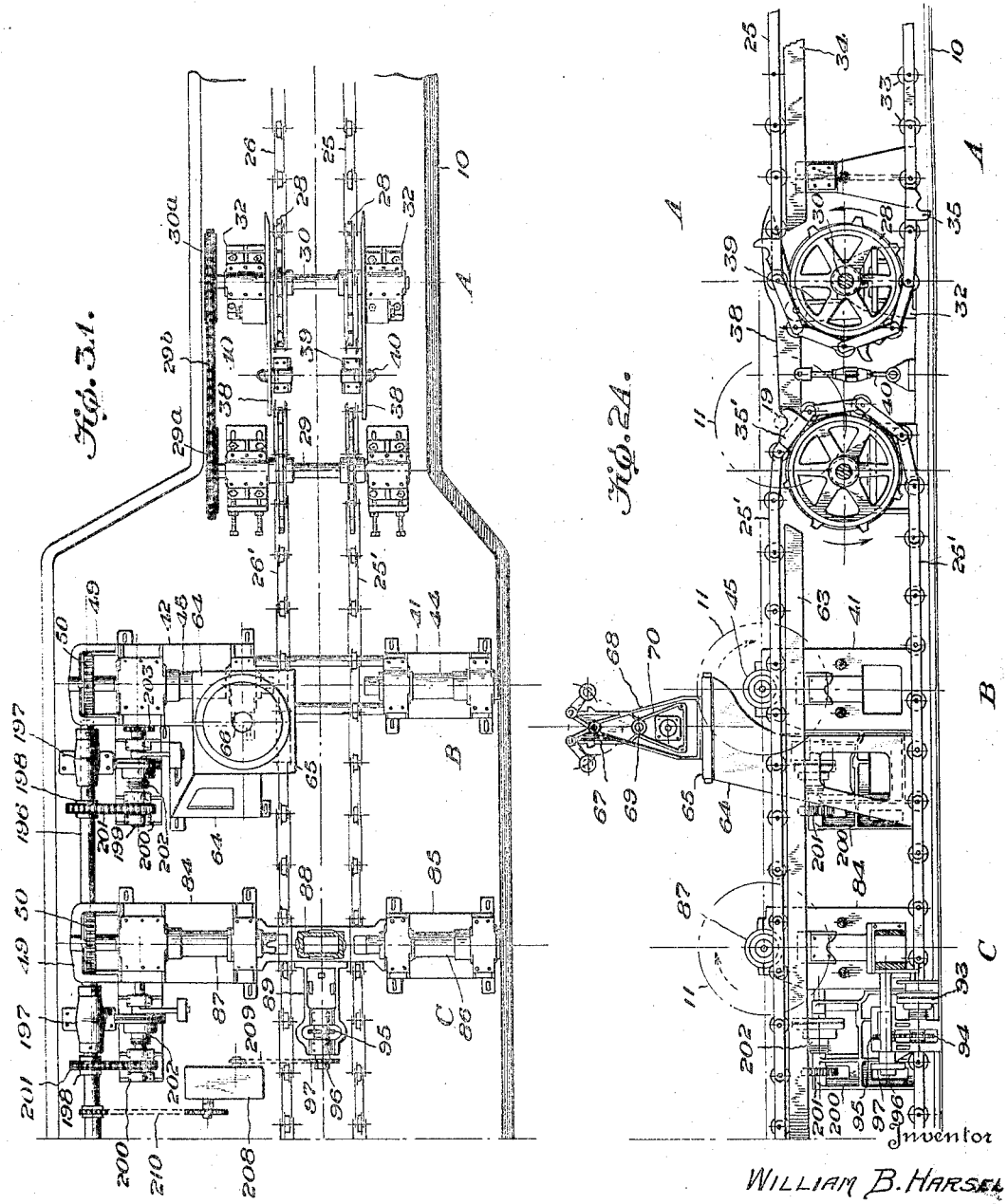

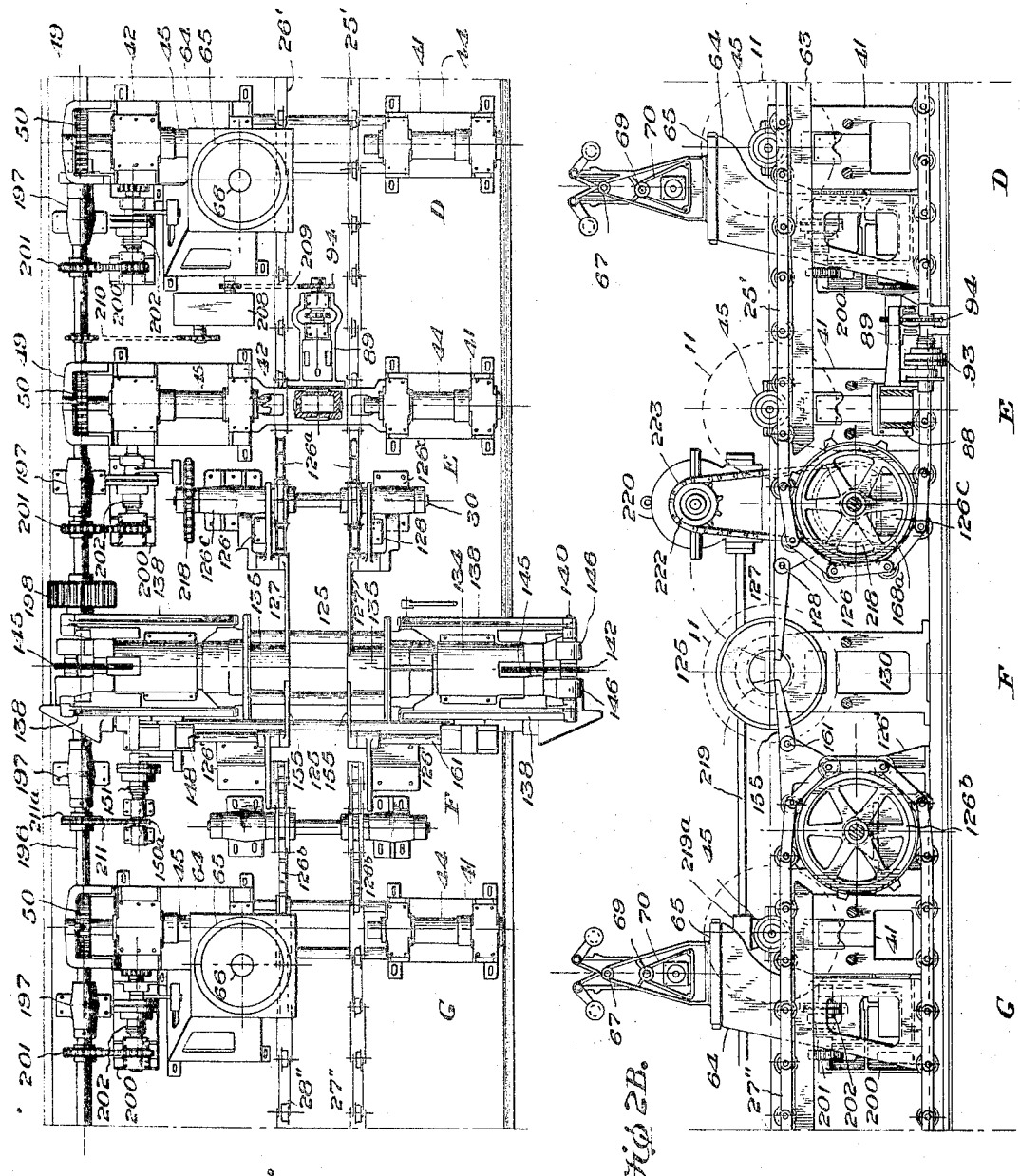

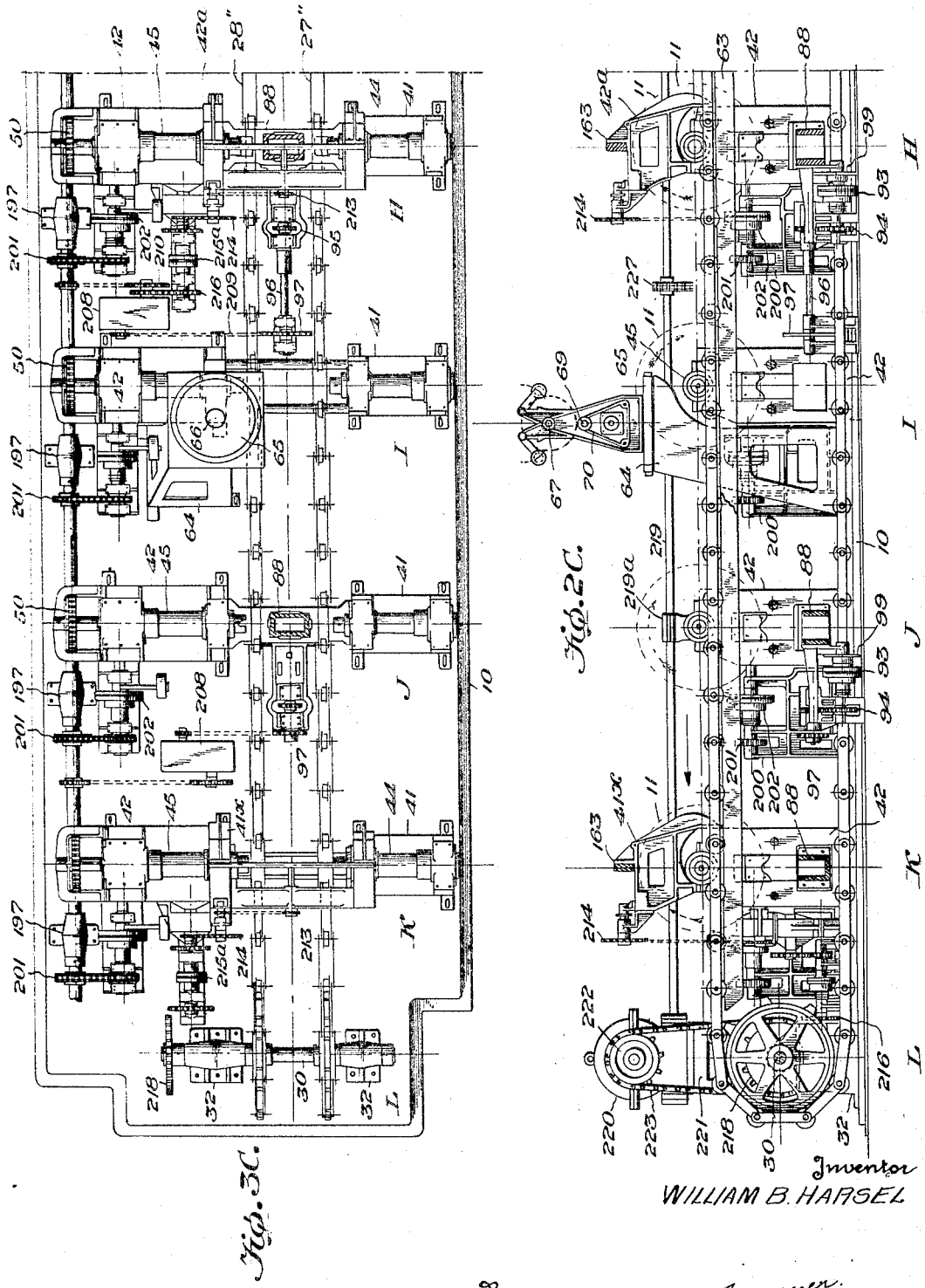

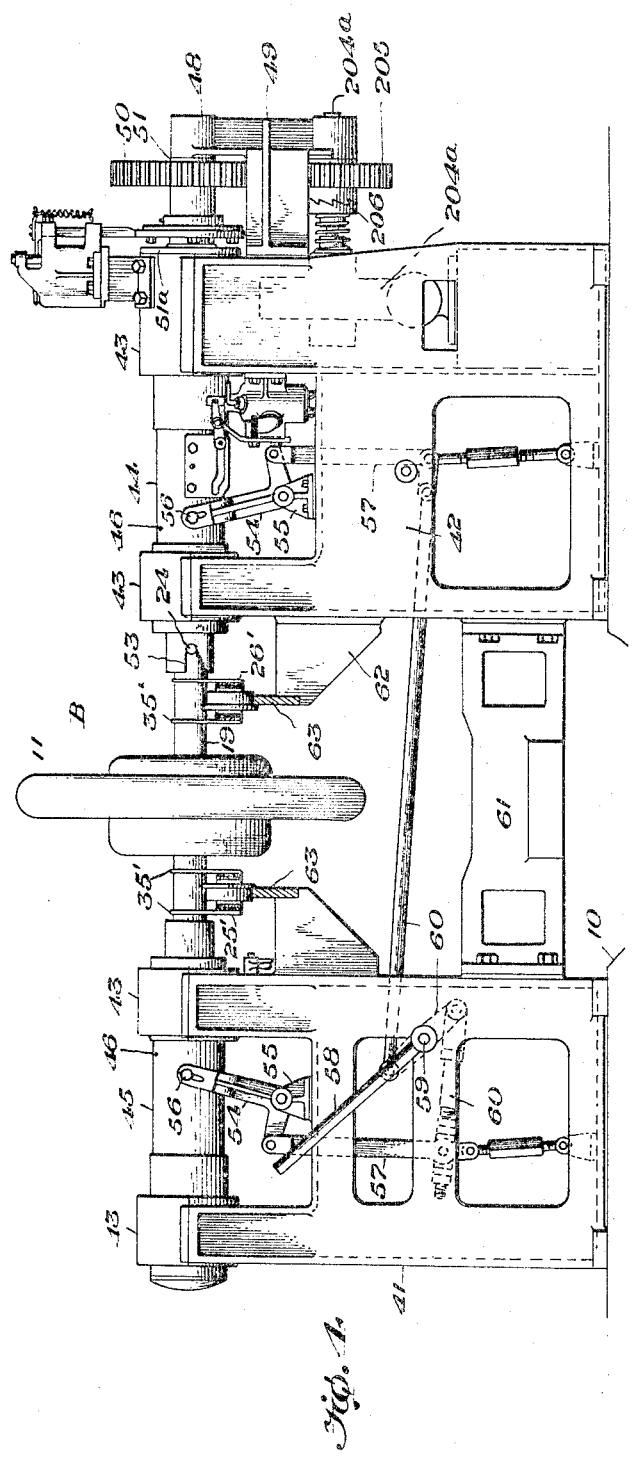

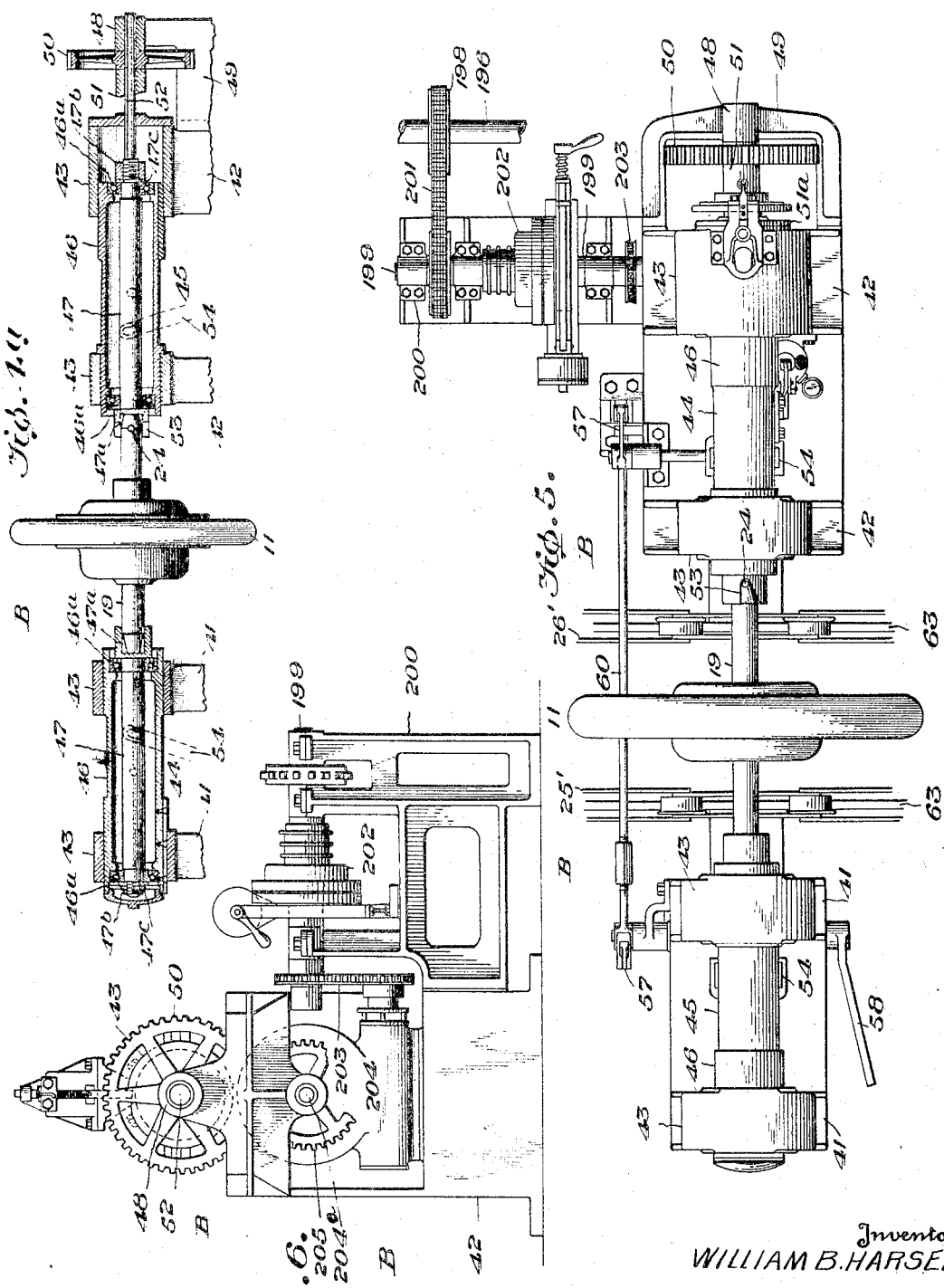

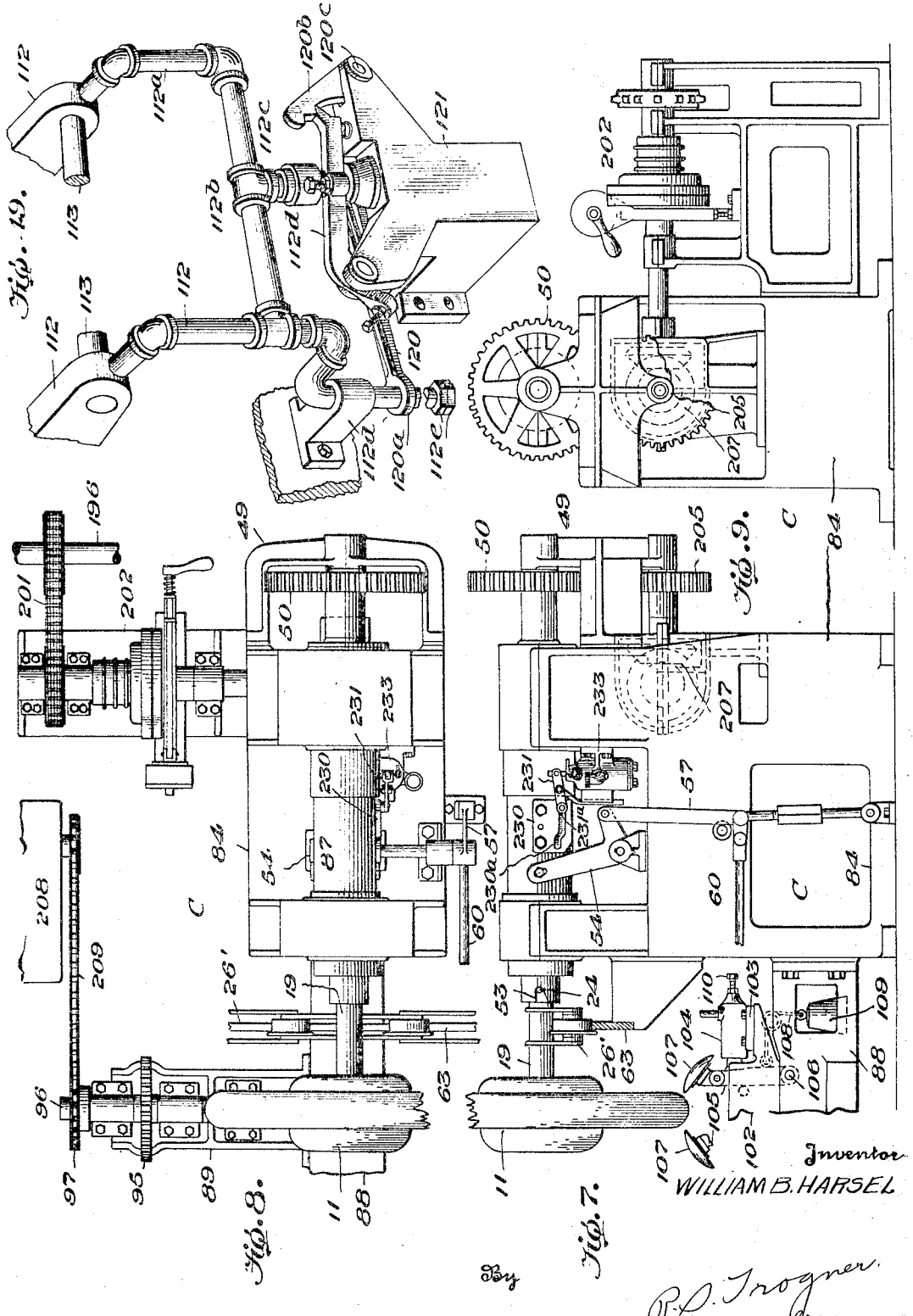

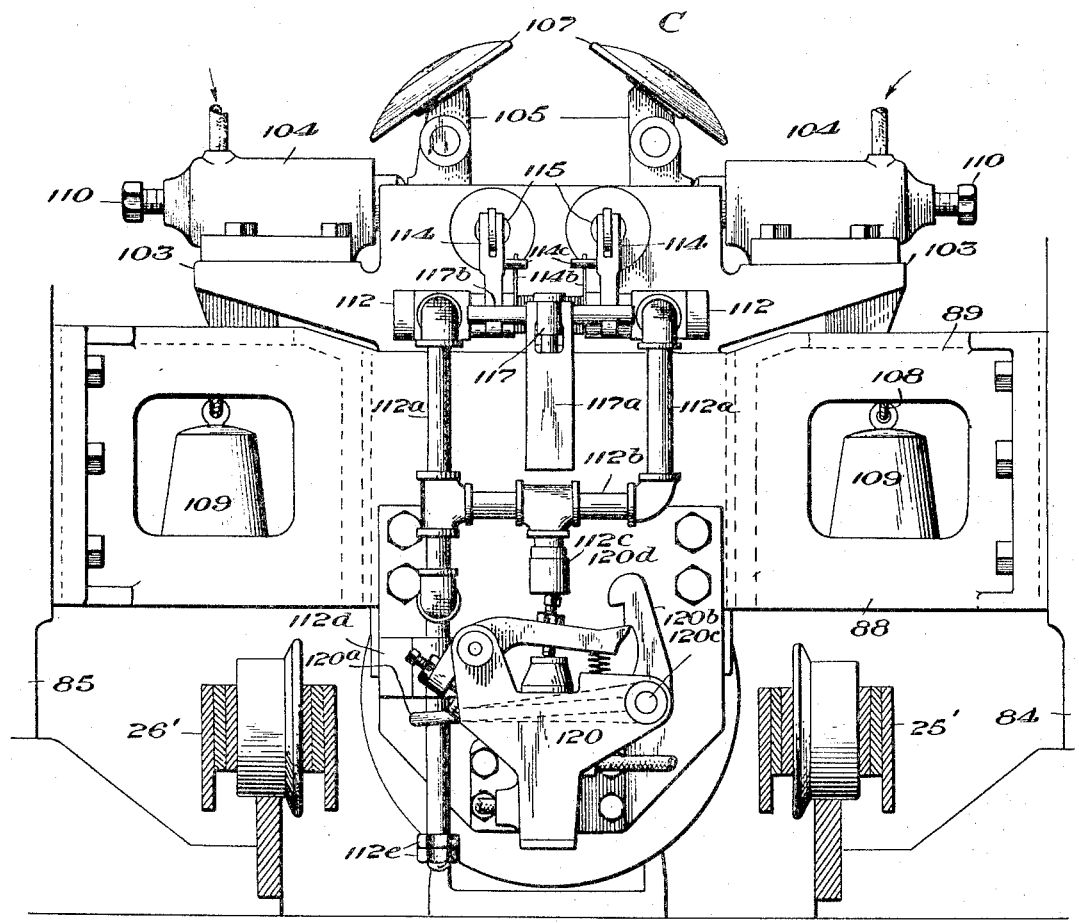

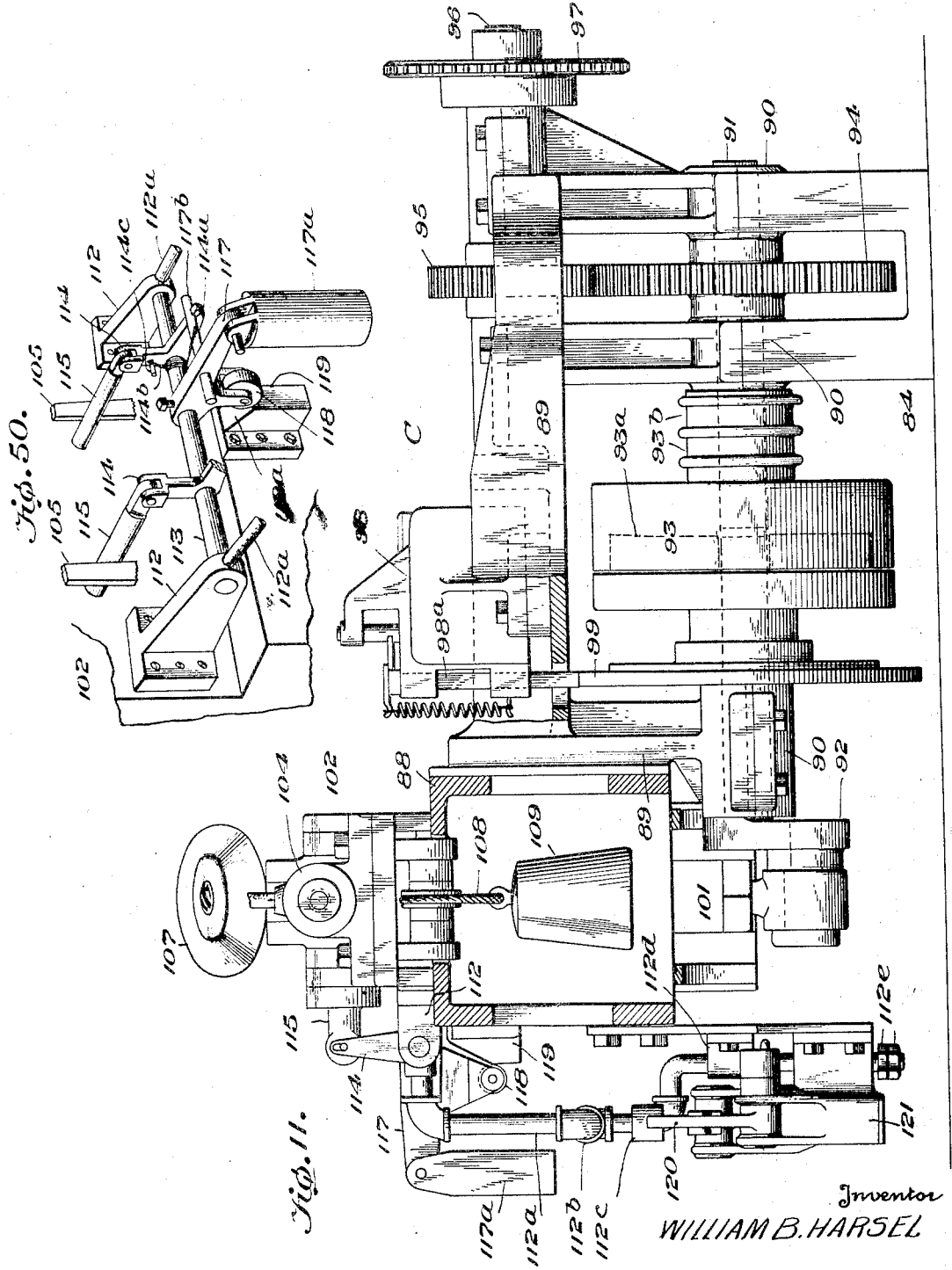

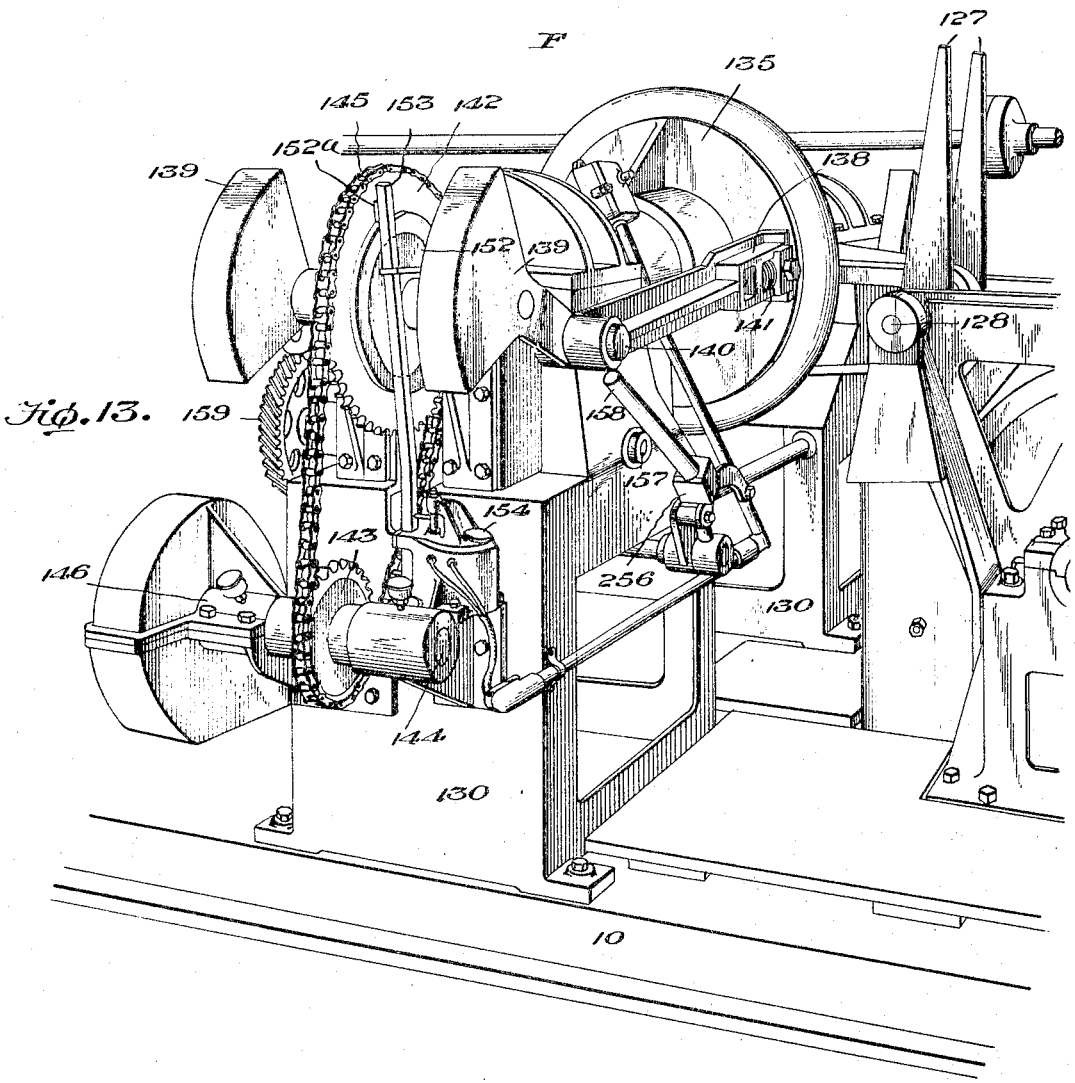

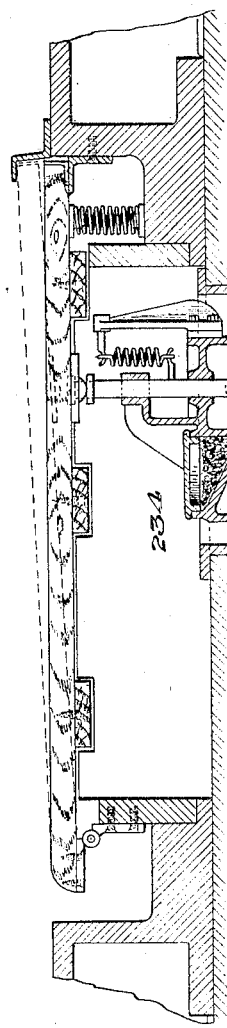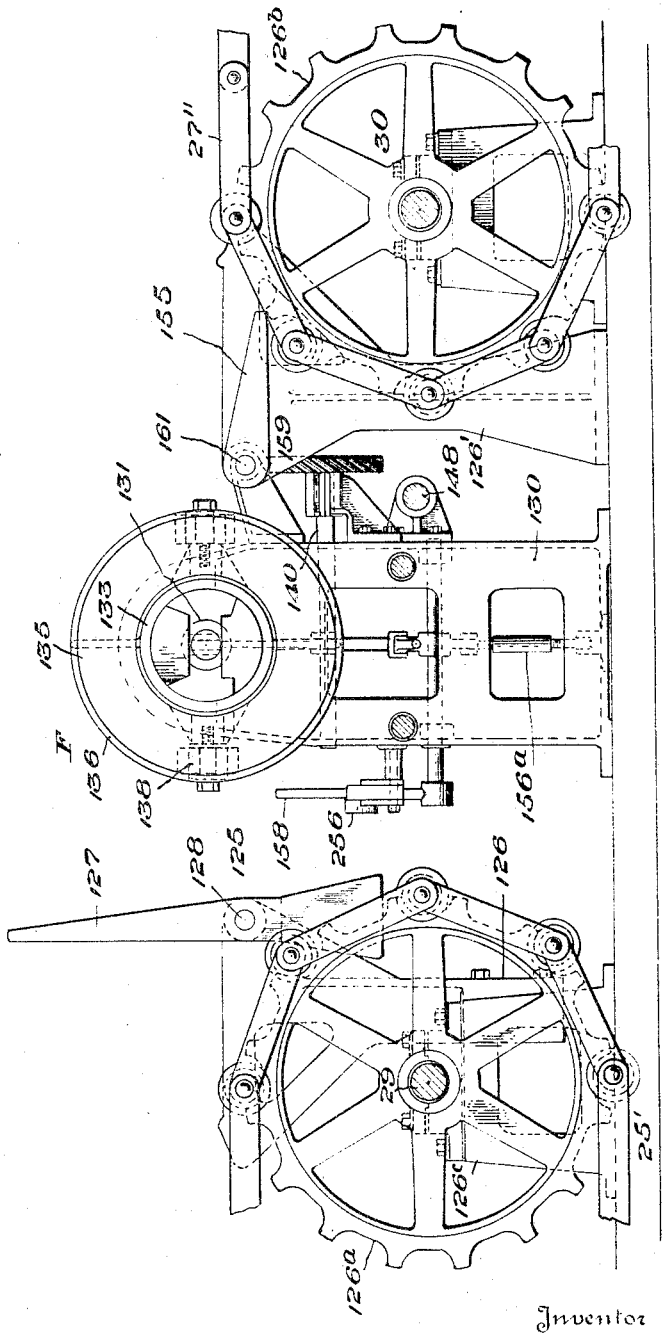

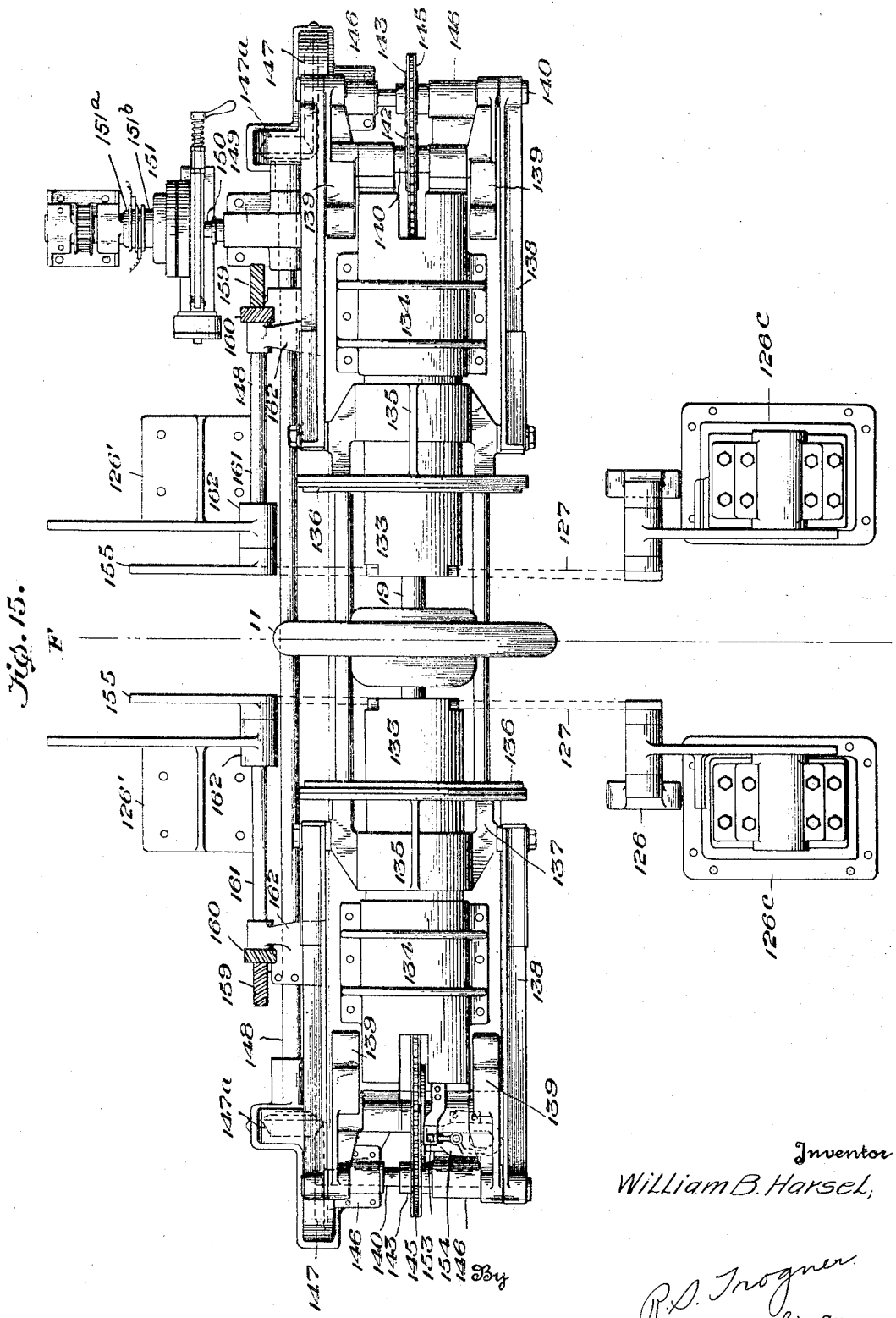

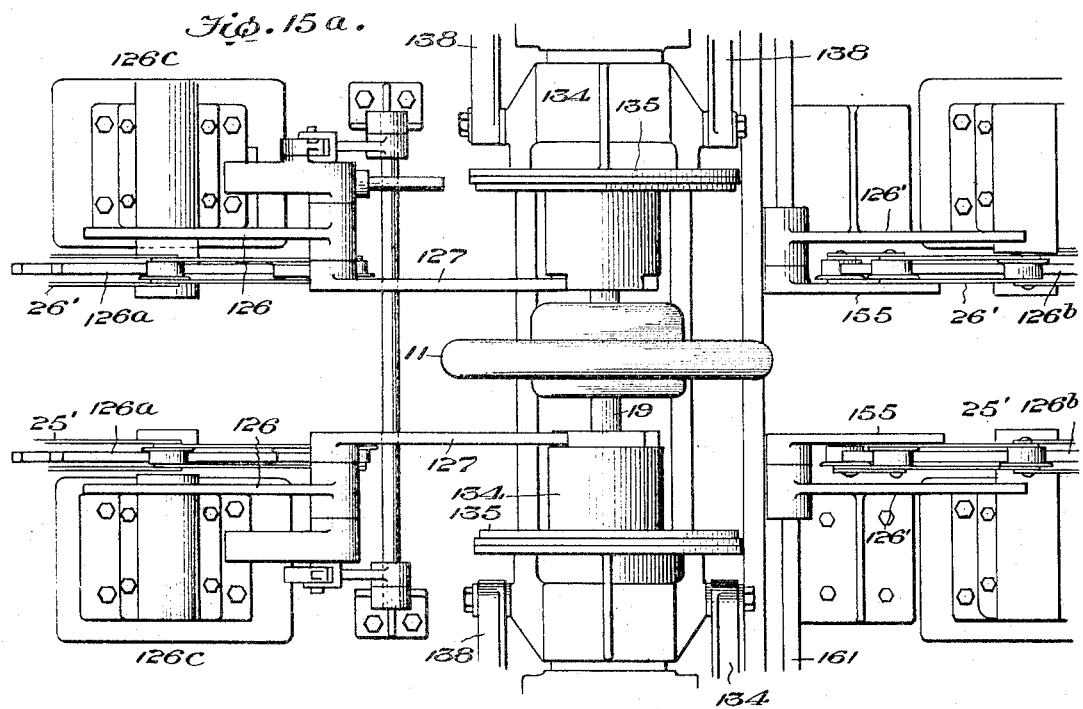
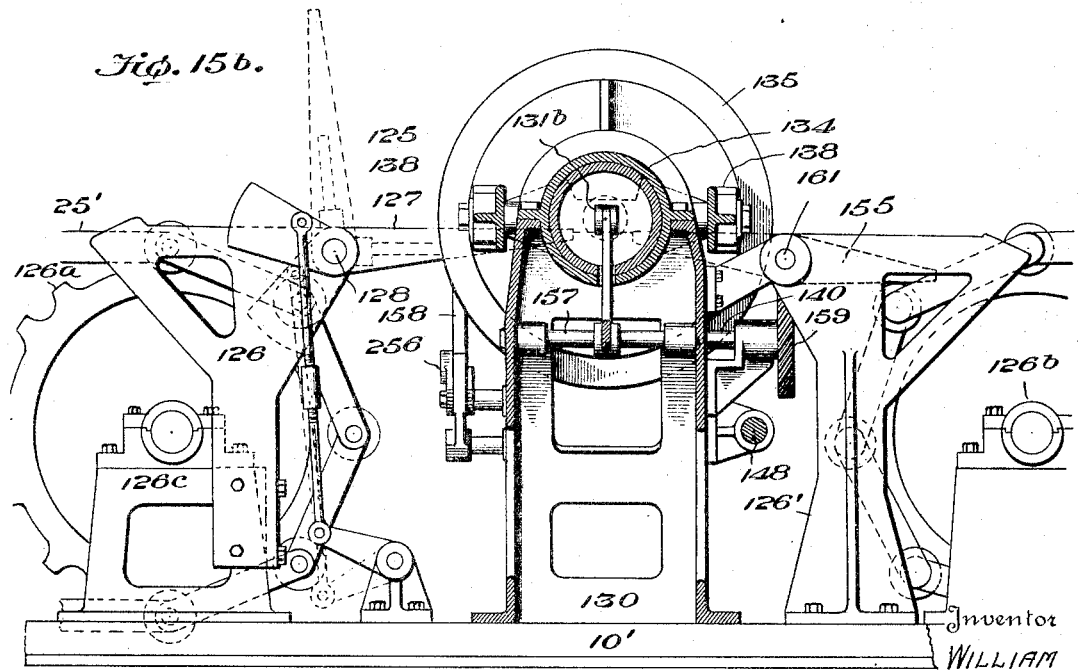

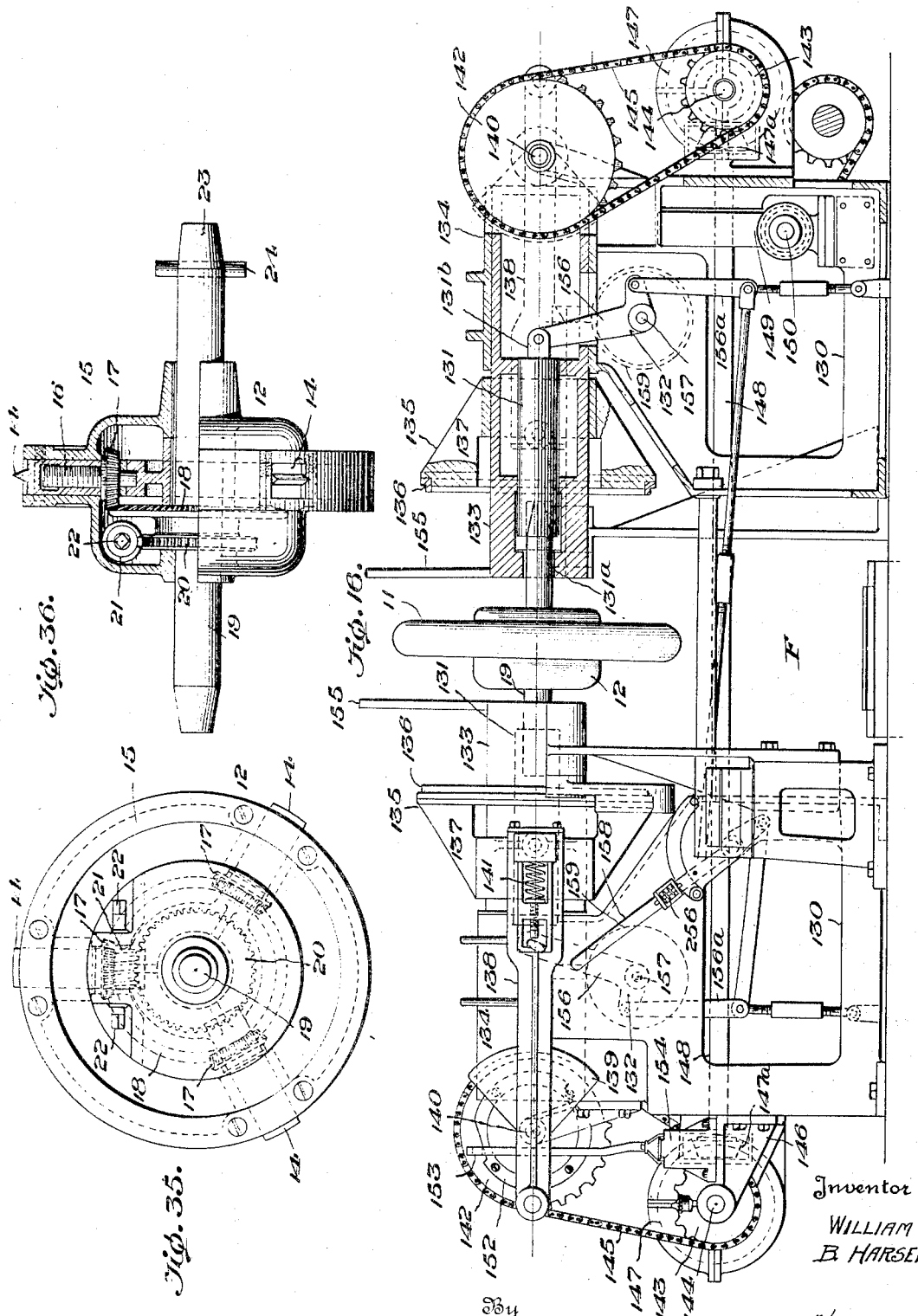

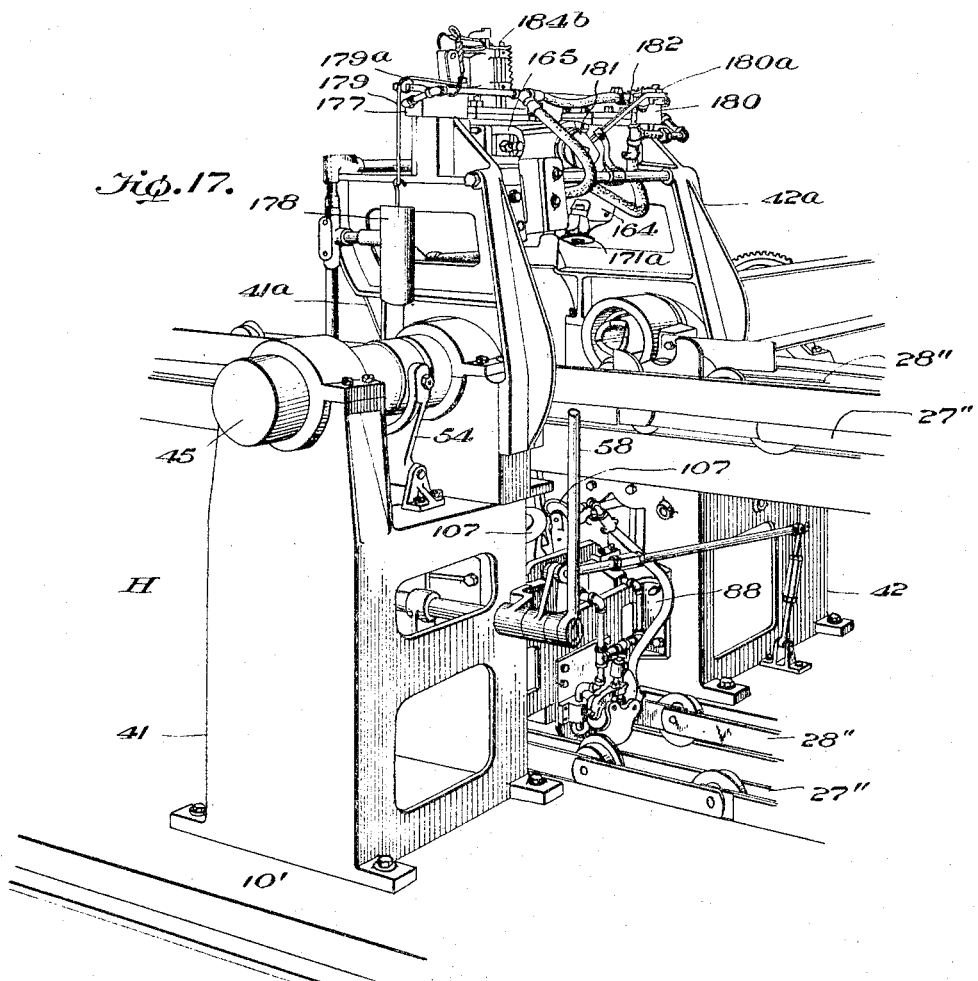
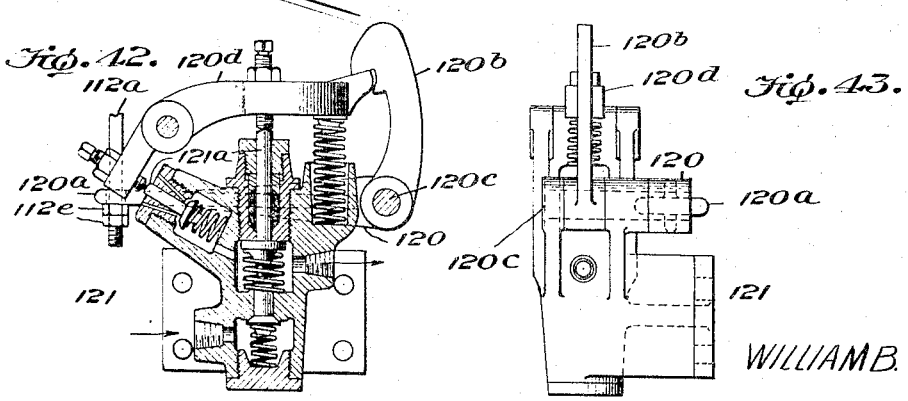

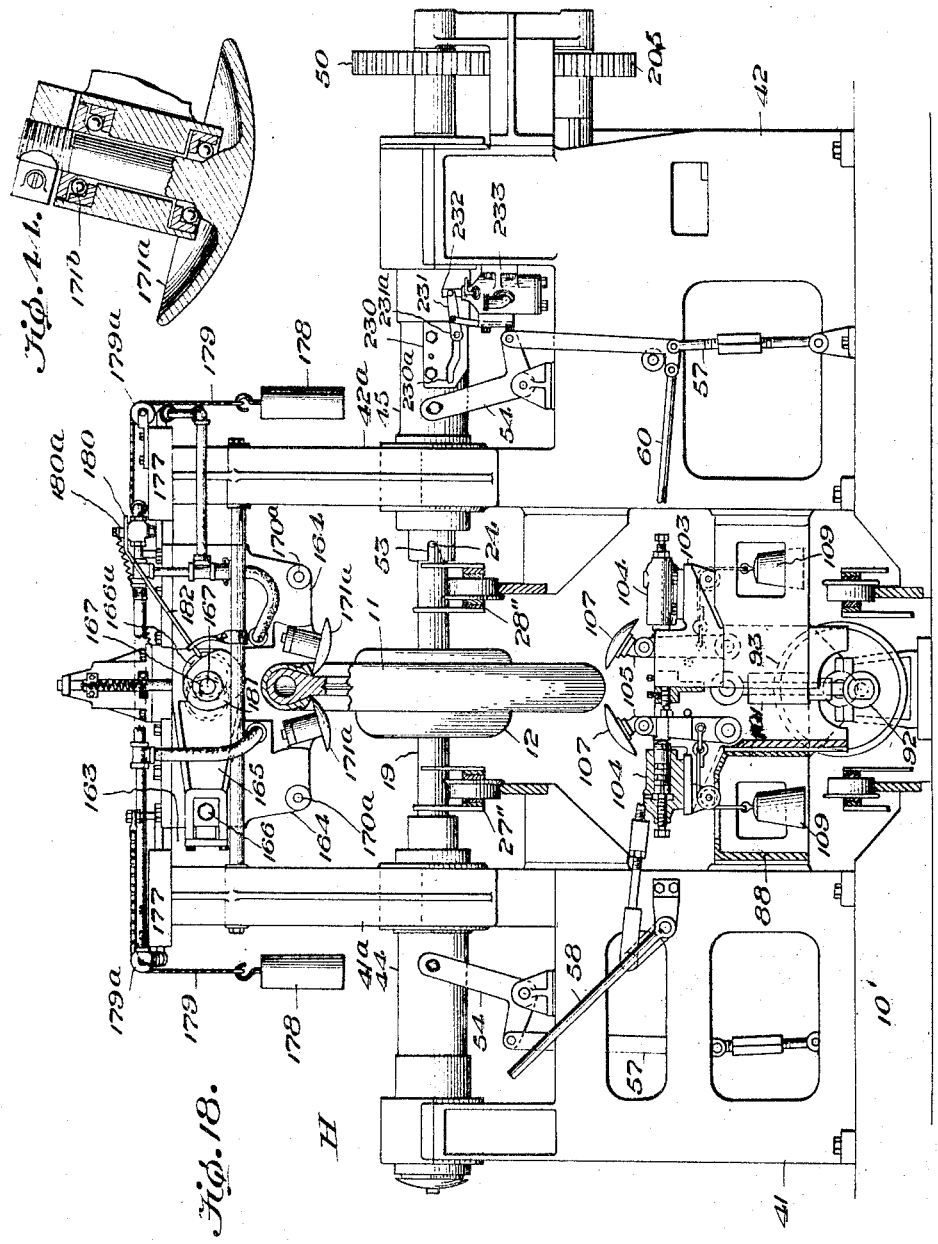

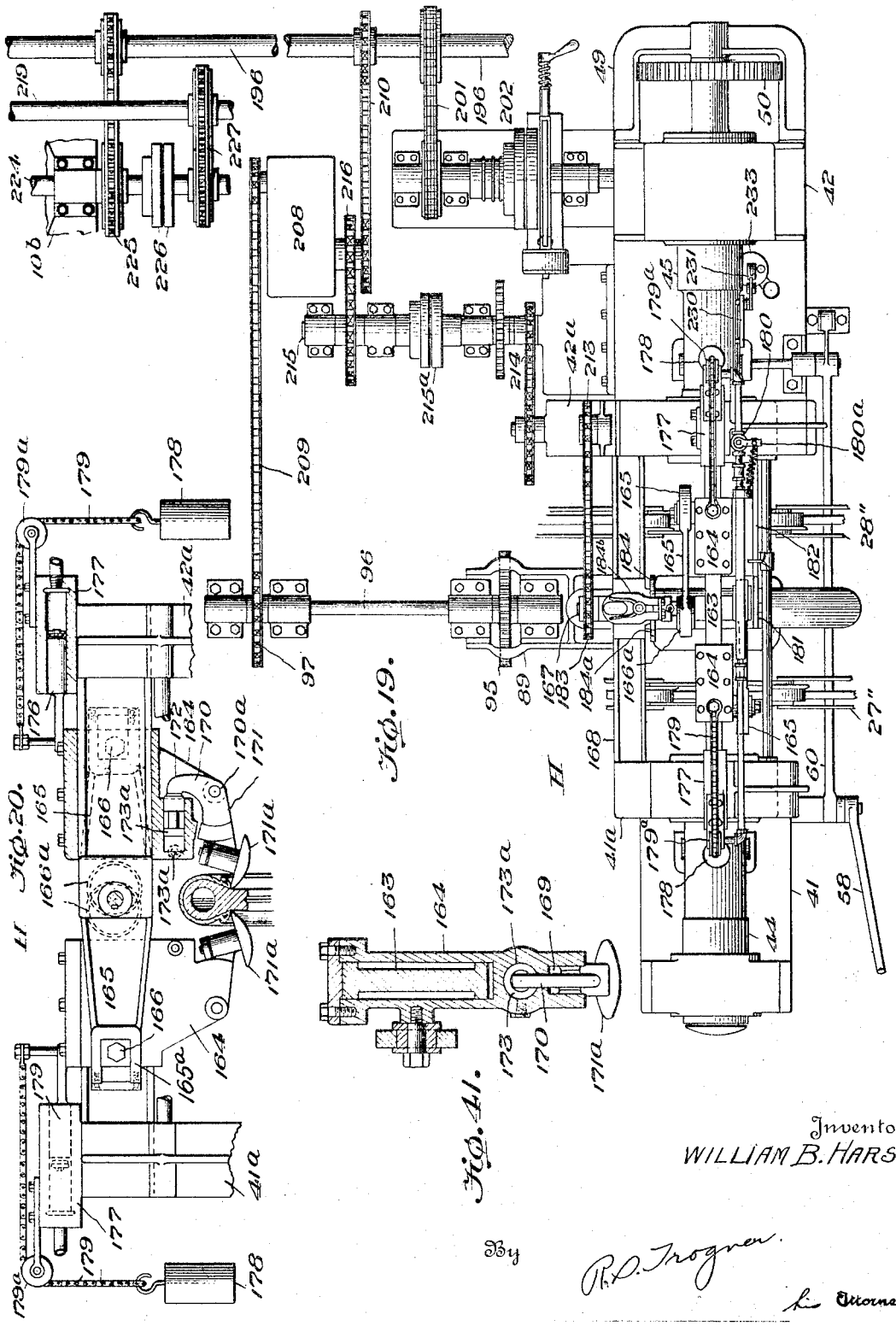

Sept. 8, 1925. 1,552,987
W. B. HARSEL
TIRE BUILDING MACHINE
Filed June 24, 1920 30 Sheets-Sheet 19
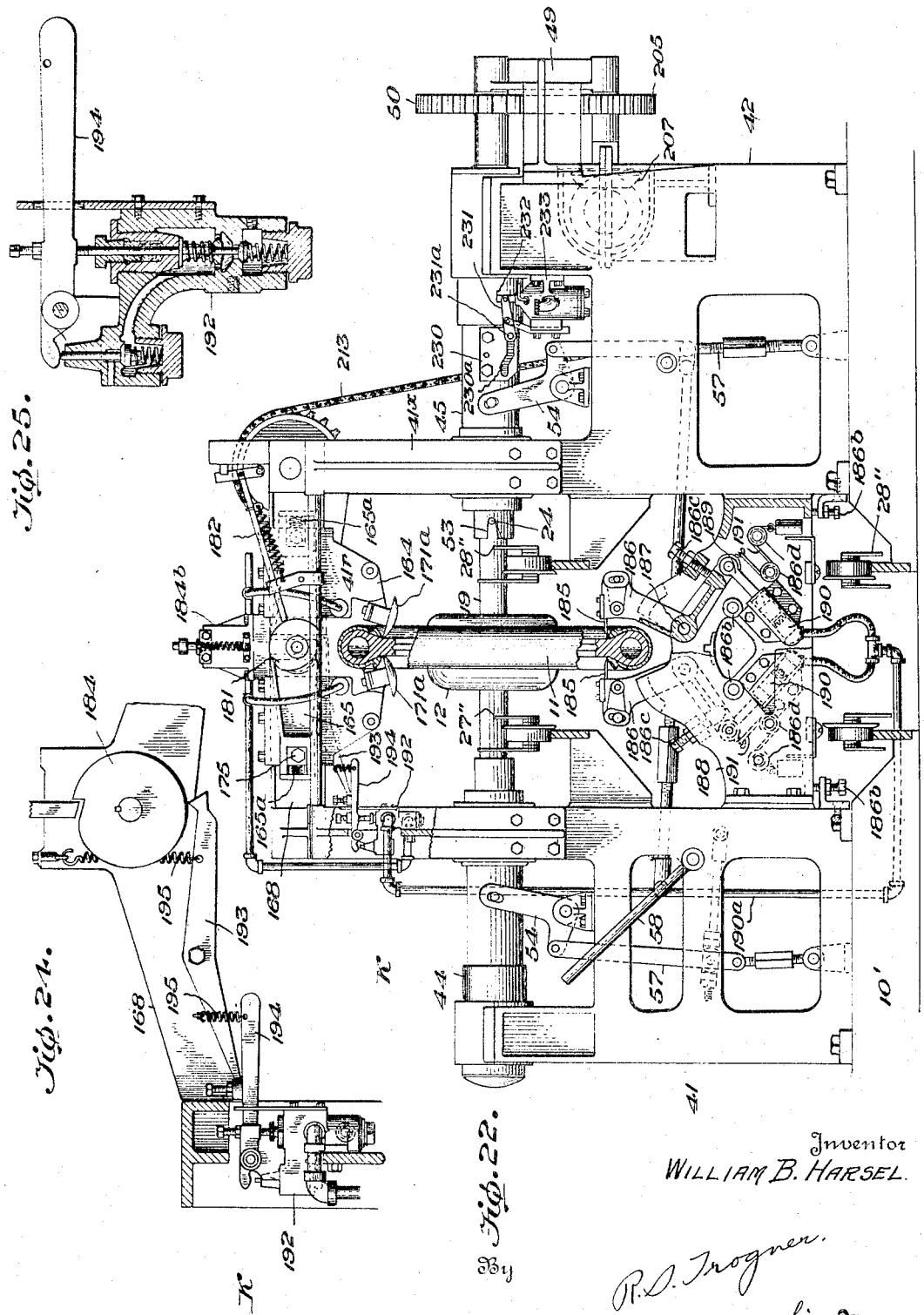
Inventor
WILLIAM B. HARSEL.
By
R. D. Trogner.
his Attorney

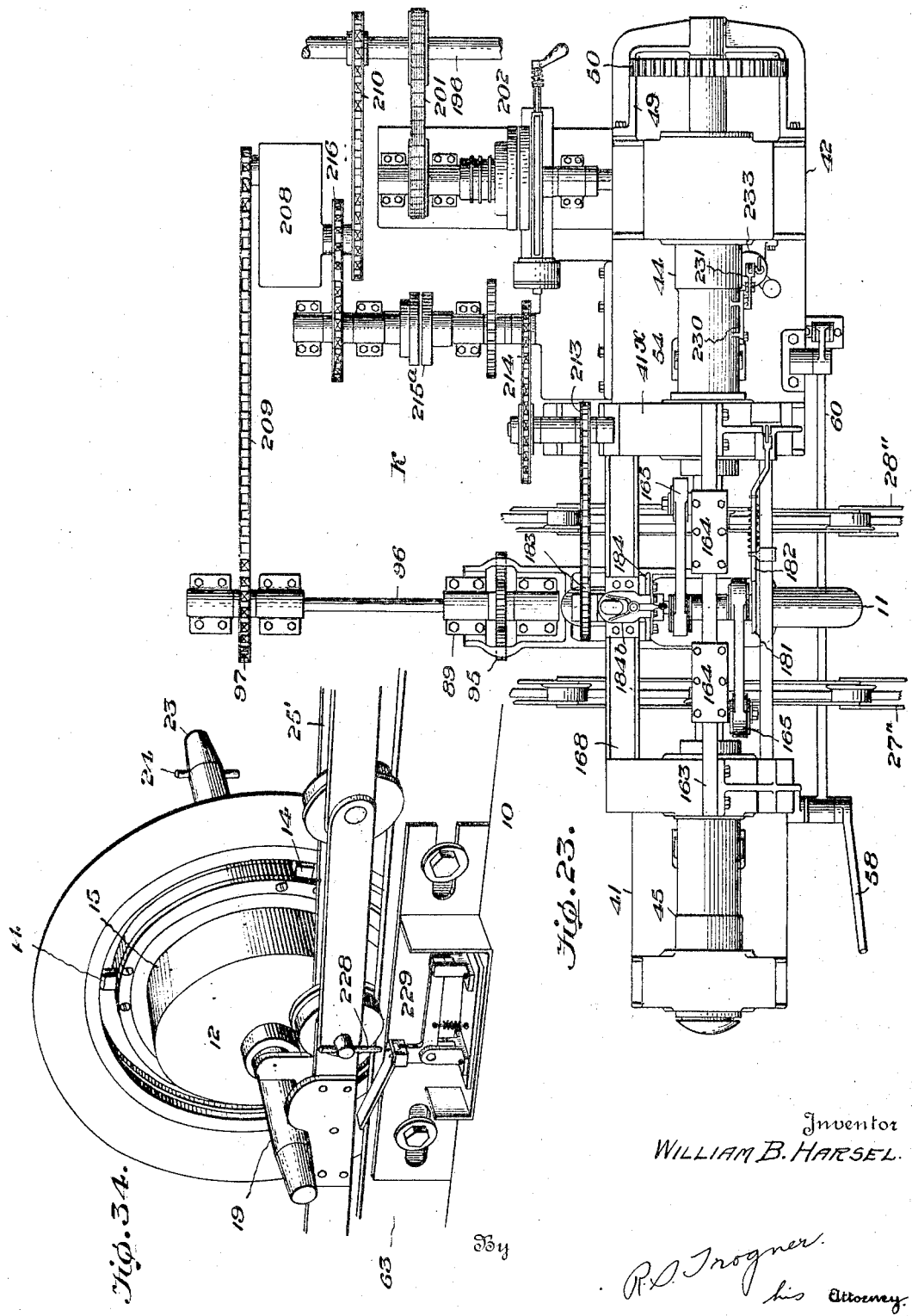

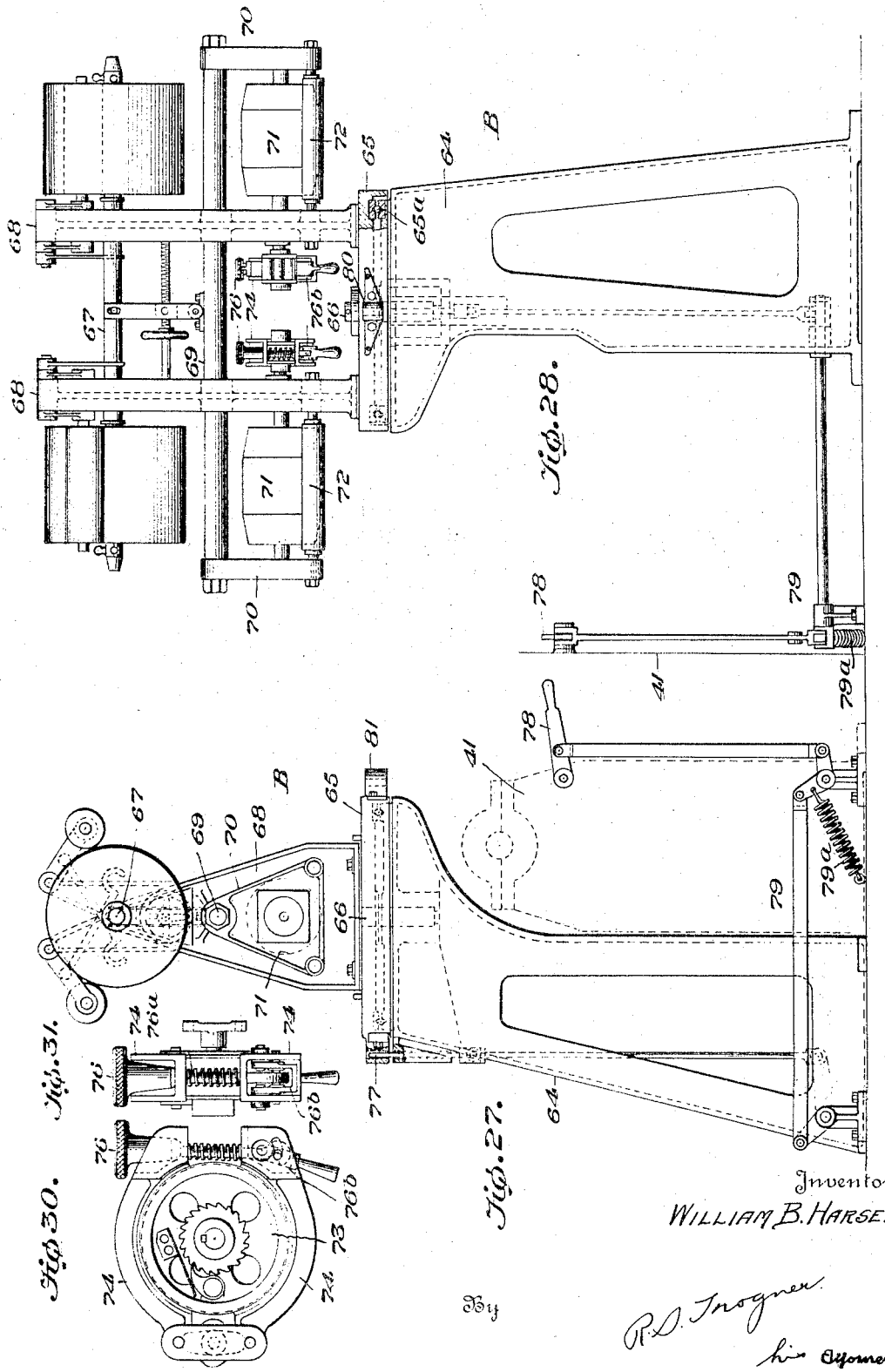

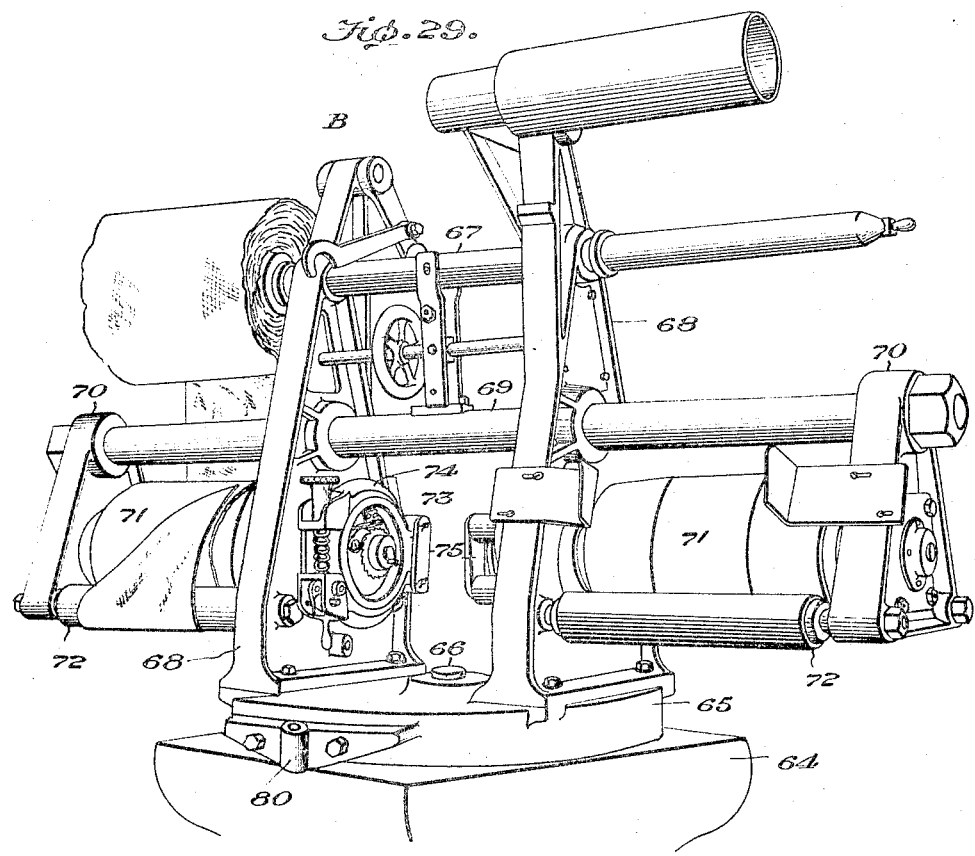
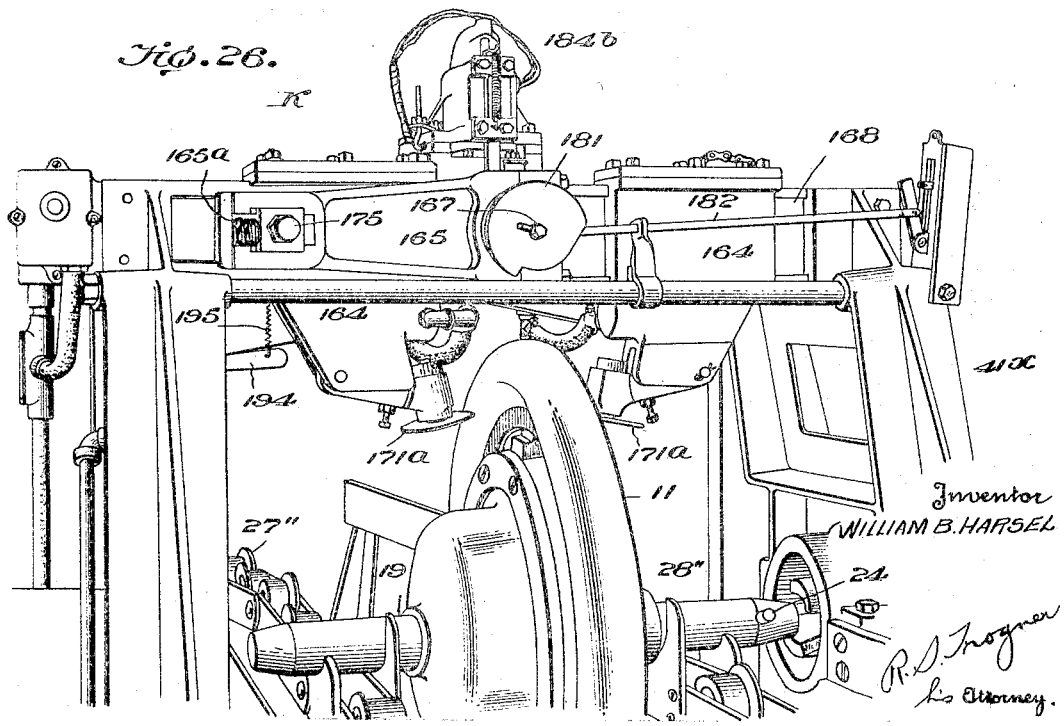

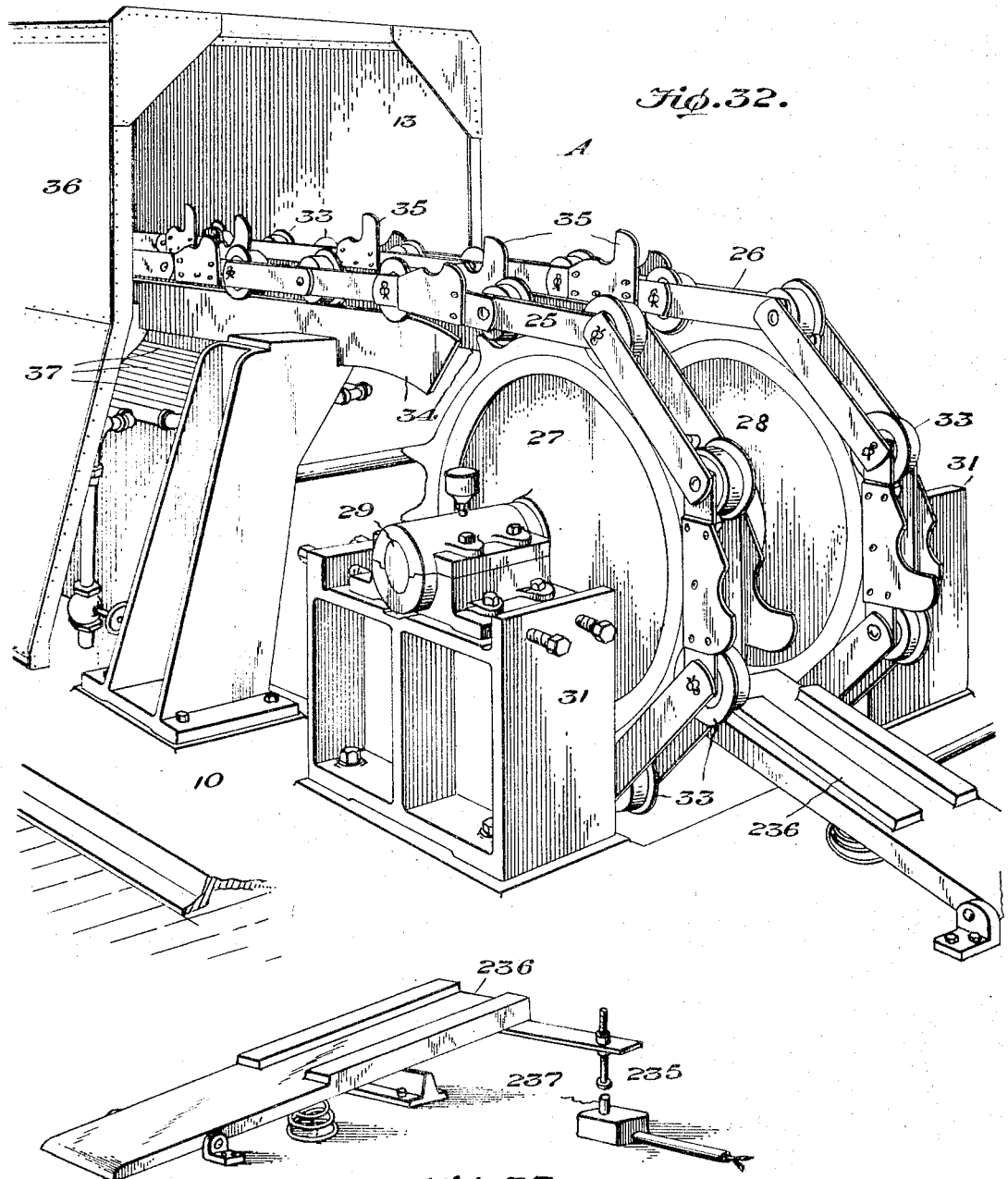

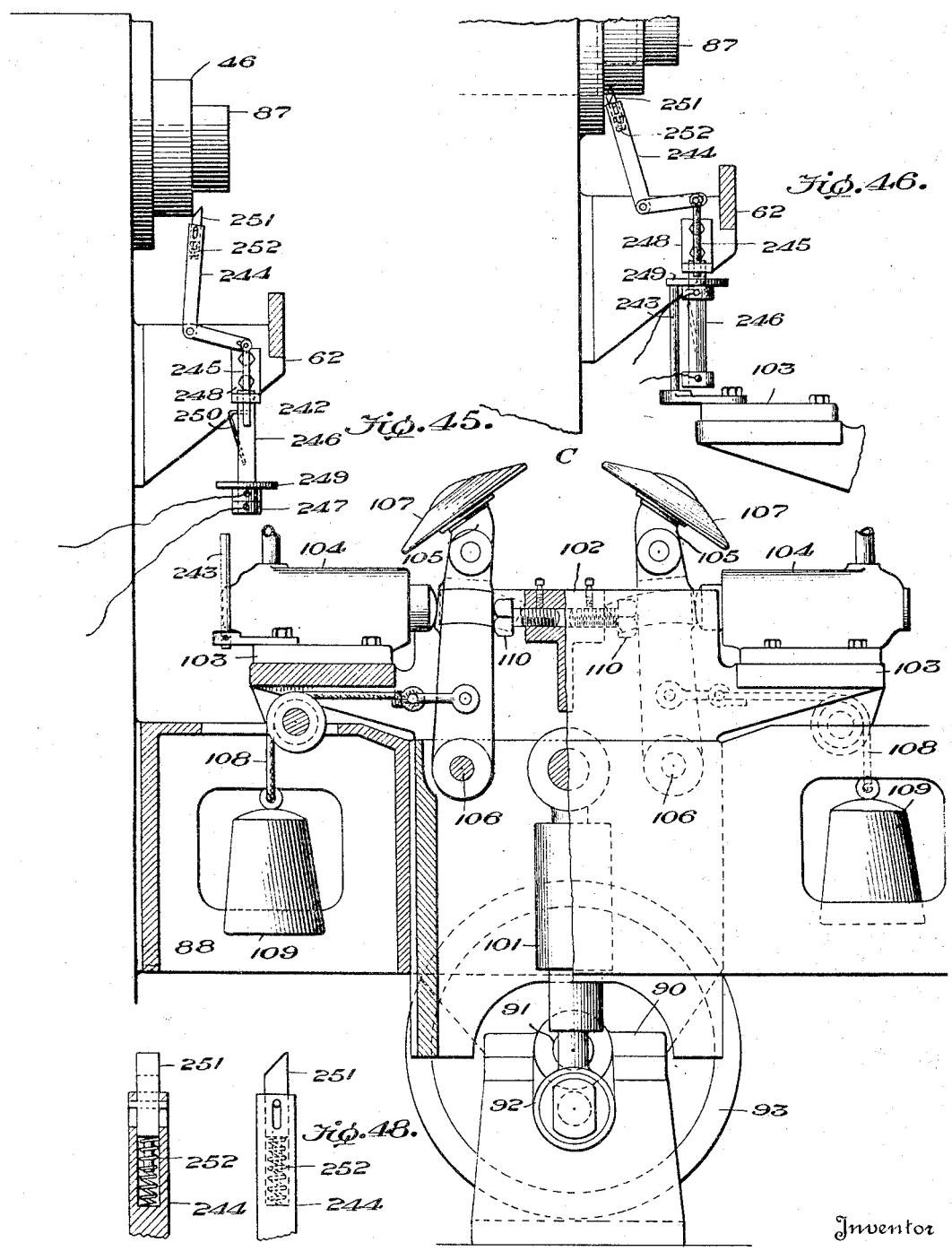

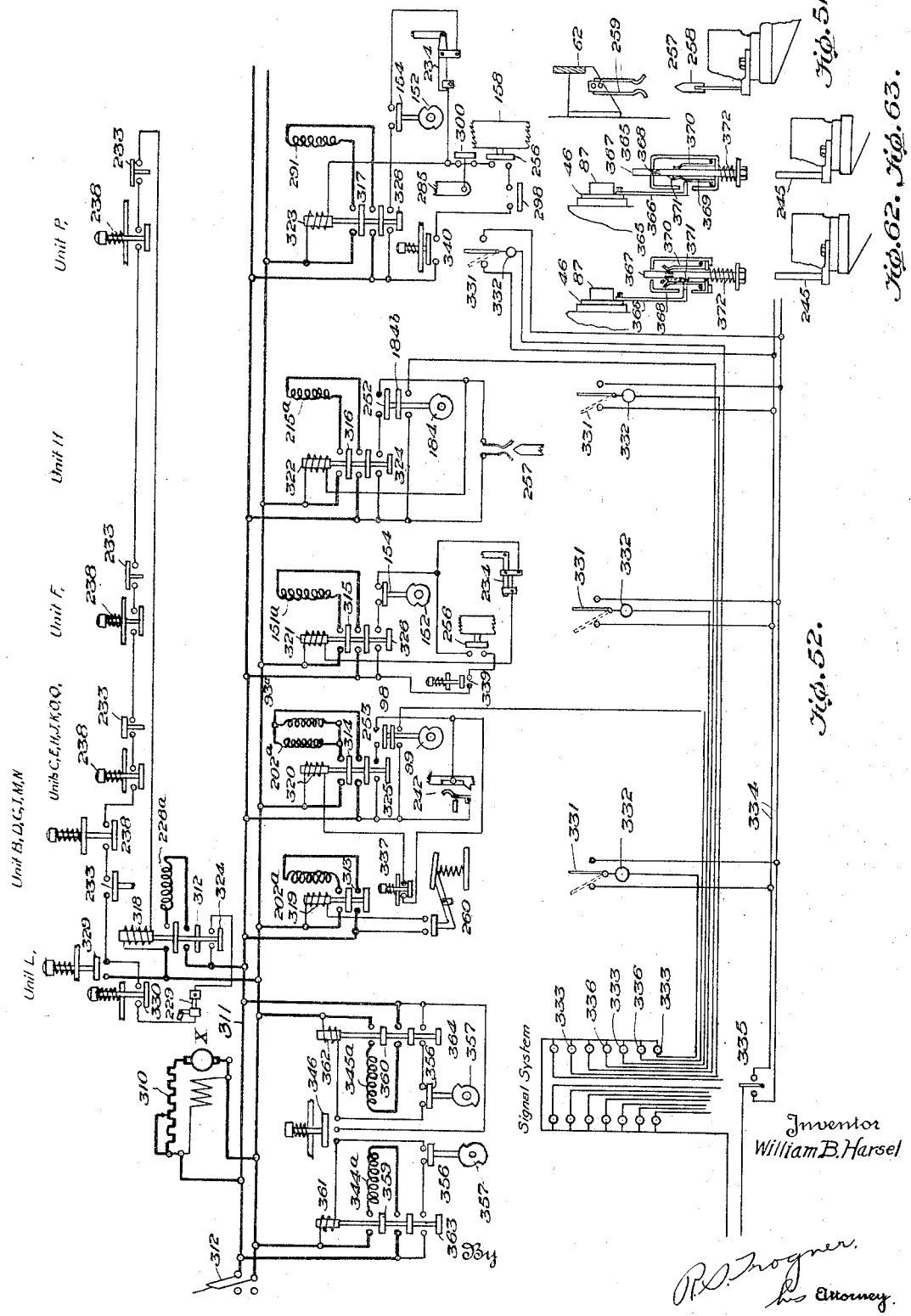

Sept. 8, 1925.  
W. B. HARSEL  
TIRE BUILDING MACHINE  
Filed June 24, 1920  
1,552,987  
30 Sheets-Sheet 26
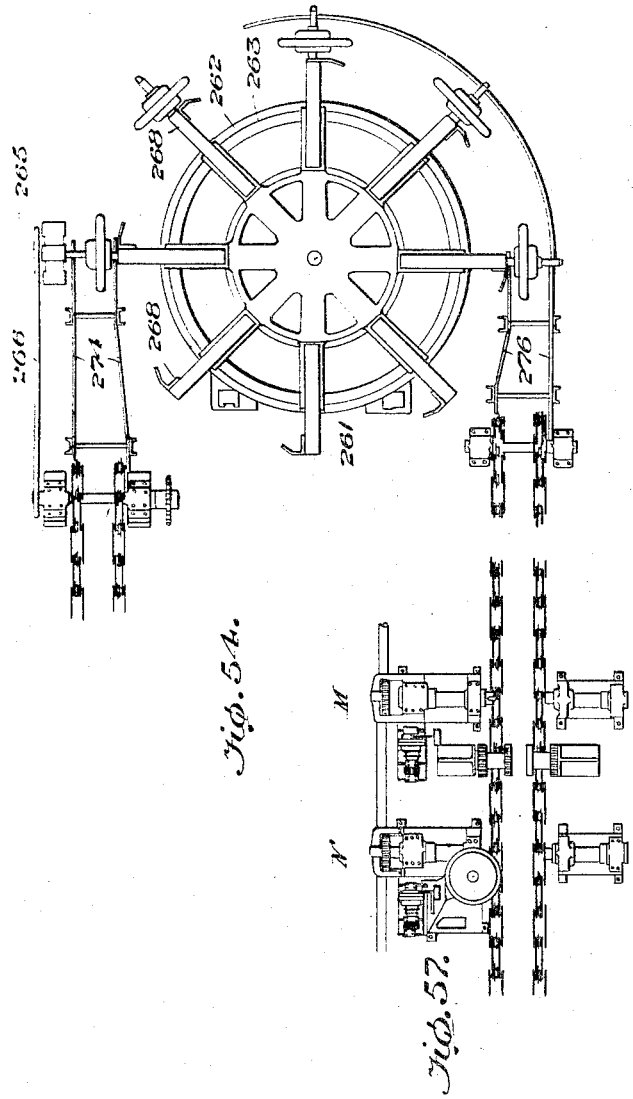
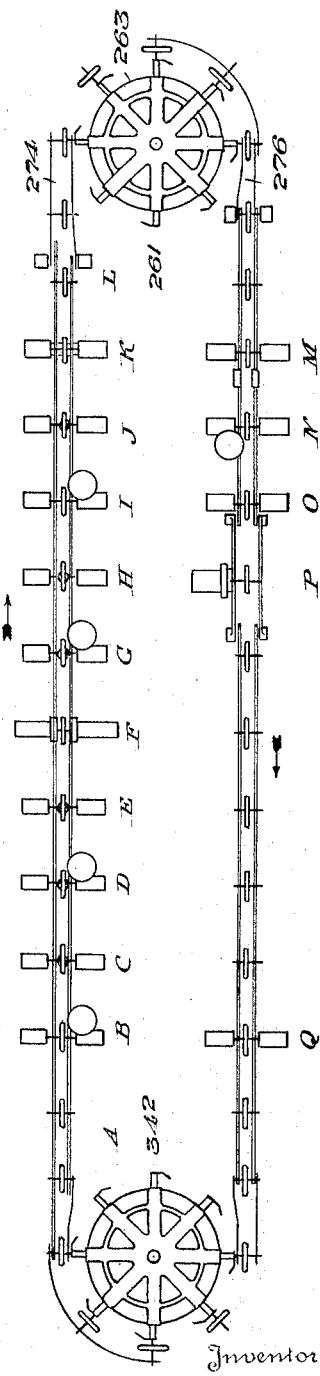
Inventor  
WILLIAM B. HARSEL.

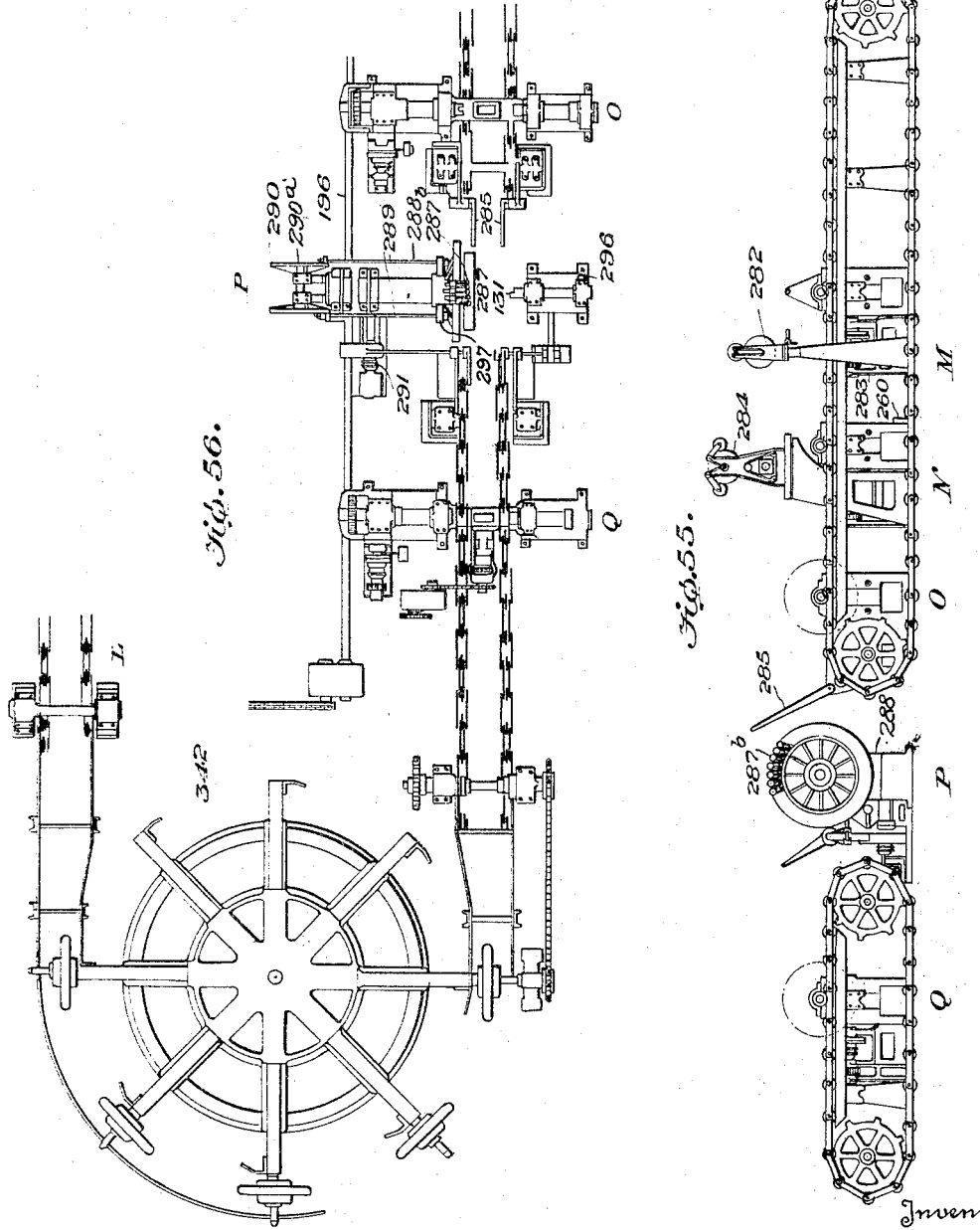

Sept. 8, 1925.

W. B. HARSEL 1,552,987

TIRE BUILDING MACHINE

Filed June 24, 1920 30 Sheets-Sheet 28

Inventor
WILLIAM B. HARSEL

Sept. 8, 1925.
W. B. HARSEL
1,552,987
TIRE BUILDING MACHINE
Filed June 24, 1920
30 Sheets-Sheet 29
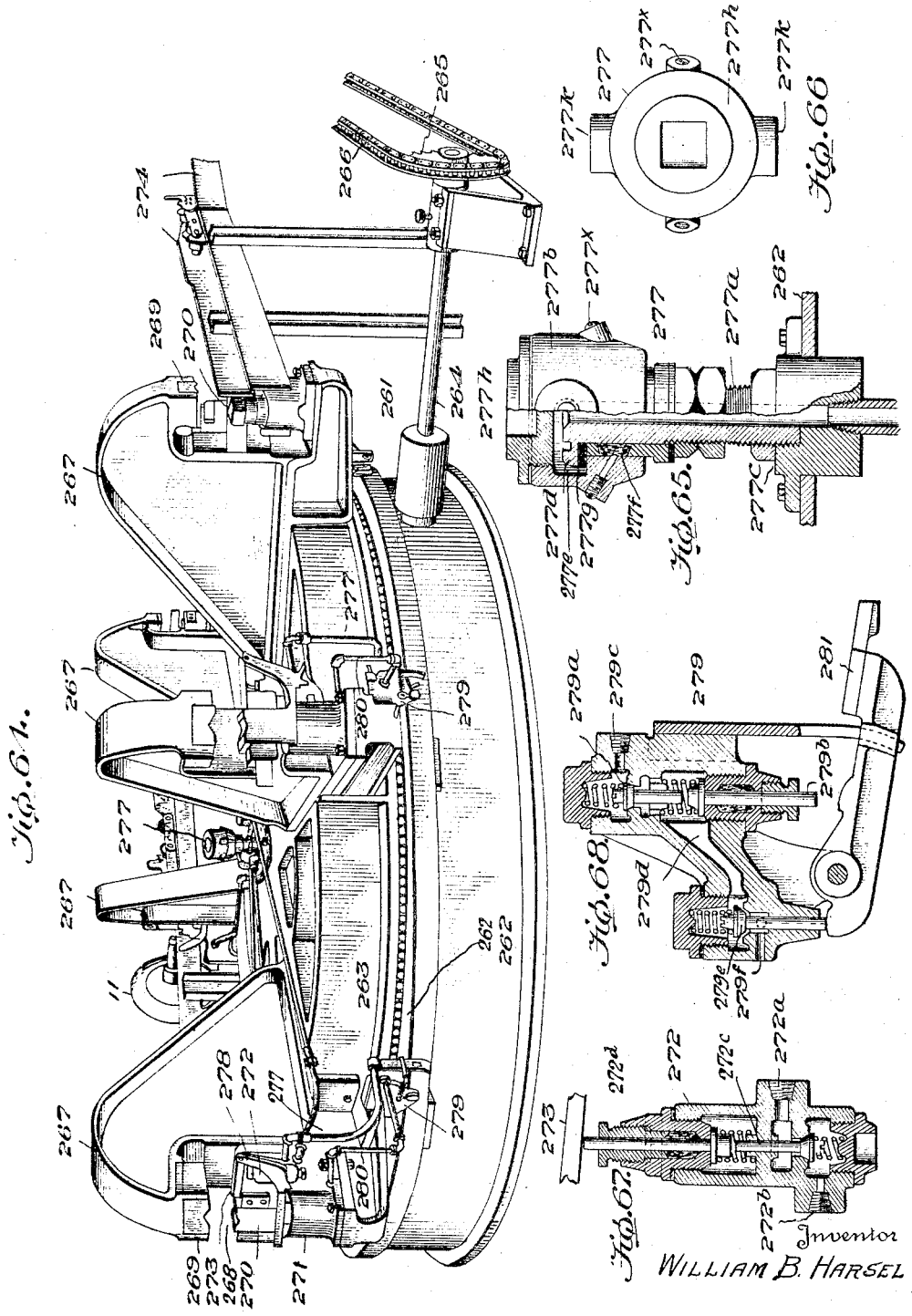
Inventor
WILLIAM B. HARSEL
By R. D. Trogner
his Attorney Sept. 8, 1925.
W. B. HARSEL
1,552,987
TIRE BUILDING MACHINE
Filed June 24, 1920
30 Sheets-Sheet 30
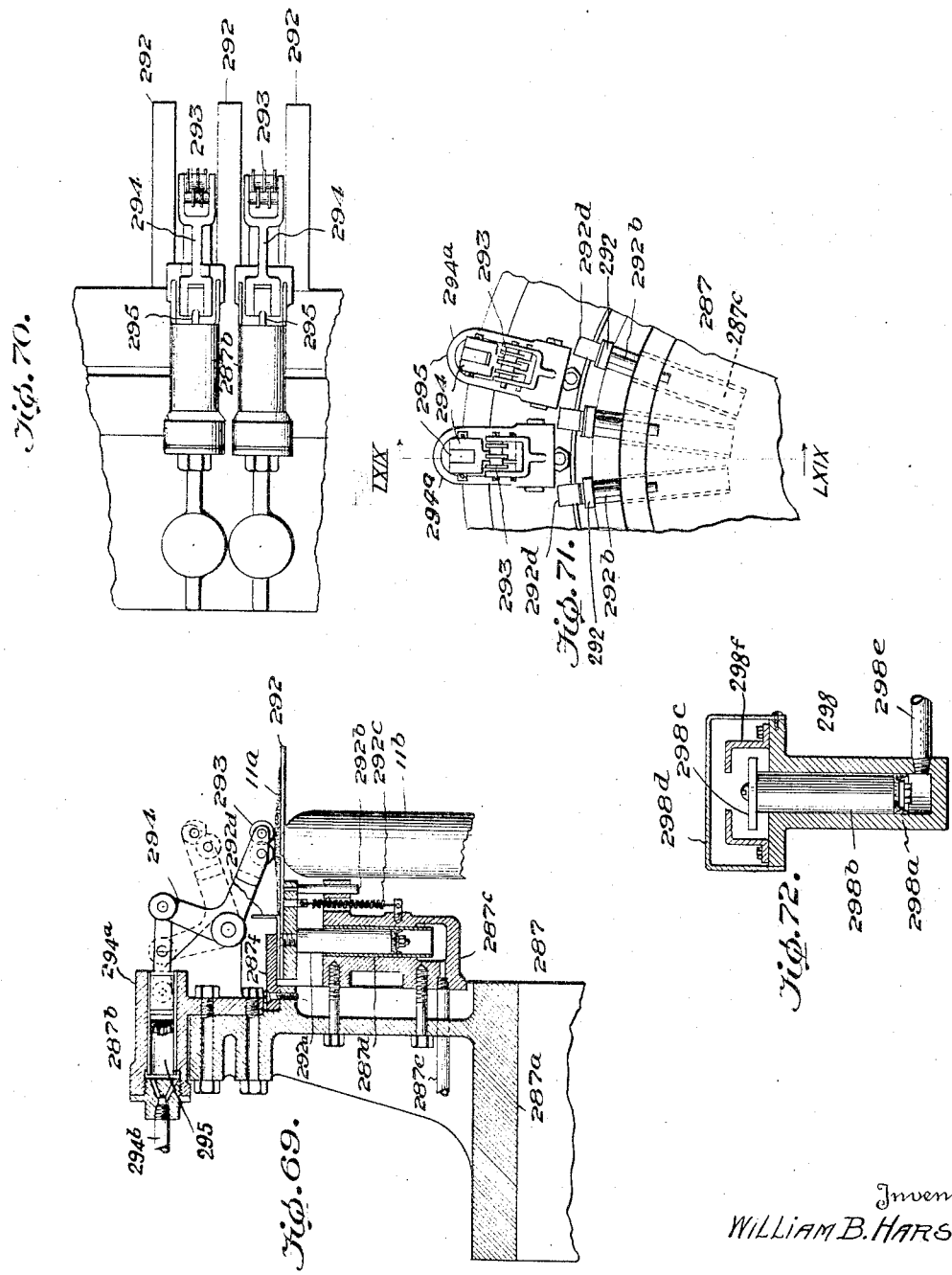
Inventor
WILLIAM B. HARSEL Patented Sept. 8, 1925.

1,552,987

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

TIRE-BUILDING MACHINE.

Application filed June 24, 1920. Serial No. 391,458.

*To all whom it may concern:*

Be it known that I, WILLIAM B. HARSEL, a citizen of the United States, and resident of Akron, Ohio, have invented new and useful Improvements in Tire-Building Machines, of which the following is a specification.

My present invention relates broadly to the manufacture of tires and the like and involves, in part, a machine for producing pneumatic tires and similar structures,—such as reliners, etc.—and has particular reference to machines for building the "carcass" thereof, which usually comprises a plurality of layers or plies of rubberized fabric having the general configuration of the finished casing and which constitutes the strength-giving body-portion of the outer casing of the tire.

The primary object of the invention is progressively to construct a tire or the like by a series of successively related steps and by a series of successive operations, all performed in a single machine, whereby a plurality of plies of fabric are superposed on and formed about a tire-forming core, after which bead-elements are applied thereto, and then additional layers or plies of the fabric are superposed thereon, there then being a chafing-strip, a breaker-strip and gum-cushion, a tread-element with sidewalls, etc., applied to make the complete structure. The operations, thus generally recited, are continuous so that a completed tire—ready for vulcanization—is produced in and by the one machine and as a result of a continued series of steps, all performed in and by the instrumentalities embodied in that machine.

By reason of the fact that the operation of this machine is continuous, it follows that a plurality of tires may be constructed simultaneously in the machine. Hence, a further object of the invention is to build in sequence a plurality of tires simultaneously by the performance on each tire of the aforementioned series of successively related steps.

From the foregoing, therefore, it will be perceived that the end which I have in view is so to operate a new type of machine (especially designed for the purpose), and so to practice a novel method of manufacturing tires, that a completed tire-casing is produced as a result of a series of related steps or operations performed in and by the machine.

The many other important objects and advantages of my improved machine will be apparent from a perusal of the following specification, the accompanying drawings, and the appended claims.

With reference to the accompanying drawings, wherein there is illustrated a preferred embodiment of my invention as it has been reduced to practice:

Figure 1 is a perspective view of the main portion of my machine;

Figs. 2$^A$, 2$^B$, 2$^C$, (collectively) illustrate, in a semi-diagrammatic manner, a side elevation of my machine, complete. (These figures read from right to left, starting with the right-hand end of Fig. 2$^A$);

Figs. 3$^A$, 3$^B$, 3$^C$, illustrate (in semi-diagrammatic form) a top plan view. (These figures read from right to left in the same manner as Figs. 2$^A$–2$^C$);

Fig. 4 is a front elevation, partly in section, of the first fabric-supplying or "pull-on" unit;

Fig. 4$^a$ is a view in vertical section of this unit;

Figs. 5 and 6 are respectively plan and end views thereof;

Figs. 7, 8 and 9 are views in front elevation, top plan, and end elevation, respectively, of the first fabric-stitching unit;

Figure 59:
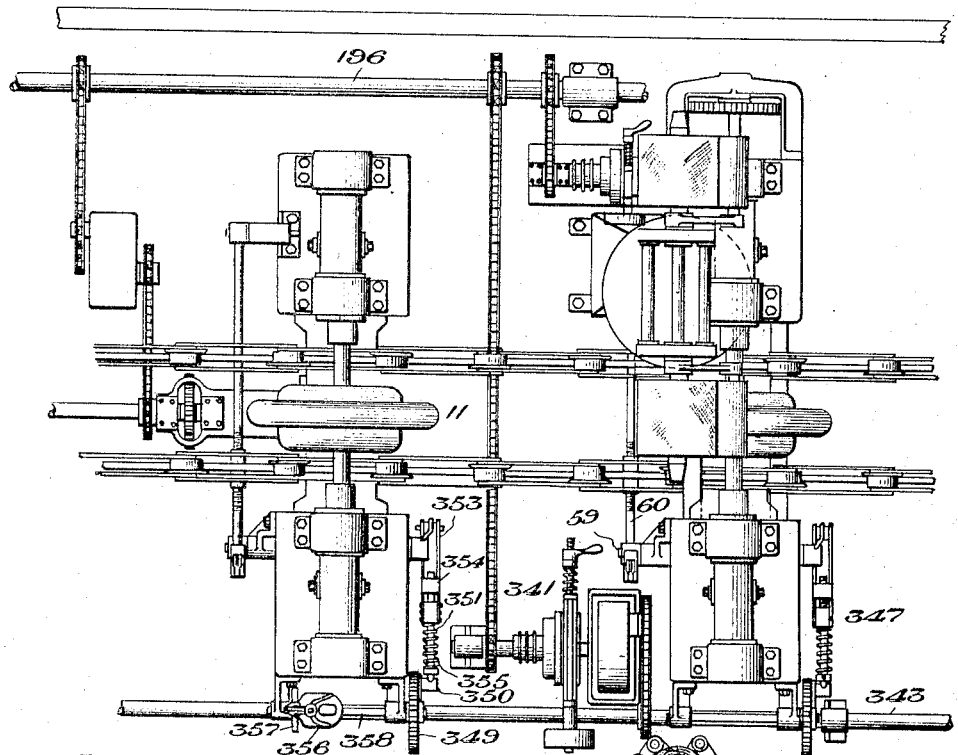
Figures 58, 60, 61:
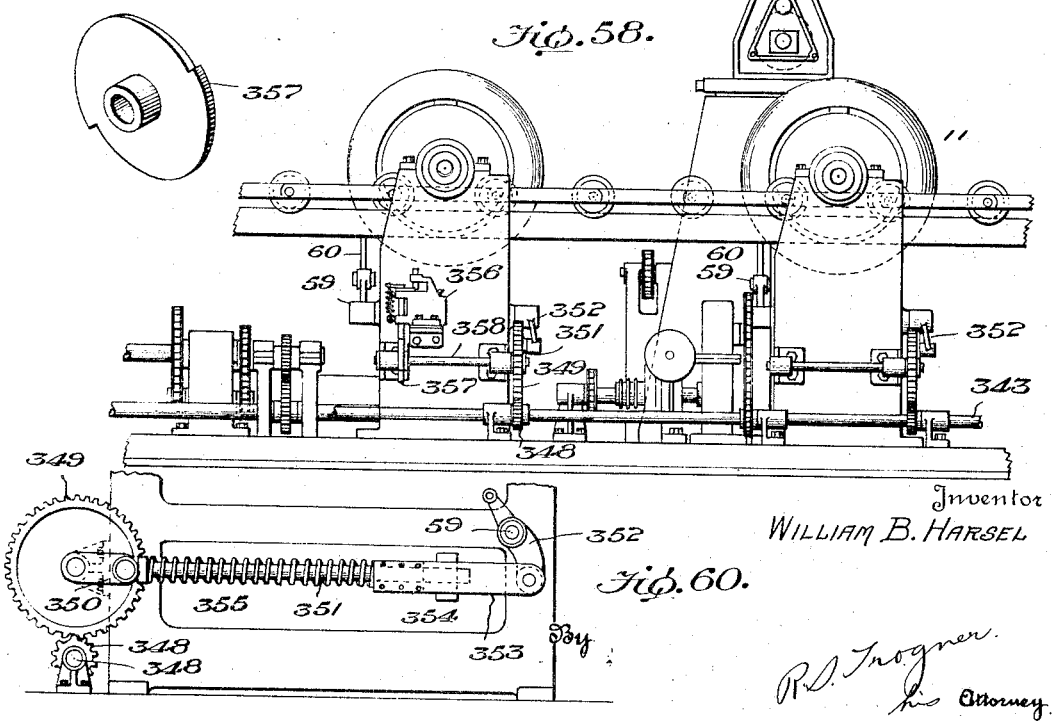

Figs. 10, 11, and 12 are detailed views of the lower or underbead stitching mechanism of one of the stitching-units, Fig. 12 being taken on line 12—12 of Fig. 10;

Fig. 13 is a perspective view of mechanism of the bead-setting unit;

Figs. 14, 15 and 15$^a$ are views in vertical section and top plan thereof;

Fig. 15$^b$ is a side elevational view of the bead setting unit;

Fig. 16 is a front elevation of the bead-setting mechanism, one end thereof being in section;

Fig. 17 is a perspective view of the mechanism of the under-bead and over-bead stitching unit;

Fig. 18 is a front elevation, partially in section, of mechanism shown in Fig. 17;

Fig. 19 is a top plan view thereof;

Fig. 20 is a front elevation, partly in section, of mechanism of the over-bead stitching unit;

Fig. 21 is a perspective view thereof;

Fig. 22 is a front elevational view of the combined overbead-stitching and trimming unit;

Fig. 23 is a top plan view thereof;

Fig. 24 is a detailed sectional view of valve-controlling means for the trimming mechanism;

Fig. 25 is a sectional view of the valve, itself;

Fig. 26 is a perspective view of the structure shown in the upper portion of Fig. 22;

Figs. 27 and 28 are views in side and front elevation, respectively, of the stock-supplying racks of the fabric-supplying unit;

Fig. 29 is a perspective view of the upper portion thereof;

Figs. 30 and 31 are detailed views of the tension-governing neck of the fabric-supplying unit;

Fig. 32 is a perspective view of the loading end of the core-conveyor or core-transporting structure for moving the tire-forming cores from unit to unit, and also one end of the drying-chamber through which the cores are passed preliminary to fabric being superposed and stitched thereon;

Fig. 33 is a perspective view of a safety-control switch for the core-conveyor;

Fig. 34 is a perspective view of the chain-controlling structure of the core-conveyor and a chuck and core sustained thereby;

Figs. 35 and 36 are detailed views of one of the core-carrying chucks;

Fig. 37 is a detailed sectional view of a safety-device for the bead-applying or setting unit;

Figs. 38 and 38ª are respectively a vertical sectional view and a detail elevational view of one of the electric safety cut-out switches forming a part of the conveyor-operating structure;

Fig. 39 is a similar view of another safety-switch of the same structure;

Fig. 40 is a perspective view of a controlling means for actuating the switch illustrated in Fig. 38;

Fig. 41 is a vertical sectional view of one of the over-bead-stitching units showing (in section) the slide and pitman connections;

Figs. 42 and 43 are detailed views of the air-controlling valves for the under-bead stitching unit;

Fig. 44 is a vertical sectional view through one of the stitchers and its mounting arm of the overbead-stitching unit;

Fig. 45 is a detailed elevational view, partially in section, of the underbead stitching mechanism;

Fig. 46 is a fragmentary elevational view of the electrical control apparatus for the underbead stitching mechanism;

Figs. 47 and 48 are respectively a sectional elevational view and a side elevational view of a portion of the stitching mechanism shown in Figures 45 and 46 of the drawings;

Fig. 49 is a detailed perspective view of the valve mechanism for controlling the operation of the underbead stitching unit;

Fig. 50 is a detailed view in perspective of the stitcher locking bolts and an associated operating mechanism;

Fig. 51 is a side elevational view of a switch for automatically controlling the operation of the overbead stitching mechanism;

Fig. 52 is a diagrammatical view of the main and supplemental circuits of the electrical system for governing the operation of the machine and for indicating to the master operator the stage of operation of the respective machine elements;

Fig. 53 is a diagrammatic plan view of the complete tire-building machine;

Fig. 54 is a diagrammatic plan view of the turn table for transferring the partially completed tire casings from the carcass-building component of the machine to the tire-finishing component of the machine;

Fig. 55 is a diagrammatic elevational view, partially in section, of the tire-finishing component of the machine;

Fig. 56 is a top plan view diagrammatically showing certain of the operating units of the tire finishing component of the machine;

Fig. 57 is a top plan view of the chafing strip and the breaker strip and cushion applying units;

Fig. 58 is a side elevational view of a fabric pull on unit and a stitching unit showing a modified form of spindle operating mechanism;

Fig. 59 is a top plan view of the portion of the machine shown in Fig. 58;

Fig. 60 shows the mechanism for controlling the advancement and retraction of the operating spindles;

Fig. 61 is a perspective view of a cam wheel that controls the operation of a switching mechanism shown in Fig. 58 of the drawings;

Figs. 62 and 63 are diagrammatic sectional elevational views of a modified form of switching mechanism for controlling the rotation of the machine spindles;

Fig. 64 is a perspective view of the turn table mechanism;

Fig. 65 is a sectional elevational view of a journaled air coupling for distributing air to the jaw-operating mechanism of the turn table;

Fig. 66 is a top plan view of the air coupling shown in Fig. 65;

Fig. 67 is a sectional elevational view of the air valve for automatically closing the jaws of the turn table to engage a core-and-chuck unit;

Fig. 68 is a sectional elevational view of the air valve for automatically releasing the core-and-chuck unit from the jaws of the turn table;

Fig. 69 is a longitudinal sectional view of a portion of the tread setting head, taken substantially on the line LXIX—LXIX of Fig. 71, and looking in the direction of the arrows;

Figs. 70 and 71 are respectively a top plan view and an end elevational view of the portion of the tread-setting head shown in Fig. 69; and Fig. 72 is a sectional elevational view of an air-operated electrical interlocking switch.

*Carcass-making component of machine.*— My present invention in tire-building machines, as embodied in the accompanying drawings, includes (as one part of the machine) twelve operatively associated machine-elements or units, "A" to "L", namely: (1) a core-loading and cementing structure A; (2) a fabric-supplying or "pull-on" unit B, wherein the first ply of fabric is placed upon the core under tension; (3) a fabric-stitching or forming unit C for the first ply; (4) a second fabric-supply or "pull-on" unit D; (5) a second stitching or forming unit E; (6) a bead-applying unit F; (7) a third fabric-supply unit G; (8) a third stitching or forming unit H; (9) a fourth fabric-supply unit I; (10) a fourth stitching or forming unit J; (11) a fifth stitching unit K combined with a trimming mechanism; and (12) a common driving and conveying means or unit L: For the purpose of clearness in description, the above-mentioned units have herein been designated as a whole as "A", "B", "C", etc. to "L", respectively. There are also minor elements adjunctive to those mentioned, such as safety devices, limit switches, etc., which help to make my invention practical and useful.

*Finishing component of machine.*—The machine also includes (as another but co-acting part thereof) several other machine-elements or units "M" to "Q", respectively, constituting the components of the "finishing" units of the machine. Preferably and as shown, my invention—generally speaking—contemplates a series of spaced apart units—constituting work stations or working positions—and in relation to which each of a series of tire-forming cores (mounted on core-carrying chucks) is shifted and at which stations the chucks and their cores are brought to rest for operation thereon of the respective units. For effecting the transporting and positioning of the chucks and cores, a traveling core-conveyor comprising, as hereinafter explained, a plurality of alined and associated components and constituting a core-conveying, transporting and positioning structure or mechanism. Manifestly, the function thereof is for simultaneously supporting and shifting or transporting a plurality of what I shall herein refer to as "floating" chucks and cores, preferably in a substantially horizontal plane and movable in relation to the different units so as to dispose a plurality of the chucks and cores successively in operative relation to the different cores, there being means associated with the core for effecting its step-by-step travel in respect to the units.

*General supporting structure.*—The various mechanisms and devices, hereinafter described, are preferably mounted upon a general unit-supporting structure or base 10, of any desired shape or form and preferably built in sections 10ª (Fig. 1), each section being designed to support one or more of the units now to be described:

(1.) *Core loading, cementing and transporting structure unit A.*—Any appropriate type of structure may be employed to immediately support a plurality of tire-forming cores 11 and core-carrying chucks 12, to transport them from unit to unit, and to convey them, initially, through a drying-chamber 13. In the present embodiment, I prefer to utilize core-carrying chucks and conveying mechanism of the type illustrated in Figs. 32, 35 and 36, and these are shifted from unit to unit by a structure which will presently be set forth.

The cores 11 (Figs. 34, 35 and 36) are of the usual type, and each is provided with an annular groove along its inner circumference whereby the core may be seated, in the usual manner, upon the extremities of a series of chuck-pins 14 which are extensible from a chuck-casing 15, (Figs. 35 and 36). The pins 14 are internally threaded to receive screw-shanks 16 which carry, upon their inner ends, beveled pinions 17 adapted to mesh with a master-pinion 18 loosely mounted upon a chuck-axle 19. This master-pinion has mounted upon its hub-portion a worm-wheel 20 which meshes with a worm-gear 21 carried upon a shaft 22 mounted in the casing 15. The extremities of the shaft 22 are squared for engagement with a key or handle which may, as seen in Figs. 35 and 36, be operated to project and retract the chuck-pins 14. The shaft 19 is rigidly connected to the casing 15, it projects therethrough, and, on each side, terminates in tapered end-portions 23, one of which has a pin 24 projecting through it for a purpose later to be described.

The preferred structure for transporting and positioning these chucks and cores is the following: In the use of the machine, the chucks 12, carrying cores 11 which have been cemented, in the usual manner, are brought by an operator or attendant to one end of a pair of spaced conveyor-chains 25 and 26 whereby they may be carried forward through the drying-chamber 13 (Fig. 32). Each of these conveyor-chains is arranged to play around a pair of spaced sprockets 27 and 28, (Figs. 2ᴬ and 2ᴮ) fixed upon shafts 29 and 30 rotatably mounted in bearings that are supported by standards 31 and 32 fastened to one section of the base 10. The chains are of the flat-link type, and have flanged rollers 33 mounted upon the pivot-pins of the various link-connections and adapted to traverse elevated tracks 34 suitably supported between the pairs of sprockets 27 and 28. The chains also carry, at spaced intervals, pairs of gripping-plates 35 which are so arranged that as the various cores are brought to the chains, they are engaged by the plates 35, elevated, and then carried forward, as will be apparent from Fig. 32.

The drying-chamber 13 consists of a sheet metal housing 36 (of substantially an inverted U-shape in cross-section), and is arranged upon the base 10 between the shafts 29 and 30 (Fig. 2ᴬ) in such a manner as completely to house the chain and the associated cores during their movement forward, to the next unit. Steam-pipes 37 are provided between the chains effectively to dry the cement on the cores, as they pass through the housing 36.

One of the sprocket-shafts (preferably the shaft 29) is driven by suitable means, in connection with the main driving-mechanism (which will later be described) for the complete machine, and constitutes means for moving the core conveyor from station to station.

The chain-structure, just described, constitutes an effective core-transporting and positioning mechanism for effecting the proper and timely positioning of cores and their chucks at certain predetermined points or stations. For this purpose, this traveling core-conveyor transports a plurality of chucks and their cores—which may be regarded as "floating" instrumentalities—and has a step-by-step movement to effect a unit-to-unit shifting of the chucks and cores. The operation of this structure is, by the means presently to be described, accomplished progressively for successively bringing one and then another chuck and its core to a position of rest; such operation, however, being always under the control of the operator.

This core-conveyor, preferably and as shown, comprises a plurality of components, each alined one with another, and all having their terminals so associated relatively as to permit the ready and convenient transfer of chucks and cores from one to another during the progressive travel of such cores and chucks from one point in the machine to another. The core-shifting structure thus far described is the component associated with the core-loading and cementing unit. In alignment therewith, and driven by the same common driving-mechanism (hereinafter to be revealed in detail) are two other components, each associated with a plurality of fabric-supplying and stitching units, now to be described:

(2.) *First fabric-supply unit B.*—Juxtaposed to the core-loading and conveying mechanism, and mounted upon the main base 10 in correct alignment therewith, is the second of the components of the conveying-mechanism, and this is arranged to receive the chucks and cores from the first component and carry them through the first and second fabric-supplying and stitcher units, in a like manner: The cores and chucks are transferred from the chains 25 and 26 of unit A—the first conveyor component—to chains 25' and 26' of the second component by means of a pair of slightly inclined rails 38 (Fig. 2ᴬ) supported by standards 39 and vertical adjusting rods 40 upstanding from the base 10. These rails 38 engage the shafts 19 of the chucks as the latter advance, and cause them to roll forward into a position whereby they may be engaged by grippers 35' on the chains 25' and 26'. From this position, the chucks are carried to the first fabric-supplying unit, whereupon the chains are stopped (by suitable mechanism later to be described) and the chucks and cores come to rest, temporarily, for a fabric-supplying operation. It may be well to state at this point that this unit, as well as all of the other fabric-supplying units, consists of two distinct but operatively associated structures, namely, a core-rotating mechanism and a fabric-supplying stand or turret. As these particular units are substantially the same in construction, a detailed description of one unit will suffice for the others.

Broadly, the core-rotating mechanism of the several fabric-supplying units (as shown in Figs. 4, 4ᵃ and 5) consists of a pair of spindle-supporting standards 41 and 42 which are mounted upon a section of the base 10—one upon each side of the conveyor-chains 25' and 26'—and which support (in bearings 43 provided upon their upper surfaces) a pair of chuck-engaging spindles 44 and 45. The spindles 44 and 45 each comprises two main parts, a hollow actuating-cylinder 46 and a driving-shaft 47 encompassed by the cylinder 46 and designed to slide in conjunction therewith. Suitable anti-friction bearings 46ᵃ are interposed between the cylinder 46 and the shaft 47 to permit the shaft to rotate for a purpose later to be described. Each of the driving-shafts 47 has, at its inner end, a socket 47ª to receive the tapered ends of the chuck-shafts 19. Suitable locknuts 47ᵇ and washers 47ᶜ are also provided at the outer ends of the shafts 47 for attachment to the cylinders 46.

Preferably only one of the shafts 47 is designed to be power driven, the other shaft merely acting as a bearing for one end of the chuck-shaft. The driven-shaft, in the cylinder 46, is therefore continued out beyond the bearing 43 and extends into another bearing 48 forming part of a U-shaped bracket 49 bolted or otherwise secured to the standard 42. Interposed between the bearings 43 and 48, and sourrounding the shaft 47, is a gear-wheel 50 and a spacing collar 51, the latter being fastened to the bearing 43 by means of outstanding flanges 51ª bolted thereto. The gear-wheel 50 is keyed upon the shaft 47 which for this purpose has an elongated keyway 52 cut upon its outer surface to permit the shaft to slide within the gear and, at the same time, be rotated thereby. In order to transmit power from the drive-shaft 47, on the power side of the machine, to the core-chuck, the inner end of this shaft is notched out as at 53 to engage the pins 24 of the chuck-shaft 19.

The spindles 44 and 45 are thrown into and out of engagement with the chucks by means of a pair of bell-cranks 54 (Figs. 4, 4ª and 5), pivoted to the standards 41 and 42, by brackets 55. One member of each bell-crank is bifurcated for pivotal connection to each side of the spindles, as at 56, and the other member is pivotally connected to one end of a toggle 57. A handle 58, which is mounted upon a shaft 59 supported by the standard 41, is connected to the two toggles 57 by a series of levers, designated generally as 60, in such a manner that movement of the handle in either direction will cause both spindles to move inward or outward, as the case may be.

To maintain the two associated standards 41 and 42 in correct relation to the chains 25' and 26', a spacing-member 61 is interposed between them, being bolted to the inner sides of the standards and so as to occupy a position between the upper and lower portions of the conveyor-chains. Brackets 62 are also bolted to the inner sides of these standards for the support of tracks 63, similar to the aforementioned tracks 34 of unit A.

The stand or turret of each of the fabric-supply units (as shown in Figs. 2ᴬ, 3ᴬ, 27, 28 and 29) includes, in general, a central supporting standard 64 juxtaposed to the pair of spindle-supporting standards 41 and 42, and a revolving stock-carrying structure or turret 65. A king-pin 66, mounted in the top of the standard 64, projects into the base of the turret 65 and provides a pivot therefor. Anti-friction bearings (65ª, Fig. 28) are seated in registering raceways cut upon the upper face of the standard 64 and upon the under side of the turret, thereby affording free rotation of the turret.

The stock is, as customary, rolled upon metal shells which are adapted to be mounted upon a shaft 67 (Figs. 1, 2ᴬ and 29) supported by a pair of spaced A-shaped brackets 68 upstanding from and bolted or otherwise secured to the turret-base. Another shaft 69 is also mounted in the brackets 68, at a lower plane than the shaft 67, and carries upon each of its ends a bracket or frame 70, which in turn provides outer bearings for a tension-roll 71 and a pair of idler-rolls 72 upon each side of the bracket-frame. The central standards 68 are drilled at correct points to provide inner bearing for the tension and idler rolls (just described), the shafts for the tension-rolls 71 extending beyond the bearings into a tensioning-mechanism: Any suitable tensioning device may be employed; but I prefer to employ a construction which consists of a band-pulley 73 (Figs. 27 to 31), keyed upon the tension-roll-shaft and frictionally engaged by a pair of semi-circular arms 74 which are connected together at one end by a link-connection 75 (also connected to the brackets 68) and by a bolt 76ª and adjusting-nut 76 at the other. An expansion-spring which encircles the bolt 76 provides a cushioning means between the arms 74, and is varied at will by actuation of the adjusting-nut. The bolt 76ª is connected to one of the arms 74 through the medium of an eccentric yoke 76ᵇ which provides for a quick release or engagement of the arms 74 with the pulley 73, as will be apparent.

From the above description, it will be seen, first, that with the fabric-supplying structure there is associated a fabric-stretching mechanism whereby, during rotation of the core, the ply of fabric is stretched along its medial line while being withdrawn from the fabric-supplying structure; and, also, that two alternate sources of supply are provided at each supply-unit, and there now remains to describe the selective control which enables the operator quickly to throw one supply out of action, after depletion of the stock, and bring into use the fresh supply. This is accomplished by means of a latch-mechanism 77 which is mounted upon the standard 64 and connected to an operating-handle 78 that is pivoted on either of the standards 41 and 42 (preferably standard 41) by a series of levers and shafts designated generally as 79 and clearly seen in Figs. 27 and 28. The latch 77 is designed to project into a hollow bracket 80 carried upon one side of the base-portion of the turret 65, when one of the stock-supply-rolls is in the correct position, and into a similar bracket 81 mounted upon the opposite side when the other supply is used. To turn the turret to position a fresh supply, the handle 78 is lowered, thereby causing the latch 77 to be withdrawn from the bracket 80, whereupon the operator manually turns the turret upon its base until the opposite bracket 81 is in line with the latch which then snaps into place. A spring 79ª is provided between one of the connecting-levers 79 and the base 10 and keeps the latch 77 in constant engagement with the brackets.

(3.) *First stitching unit C.*—Advancing from from the fabric-supply or "pull-on" unit, the core and chuck are, by the core-conveyor, shifted to the next unit—which is the first stitching unit and appears in Figs. 2ᴬ, 2ᴮ, 3ᴬ, 7, 8, 9, 10 and 11, and at which point the conveyor, chuck and core are brought to a condition of rest—whereupon the stitching-mechanism, which this unit comprises, is thrown into operation and causes the fabric-ply, just applied, to be shaped and smoothed down on the core. This mechanism is supported upon a pair of aligned standards 84 and 85, of substantially the same construction as the standards 41 and 42 of unit B, and includes similar chuck-engaging and rotating spindles 86 and 87.

The stitching mechanism proper is mounted upon a hollow casting 88, which is bolted or otherwise secured to the standards 84 and 85, and performs the double function of supporting the stitching-mechanism and of retaining the standards in correct relation and alignment.

A casting 89 (Figs. 2ᴬ, 3ᴬ, 8, 11 and 45)— bolted to the rear side of the support 88 and projecting forward along the central line of the machine—carries (in suitable bearings 90) a shaft 91, having at one end an offset crank-portion 92. The shaft 91 is broken at its middle (Fig. 11) to accommodate the respective halves of a magnetic-clutch 93. In the drawings, the clutch 93 is shown more or less diagrammatically since it does not constitute a major feature of my invention. An electromagnet winding 93ª which is energized through the customary pair of slip rings 93ᵇ, effects the engagement of the clutch members. The winding 93ª is indicated in dotted outline in the drawing. The forward end of the shaft 91 projects through a pair of the bearings 90, and carries a gear 94 upon that portion which is supported between the bearings. The gear 94 is adapted to mesh with a pinion 95 which is keyed upon an auxiliary shaft 96 also carried above the shaft 91, in suitable bearings in the casting 89. A sprocket wheel 97 which is mounted upon the outer end of the shaft 96, is (as shown in Fig. 3ᴬ) in driving connection with the main driving mechanism, later to be described as a whole.

A switch 242, which is shown diagrammatically in side elevation in Figures 45 and 46 of the drawings, automatically starts the rotation of the spindles 87 and the operation of the stitching mechanism when the spindles are advanced to engagement with the core-and-chuck unit. The switch 242 is mounted on one of the brackets 62 of the stitching unit "C" in such manner as to cooperate with a pin 243 that is mounted on the plate member 103 of the stitcher carriage and a bell crank 244 that is pivotally mounted on the bracket 62 and actuated by the spindle sleeve 46 to reciprocate a rod 245.

The switch 242 preferably embodies a vertical rod 246 of insulating material that has a stationary contact member 247 on its lower end and which is secured to the bracket 62 at its upper end by means of a bracket 248. A contact sleeve 249, which is slidably mounted on the rod 246, cooperates with the contact member 247 to establish an energizing circuit for magnetic clutches 93 and 202. A latch spring 250 maintains the contact sleeve 249 in its uppermost position after it is moved to such position by the pin 245 as hereinafter described.

The upper arm of the bell crank 244 has a hollow portion in which a latch 251 is slidably mounted. A spring 252 biases the latch 251 to its outermost position, as shown in the detailed sectional and elevational views, Figures 47 and 48. The latch 251 is adapted to be retracted into the hollow sleeve of the bell crank 244 when it is forced past the advanced sleeve 46 by the rod 245 as the pin is forced upwardly through the operation of the carriage 102 in the manner shown in Figure 46. The pin 243 engages the contact sleeve 249 which, in turn, lifts rod 245. The retraction of the latch 251 permits the upwardly extending arm of the bell crank to slide past the advanced spindle sleeve to assume the position shown in solid outline in Figure 46.

After the stitcher carriage 102 has moved to its inoperative lowermost position and the spindle sleeve 46 is retracted, the latch pin 251 again automatically advances to position for another cycle of operation of the stitching unit as shown in dotted outline in Figure 46. If the spindle sleeve is subsequently advanced, the pin 243 forces the contact sleeve 249 from its latched position to engagement with contact member 247 to establish an operating circuit for the magnetic clutches 93 and 202.

An oil-switch 98, mounted upon the casting 89 and in a position over the shaft 91, provides a positive means for stopping the movement of the shaft 91 and crank 92 after a complete revolution is made. This arresting of the shaft is effected by a cam 99 which is keyed to the shaft 91 and is provided with a notched-out portion 100 upon its outer edge which is in constant engagement with the main actuating-arm 98$^a$ (Figs. 11, 38 and 40) of the switch.

The oil-switch 98 also has a pair of auxiliary contact fingers 253 that are bridged by a contact segment 254 when the switch occupies an open position as illustrated in Figures 38 and 38$^a$ of the drawings. The auxiliary contact fingers 253 energize index lamps to indicate to the master operator that the machine on which the particular switch 98 is mounted has completed its operation. The circuit established by the contact fingers 253 is interrupted when the switch 98 is closed.

The crank-portion 92 of the shaft 91 is pivotally connected to the lower end of an adjustable connecting link 101 (Fig. 11), the other end of which is pivotally connected to a stitcher-carrying head 102. The head 102 comprises a hollow T-shaped casting, machined on the flattened sides of the shank-portion of the T, whereby it may be easily moved in a vertical manner in suitable guides provided but not shown in the hollow casting 88. A pair of plate-members 103 (Figs. 7, 10 and 11) which are carried upon the top surface of the head 102 support a pair of air-cylinders 104, the pistons (not shown) of which are adapted to engage a pair of stitcher-carrying arms 105. These arms are pivoted, as at 106, in the head 102 and carry stitcher-discs 107 at their free ends. Cables 108 which are fastened to weights 109 at one end and to the arms 105 at the other are used to return the pistons of the cylinders 104 (together with the stitcher-arms 105) to their inoperative position. Thus, the motor (including the cable 108 and weight 109) are active on the stitcher-arms and have a normal tendency to swing the same on its pivot. The air-cylinders and their piston constitute a pressure-means which is active on each arm for controlling and maintaining it resiliently against the surface of the fabric-covered core. To regulate the inward movement of the arms 105, adjusting-screws 110 screwed into a portion of the head 102, are provided between the arms 105 and in the direct line of travel thereof.

Mounted upon the face of the stitcher-carrying head 102 (at approximately the junction of its body-portion with its head-portion) is a pair of bearing-brackets 112 (Figs. 10, 11, and 12), bolted or otherwise secured thereto. These brackets provide a bearing for a horizontally-disposed shaft 113, upon which a pair of bell-crank levers 114 are carried. One end of each bell-crank connects to a locking-pin 115 which is projected through a suitable opening or bearing 102$^a$ in the carriage 102. Also mounted upon the shaft 113, between the two bell-crank levers 114, is a rocker arm or member 117 which supports a roller 118. This roller is arranged to be held in frictional engagement with a cam 119 (bolted or otherwise secured to the carriage support 88) by means of a weight 117$^a$ secured to the outer end of the rocker arm 117. The free ends of bell-crank levers 114 are grooved, as at 114$^a$, for engagement with a pair of outstanding arms 117$^b$ carried by the rocker-arm 117. The bell-crank levers 114 are held in a fixed relation to the arms 117$^b$ by means of a coil spring 114$^b$ which encircles the shaft 113 and bears at one end against a pin 114$^c$ carried by the upper end of the bell-crank lever and against the arm 117$^b$ at the other end. Secured to the outer extremities of the supports 112 is a pair of downwardly extending arms 112$^a$. These arms are connected by a horizontally-disposed portion 112$^b$ which carries at its center a downwardly-projecting lug 112$^c$ for engagement with an air-valve later to be described. One of the arms 112$^a$ is projected downwardly through a bearing 112$^d$, secured to the support 88, and carries at its free end a pair of adjusting nuts 112$^e$. An arm 120, pivotally mounted upon the aforementioned air-valve 121, is provided at its outer extremity with an eye 120$^a$ which is arranged to encircle the lower end of the arm 112$^a$ between the bearing 112$^d$ and the adjusting-nuts 112$^e$. A latch 120$^b$ (fixedly secured to the bearing-shaft 120$^c$ of the member 120) is arranged to be engaged by the free end of a pivoted and spring-pressed valve-actuating arm 120$^d$ (Figs. 10, 42, 43 and 49). It may here be briefly explained that, when the shaft 91 is caused to rotate, the crank-portion 92 thereof raises the carriage 102 vertically. This in turn causes the bearing-members 112 also to be raised, whereupon the roller 118 rolls down an inclined portion 119$^a$ of the cam 119 carried by the support 88. This movement causes a rocking of the shaft 113 and the bell-crank levers 114. As these bell-crank levers are slowly rocked, the pins 115 are withdrawn from the path of the stitcher-carrying arms 105. At the same time, the arm 120 is slowly rotated upon its pivot and this causes the latch 120$^b$ to be swung free of the valve-actuating arm 120$^d$. This causes the valves carried by the stems 121$^a$ of the valve 121 (Fig. 42) to become seated and thereby shut off the air-supply to the cylinders 104. The weights 109 then immediately withdraw the stitcher-supporting arms 105 from engagement with the carcass-carrying core, and, as the carriage is slowly returned to its initial position by the crank 92, the shaft 113 is again caused to be rocked by the engagement of the roller 118 with the cam 119. Thereby the pins 115 are returned to their locking position. As the carriage is further slowly returned to initial position, the lug 112ᶜ carried by the horizontal member 112ᵇ engages the valve-actuating member 120ᵈ and causes it to be pressed downward. The downward movement of the member 120ᵈ again opens the valves 121 and this operation permits the air to circulate again to the cylinders 104. Thus, it will be seen that, while the stitcher-arms 105 are in their inoperative position and up to the completion of the forming or stitching-operation, they are under air-pressure and, upon completion of the stitching operation, the air-supply is closed to permit the arms 105 to be returned by the weights 109 and the pin 115 to be projected again into the path of the arms for preventing inward movement thereof.

This stitching-unit also includes a core-supporting and rotating mechanism of the construction and operating in the manner described with reference to the core-supporting and rotating mechanism of the first fabric-supplying unit. In that it includes the core-engaging spindles 86 and 87, with their adjunctive operating mechanisms and devices, it will suffice to explain here that they, in general, involve the same structure.

(4.) *Second fabric-supply unit D.*—The core having received the first ply of fabric from unit B, and the ply having been stitched or formed down to shape by unit C, the core is ready for the application of the second ply of fabric: The core-conveyor being, then, again put in motion, the chuck and its core are transferred to the next unit, D, whereupon they again come to rest, there, and are operated by the core-rotating means, associated with this unit. Here, a second ply of fabric is placed upon the core, in a manner and by mechanism identical with that described with reference to unit B. The second ply having thus been applied, the chuck and its core are again advanced by the core-conveyor to another station which is:

(5.) *Second stitching unit E.*—This second ply is stitched down upon the preceding ply by a stitching unit E, in a like manner and by a mechanism (including a core-supporting and rotating structure) which corresponds to that of stitching unit C; hence, the hereinabove detailed description of same will also include that of this unit E. The second ply having thereby been stitched or formed down, the chuck and its core are again advanced to another station or position of rest, at the (6.) *Bead-applying unit F.*—The core (carrying the two plies stitched and stretched properly thereon by units A to E) will in its advancing movement have reached the end of the conveyor-chains 25′ and 26′, whereupon it is engaged by a core-transferring mechanism, designated as a whole by 125 and located between the second and third conveyor-components, (Figs. 2ᴮ, 3ᴮ, 13, 14 and 15): This mechanism consists of two oppositely-disposed pairs of standards 126 and 126′ (located adjacent sprockets 126ᵃ and 126ᵇ, respectively, supporting the conveyor-chains), a pair of counter-balanced arms 127 pivoted to the upper portions of the standards 126, and a pair of operator-controlled arms, presently to be described. The standards 126 are preferably mounted upon the bearing-brackets 126ᶜ for the sprockets 126ᵃ, and have their top-portions disposed in line with the direct line of travel of the conveyor-chains. The counter-balanced arms 127 are pivoted, at 128, to the standards 126 in such a manner that, when they are swung into a horizontal plane, they form a connecting-link between the core-conveyor component and the bead-applying mechanism proper, hereinafter described. The arms 127 constitute a chuck and core-bridging or transferring structure juxtaposed to and associated with the bead-applying unit, and is adapted to transfer a chuck and its core from the core-conveyor to a position of rest opposite the bead-applying unit.

The beads employed in the operation of this machine are of the endless, annular, soft-core type, and it is obvious that by the use of this annular type of bead, it becomes necessary to constitute the core-conveyor into independent but alined components to permit the beads to be applied to the fabric-covered core in circular form.

Like the other units previously described, the bead-setting unit F comprises means for supporting the chuck and core independently of the core-conveyor, and as associated bead-supporting and positioning mechanism operable in relation to the core at the will of the operator. Preferably and as shown, the means and mechanism include a pair of standards 130 (Figs. 2ᴮ, 3ᴮ, 13, 14, 15 and 16), a pair of sliding chuck-engaging members 131, and a lever-operating means (designated as a whole as 132) for throwing the sliding members into and out of engagement with the chucks. The slides 131 include a cylindrical body-portion, one end of which is bored, at 131ᵃ, to accommodate the tapered ends of the chuck-shaft, and a bifurcated stud 131ᵇ (Fig. 16) fastened in the opposite end. A pair of hollow cylindrical members 133 surround these slides 131 and provide a bearing therefor. The members 133 are held rigidly in clamping-members 134 carried upon the top of the standards 130. One end of each of the members 133 is left open, and is also bifurcated to permit a sprocket and chain (142 and 145, Figs. 3ᴮ, 13, 15 and 16) to revolve therein in a manner to be later described. The opposite or inner ends of the members 133 are closed and bifurcated whereby the chuck-shafts are permitted to project therein for engagement with the slides 131, as will be apparent upon reference to Figure 16 of the drawings.

Only the outer part of each of the members 133 is engaged by the clamping-means 134, the inner end being left clear and unobstructed. Mounted for sliding engagement therewith is a pair of sliding bead-positioning and setting heads 135. These heads consist of annular bead-supporting rings 136 which are secured to the slide-portions by a skeleton-structure 137. Arms 138 (secured to the slides at one of their ends and to crank-portions 139 of a shaft 140, mounted upon the standards 130) impart a reciprocating motion to the bead-rings in a manner later to be described. Suitable shock-absorbing springs 141 are mounted in the arms 138 to relieve the compression-strain upon the fabric then on the core.

Mounted upon the shaft 140, at each side, is a sprocket-wheel 142 which is connected to a sprocket 143 (carried upon a jack-shaft 144) by a sprocket-chain 145. The shaft 144 is mounted in bearings 146, which are bolted or otherwise secured to the lower portions of the standards 130, and carries at its free end a bevel-gear 147 which meshes with a beveled gear 147ᵃ mounted upon one end of driving-shaft 148. A worm-reduction gearing 149, directly connected to one end of an auxiliary drive-shaft 150 and to the shaft 148, provides a slow speed for rotating the shaft 140, and, hence, effects the inward and outward movement of the bead-rings 136.

The auxiliary shaft 150 is supported in any suitable manner—preferably in standards upon the base 10—and is broken to accommodate a solenoid-clutch and brake 151 (Fig. 15) for a more accurate control of the drive-proper. The auxiliary shaft 150 is connected to the main drive (presently to be described) of the machine by sprockets and sprocket-chains in a manner to be later described.

The clutch 151 has an energizing coil 151ᵃ and an electromagnet coil 151ᵇ that is adapted, when energized, to hold the brake shoes out of engagement with the driven member of the clutch. The coils 151ᵃ and 151ᵇ are connected in shunt relation and are simultaneously energized.

One of the sprocket-wheels 142, preferably that on the opposite side of the machine from the main-drive, carries a circular cam 152 (Figs. 13 and 16) which engages a roller 152ᵃ carried by an arm 153 slidably mounted in bearings secured to the standards. This arm 153 is connected to an electric-switch 154 which is connected in the wiring-circuit (to be described hereinafter) for the solenoid-clutch and brake-mechanism 151. The switch 154 is similar in detail to the previously described switch 98. The cam 152 has two notched-out portions in its periphery that are directly opposite each other and each is designed to open the switch 154 upon the completion of a half revolution of the crank-portions 139 of the shaft 140.

The lever-operating means 132 for operating the sliding spindles 131 also performs the function of throwing into and out of engagement a pair of transferring-arms 155, in a manner now to be described: The bifurcated end-portions of the spindles 131 are pivotally connected to one end of a bell-crank 156 which is keyed or otherwise secured to a shaft 157 mounted in the standards. The other end of the bell-crank 156 is pivotally connected to a toggle 156ᵃ that is operated by a hand-lever 158 (Fig. 16). One end of the shaft 157 projects through the standard and carries a worm-wheel 159 which, in turn, meshes with a worm-gear 160 carried by a shaft 161 mounted in a standard 162. The free end of the shaft carries one of the arms 155. It will now be apparent that any movement of the bell-crank 156 will cause the shaft 157 to rotate and this motion will, in turn, cause the shaft 161 also to rotate and swing the arms. The function of the arms 155 is to form a connecting-unit between the slides 131 and another pair of conveyor-chains 27″ and 28″ which convey the chucks through the other units of the machine. The chains 27″ and 28″ are trained over sprockets in a manner similar to that of the chains 27 and 28 and 27′ and 28′.

The hand lever 158 carries an interlock switch 256 that interrupts a circuit which controls the movement of the bead setting rings 135 in order that the bead setting mechanism may be advanced only when the chuck and core members 11 and 12 are properly engaged by spindles 131.

(7.) *Third fabric-supply unit G.*—Leaving the bead-applying mechanism, the chuck and its core advance on the conveyor-chains 27″ and 28″, and come to rest at the third fabric-supplying unit, which is a fabric "pull-on" position. Here, the third ply of fabric is stretched and applied to the core, the same as previously described in connection with units B and D, and then the chuck and its core pass on to the third ply-stitching unit. It is to be understood that in this unit, as in units B, C, D and E, there is associated the core-supporting and rotating mechanism already described in connection with these units.

(8.) *Third stitching unit H.*—Owing to the fact that the beads have been applied to the side of the now partially-completed carcass, it has in practice been found desirable to provide a stitching-mechanism of somewhat different construction and operation from that of units C and E, and this is because of the fact that the third ply must be stitched over the beads. To this end, therefore, I provide a so-called "double-stitching" structure, one being adapted for stitching the fabric down to the beads and performing, thus, an "underbead" stitching operation, and the other for stitching the remaining portions of the fabric down over the beads and performing, thus, an "overbead" stitching operation. In other words, these structures comprise two stitching components whereby two distinct operations are performed, one an "underbead" stitching operation down to the beads applied to the carcass by the bead-setting unit, and the other operating, when the underbead operation is completed, to stitch the fabric over the beads.

The underbead-stitching component or mechanism is built, generally, the same as the stitching-mechanism of units C and E, and, similarly, the chuck-engaging and driving mechanism for the same; hence, it is not deemed necessary again to explain its construction here. The overbead-stitching component or mechanism is thrown into operation automatically by the temporary closure of a starting switch 257, shown in Fig. 51 of the drawings, after the underbead-stitching operation is completed.

The overbead stitching mechanism of this double stitching structure includes the following: A pair of substantially H-shaped brackets 41$^a$ and 42$^a$ are rigidly secured to the inner bearings of supporting-standards 41 and 42 similar to the standards 41 and 42 of unit B, and these support (upon their top surfaces) a cross-piece 163 of I-beam construction. Slidably mounted upon this cross-piece is a pair of oppositely-disposed stitcher-supporting slides 164 (Figs. 17, 18, 19 and 20) adapted to be oscillated upon the cross-piece 163 toward and away from each other and in respect to the core by a pair of pitmen 165 which are secured to the slides at one end, as at 166, and at the other end encircle eccentric discs 166$^a$ that are mounted upon a common shaft 167 which extends through the cross-piece 163. A cross-brace 168, bolted to the brackets 41$^a$ and 42$^a$, supports an outer bearing for the shaft 167 (Figs. 19 and 20).

The lower portions of stitcher-supporting slides 164 are drilled and bifurcated, as at 169 (Figs. 20 and 41) for the reception of stitcher-arms: These comprise an angularly-shaped body-portion 170, an enlarged bearing-portion 171, and a somewhat reduced end-portion 172. The body-portion 170 is drilled, at the angle formed at its approximate middle section, for the pivotal mounting of the arm upon a pin 170$^a$ carried by the bifurcated portion of the slides. Above the pivoted arms 170 the slides 164 are bored to form air-cylinders 173$^a$ for pistons 173 which are arranged to contact with the reduced portions 172 of the stitcher-arms and exert a pressure thereon at the required time, as will be later described. These air-cylinders 173$^a$ are connected to a common air-supply feed-pipe 173$^b$ (secured to the framework of the machine) in any desired manner. Stitcher-discs 171$^a$ are mounted in the bearing-portions 171 of the arms 170 in suitable anti-friction bearings 171$^b$ (Fig. 44) provided therein.

To accelerate the advance and return of the slides 164 into and out of engagement with the carcass, the outer ends of the pitmen 165 are provided with machine-guides 165$^a$ (Figs. 20 and 21) which are adapted to form seats for slides 175, carried by the pivot and connecting pins 166 for the two members. The upper portions of the slides 164 are connected to pistons 176 which operate in air-cylinders 177 secured to the upper portions of the main supporting-brackets 41$^a$ and 42$^a$ and are disposed in line with the mounting of the slides. Counterweights 178 and cables 179 (trained over pulleys 179$^a$ secured to the brackets and fastened to the slides 164) provide a motor for effecting a positive and quick return of the slides and pistons to their initial position upon the release of the air in the cylinders 177.

The air-cylinders 177 are also connected to a common air-supply pipe and are, together with the cylinders 173$^a$ for the control of the stitchers, under control of a single automatically-operated valve 180: A cam 181 which is secured to the end of the shaft 167 and normally in frictional contact with a control-rod 182 connected to the handle 180$^a$ of the valve 180, controls the opening and closing of the valve in a manner later to be described.

As the underbead stitching mechanism completes its operation, it advances a bayonet contact member 258, which is shown in Fig. 51, between a pair of insulated contact fingers 259 to complete a circuit for starting the operation of the overbead stitching mechanism.

A sprocket 183, which is keyed to the forward end of the shaft 167, is connected to the main drive (presently to be herein described) of the machine by a sprocket-chain, and will be explained in detail in connection with the description of the main drive at a later point. The shaft 167 has secured thereon a circular-cam 184 having a notched-out portion 184$^a$ upon its periphery and is adapted to actuate an electric-oil switch 184$^b$, carried by the supports, to automatically arrest the operation of the shaft 167. The oil switch 184ᵇ is similar in detail to the previously described switch 98. As in units B, C, D, E and G, there is an associated core-supporting and rotating mechanism operating in a manner similar to that of those units.

(9.) *Fourth fabric-supply unit I.*—Here, the cores (having again come to rest) receive the fourth and last ply of fabric (in the case of a four-ply tire) in a manner identical with that performed by units B, D and G; this being so, no further description thereof is needed. It may be stated, however, that there is associated with this unit a core-supporting and rotating mechanism, such as was described in connection with unit B, for instance.

(10.) *Fourth-ply underbead-stitching unit J.*—In connection with this unit J, it might be well here to state that, although I have illustrated and will describe this unit as only performing the initial operation of stitching the fabric down to the heels of the beads, thus performing an underbead-stitching operation only. I wish it to be understood that this unit might also include the overbead-stitching mechanism of unit H, as well as the trimming-mechanism, to be described later in connection with unit K, as well as any other combination of these mechanisms that may be desired.

The mechanism of this unit J is preferably constructed substantially similar to and operates approximately the same as units C and E and, likewise, similar to the lower or underbead stitcher-mechanism of unit H, with the exception that in lieu of its stitching over the heel of the bead, as in unit H, the stitching-operation stops at the heel and the stitching devices then return to their initial position. It also includes the hereinbefore described core-supporting and rotating mechanism. The carcass is then ready to be conveyed to unit K for an overbead stitching and trimming operation:

(11.) *Fourth-ply overbead-stitching and trimming unit K.*—This unit includes a pair of standards 41 and 42, (similar to those of the other units), a superstructure 41ˣ for supporting an overbead-stitching mechanism 41ʳ similar in construction and operation to that of unit G with a slight variation (to be mentioned later), and an automatic trimming mechanism: In this instance, it is to be noted, in connection with the stitching structure, the stitcher-supporting slides 164 are not controlled in their inward and outward movements by air-cylinders like the cylinders 177 operating in connection with the pitmen 165, as in unit H, but are controlled by the pitmen 165. Expansion-springs 165ᵃ are interposed between the connecting-bolts 175 and the ends of the pitmen and have the function, primarily, of relieving compression-strain when the stitcher-discs engage the core.

As already indicated, this unit K includes trimming mechanism, and the trimming elements thereof consist of a pair of knives 185 (Fig 22) which are mounted in the ends of a pair of bell-cranks 186 disposed upon each side of the path of travel of the tire-carcass and pivoted, as at 187, in a hollow casting 188 arranged between the standards and bolted or otherwise secured thereto. The opposite ends of the bell-cranks are pivotally connected to the ends of pistons 189 (Fig. 22) which operate in air-cylinders 190 that are secured to one side of the hollow casting 188 (Fig. 22). Cables 191 carrying weights at one end and fastened to the ends of the bell-cranks 186 constitute motors for operating the bell-cranks and play over pulleys 186ᵈ mounted in the casting and provide for a quick release of the knives from engagement with the carcass. Suitable limit or stop-bolts 186ᵇ and adjusting screws 186ᶜ are provided for limiting and varying the movement of this mechanism.

The air-cylinders 190 are both fed from a common supply that is indicated by 190ᵃ and is controlled by a valve 192. This valve is mounted upon the supporting-bracket for one side of the upper or overbead stitching mechanism and is controlled automatically by the following means: An arm 193, which is pivoted at its approximate center to the cross-bracket 168 of the supporting-structure, bears upon an actuating-handle 194 of the valve 192 at one end, and at its other end is in frictional contact with the lower surface of the circular cam 184. Springs 195, which are secured to the bracket, to the valve-handle, and to the cam-arm, keep the parts in correct operating relation at all times and serve also to return them to their inoperative positions after the trimming-operation is completed, as will be later described.

The carcass having now received its trimming operation, it is ready to be inspected. The foregoing description applies to a four-ply tire; but it is obvious that, for a tire of a larger number of plies, other fabric-supply units, together with stitching-units, may be interposed before the trimming-unit, whereby additional plies could be incorporated as desired.

The cores, after being inspected, are transferred by the conveyor-chains to suitable mechanism for finishing operation, and whereby appropriate finishing strips or stock may be applied, as required. In the present instance, I have shown mechanisms for finishing the tire, and these will hereinafter be described. It is deemed advisable to describe, now, the instrumentalities for driving the core-conveyor and the different units. This done, the finishing-units will be described.

(12.) *Unit and conveyor drive structure L.*—All of the units comprising this machine are, preferably and as shown, (Figs. 1, 3ᴬ, 3ᴮ, 3ᶜ, 8, 19 and 23) driven from a main drive-shaft 196 which is mounted in bearings 197 secured to main-base 10, in spaced relation and disposed adjacent the lower portions of the several supporting-standards 42. This shaft receives its power from any convenient source, preferably an electric-motor X connected to the shaft as by a sprocket 198, this being shown as a connecting link between the source of power and the drive-shaft 196, as an example of a simple and reliable drive for the core-conveyor and the several units:

Considering the various units as they appear, the first in order is unit B, this being the first fabric-supply unit: A sprocket 198 (Figs. 3ᴬ, 5, 6 and 9), which is secured to the power-shaft 196, transmits power to a countershaft 199 carried by suitable bearing-brackets 200 supported upon the base 10, by means of a sprocket chain 201. The countershaft 199 is broken in the middle and accommodates the component parts of a solenoid-clutch-and-brake mechanism 202, operated and controlled by the energization of electromagnet coils (not shown) in a manner presently to be described. A driving connection between the countershaft 199 and the spindle-driving gear 50 is effected by means of a sprocket-chain-and-gear device 203 (Fig. 6), from the countershaft to a worm-gearing 204, thence through a shaft 204ᵃ which carries a gear 205 mounted in the bracket 49 and which meshes with the gear 50, (Figs. 4, 5 and 6). A spring-pressed ratchet 206 mounted upon the shaft and engaging the gear 205 permits the spindle-shaft to be reversed if desired. By this structure, the core-chucks and their cores are rotated while in a position of rest at each of the fabric-supply units, B, D, G and I; and, each of these units has this structure associated with it for that purpose. The rotation of the spindle is controlled by a treadle switch of conventional design that is indicated by 260.

The next-driving structure that requires description is that for the first stitching unit C, and therein is a core-rotating mechanism which is characteristic of a core-rotating mechanism for each of the stitching units E and J and for the underbead-stitching mechanism of unit H. The core-rotating mechanism associated with each of these units consists of a construction similar to that just described in connection with the fabric-supply units, with the exception of the worm-gearing 204, which is replaced with a beveled gearing 207, (Figs. 7, 8 and 9). This is necessitated by the fact that, in the stitching operation, it is desirable to have the core revolve at a higher rate of speed; whereas, to apply one ply of fabric to the core, only one revolution thereof is needed.

In addition to the core-rotating mechanism, there is also a stitcher-driving mechanism associated with each of these units, and this mechanism is constructed as follows: The sprocket 97, carried by the shaft 96, Figs. 8, 11, 19, 23, 3ᴬ, 3ᴮ and 3ᶜ) is connected to a reducing gear mechanism 208 by a sprocket-chain 209. This gear mechanism is operated by the main driving-shaft 196 through a sprocket-and-chain connection 210. The magnetic clutch 93, which is energized simultaneously with the clutch 202 that controls the spindle-rotating mechanism, serves to operate the stitcher device. In Figs. 2ᴰ and 3ᴮ, I have illustrated the driving mechanism for the stitchers as being disposed on the side of the supporting standards opposite to that of the other units. This is necessitated by the fact that the main conveyor-chain-supporting-sprockets, together with their bearings, etc., are located adjacent the standards and preclude the placing of the stitcher-drive there except by elongating the conveyor-chains.

The driving-mechanism for the bead-setting unit has previously all been described in conjunction with the description of the unit itself, with the exception of the connection between the auxiliary-shaft 150 and the main power-shaft 196. This connection is effected by means of a sprocket 150ᵃ mounted upon the shaft 150 and which meshes with a sprocket-chain 211 entrained over a sprocket 211ᵃ keyed or otherwise secured to the drive-shaft 196 (Fig. 3ᴮ).

The underbead-stitcher-drive, together with the core-rotating mechanism, of the third stitching unit H has previously been described in connection with the corresponding structures associated with units C and E; and there remains, therefore, only the drive for over-bead-stitching mechanism to be described: The sprocket 183, carried by the shaft 167, is operated by a sprocket-chain 213 (Figs. 19 and 22) which receives motion through another sprocket 214 mounted upon the end of an auxiliary-shaft 215 supported from the bedplate 10. This shaft 215 is broken for the mounting of a solenoid-clutch 215ᵃ, which is automatically controlled by the previously described switch 257 in a manner later to be described in connection with the general operation of the machine. Power is imparted to the shaft 215 by a sprocket-chain-and-sprockets 216 connected to the reducing-mechanism of the under-bead-stitching mechanism 208.

The drive for the fourth overbead-stitching and trimming unit J corresponds to that of the third overbead-stitching unit H and, therefore, needs no further detailed description.

Any appropriate type of drive-structure may be employed to drive and control the movement of the core-conveyor; but I prefer to utilize that herein disclosed as being the most effective and conveniently manipulated. The three components of the core-conveyor, that is, the sections of chains thereof, are best driven from their forward ends and, for this purpose, I mount sprockets 218 upon one end of the shafts 29' which are supported by the standards 126$^c$ upon the base 10. A shaft 219 which extends from the extreme rear end of the machine to a position over the drive-end of the second conveyor-component is supported by bearings 219$^a$ (Fig. 1) secured to the standards of the units. Worm-gearing 220 which is connected at each end of the shaft is supported by suitable framework 221 in such a manner as to place sprockets 222, mounted upon the worm-gear-shaft, directly over the sprockets 218. Suitable chains 223 connect the sprockets 218 and 222. To drive the forward or first conveyor-component, I preferably mount a sprocket 30$^a$ upon the shaft 30 of the second conveyor-chain or component, and a corresponding sprocket 29$^a$ upon the shaft 29 of the first conveyor-chain or component, and connect the two sprockets by a chain 29$^b$ so that motion may be derived from the second chain to drive the first in synchronism therewith.

There now remains to describe the manner of connecting the shaft 219 to the main drive-shaft 196, and I preferably do so as follows: A supporting-structure section 10$^a$, comprising a section of the main base 10, has mounted thereon an auxiliary-shaft 224 which is connected to the main shaft 196 by sprockets and sprocket chains, designated as a whole as 225. This shaft 224 is broken to accommodate the respective components of a solenoid-clutch-and-brake-mechanism 226. The shaft 224, and also the shaft 219, is connected by means of sprockets and chain 227.

*Conveyor-controlling device.*—Mounted upon one side of the central conveyor-chain 25', at intervals, is a series of downwardly projecting pins 228, (Fig. 34). These pins are adapted alternately to engage a trip-switch 229 which is adjustably secured to one of the chain-supporting tracks 63. The object of this switch is to provide an automatic stop for the core-conveyor, and is operated in the following manner. The conveyor-components are first put in operation by the operator who presses a conveniently-located switch (presently to be described) which energizes a coil 226$^a$ of the solenoid clutch 226 and thereby places the shaft 224 in motion and, hence, the shaft 218. In turn the conveyor-components are thereby put in motion. The conveyor-chains continue to move forward until the next trip-pin 228 thereon encounters the trip 229, whereupon the solenoid-clutch is de-energized, the brake thrown in, and the chains stopped. The above operation is repeated for each movement of the conveyor-components to advance the chucks and cores from unit-station to unit-station.

The foregoing structure provides means for operating the core-conveyor to effect a positioning of one or more of the chucks and cores successively in relation to each of the several units and is, thus, a means for driving a conveyor-component from station to station. In that there is a drive which is common to the several components of the conveyor, these may be operated in proper synchronism. The trips provide means for controlling the travel of the floating chucks and cores successively and progressively from one unit-station to another, and whereby the conveyor is automatically and periodically brought to successive positions of rest and, thus, the travel of the conveyor is automatically arrested to bring several cores to positions of rest. Then, the various units are so disposed in relation to the positions of rest of the conveyor that they can be successively brought into each action for each core, all being simultaneously in operation for a plurality of cores floating through the machine. In other words, the different units are operatively associated and are preferably disposed in approximate alignment and at spaced-apart positions in respect to and parallel to the path of travel of the conveyor for the performance of a series of operations successively upon each of the several cores. These positions of the units I have herein variously referred to as "unit-stations", "work-stations", "rest-stations", "positions of rest", etc. With each of the second and third conveyor-components, there is preferably a plurality of the fabric-supplying or "pull-on" units, and with each fabric-supplying unit there is associated a stitcher-unit for stitching down the fabric applied thereby and operating in succession thereto. In addition, there is the bead-setting unit so disposed as to apply the beads automatically to opposite sides of the fabric-covered core but operating independently of the other units and being located between the second and third units and having associated with it a chuck-bridging or transferring structure to effect a transfer of the chucks from the second core-conveyor to the core-supporting and rotating mechanism of the setting-unit, and then from that mechanism to the third conveyor-component. Then, as already mentioned, there is associated with each of the units a means for temporarily sustaining each chuck and its core independently of the core-conveyor while the core is being operated on by the unit, such means including mechanism for rotating the core during the fabric-supplying, stitching and trimming operations. In addition, there is associated with these means and mechanisms an independently-operated device for throwing each of the units into and out of operation at the will of the operators as cores are presented to the units by the core-conveyor, this device being under the control of the operator of each station and independent of the operators at other of the stations. Thus, at each unit-station, there is a chuck-driving mechanism associated therewith for temporarily sustaining a core for rotary motion while the fabric is being applied and, then, stitched thereon. Common to the several chuck-rotating mechanisms is the driving-means for operating a plurality of them simultaneously whereby a plurality of plies may at the same time be applied to a plurality of cores and, also at the same time, a plurality of the applied plies be stitched down on other of the cores. This driving-means is not only common to the several chuck-rotating mechanisms but, also, to the conveyor-components so that as they operate in a progressive, step-by-step manner, the units are, successively to such progressive operation of these components, and while they are at rest, actuated to perform their respective functions. With the trimming unit is associated the core-rotating structure which is operable to trim fabric therefrom while the core is rotating; it is power-operated to effect its automatic action; and it preferably operates in succession to the final stitching-operation, to which end there is combined therewith means for automatically controlling the relative time of operation of the stitching and trimming mechanisms, the former operating while the core is in rotation and in advance of the action thereon of the trimming mechanism.

*Safety devices.*—Each of the units is provided with a safety-device whereby the electrical circuit which controls the operation of the conveyor-components is held open until all of the several units are in or restored to their inoperative or initial positions: To this end, all the units (except the bead-applying unit) have mounted upon one of their sliding-spindles, preferably the spindle 45, a cam-plate 230 which is in constant engagement with a rocker-arm 231. One end of this arm carries a roller 231$^a$ which plays in a cam-slot 230$^a$ in the plate, and the other end is flexibly connected to a switch-arm 232 of an oil-switch 233 (Figs. 4 and 39). The cam-slot is so designed that when the spindle is thrown into engagement with the chuck-shafts, the switch is operated and the circuit will thereby be opened to prevent an operator from prematurely placing the conveyor-chains in motion.

A safety treadle switch 234 (Fig. 37) for the bead-applying unit is located in the floor of the machine, between the supporting-standards and, when the operator steps forward to manually apply the beads to the bead-setting rings, he automatically opens the switch to interrupt the circuit for controlling the conveyor.

When the operator steps forward to manually apply the beads to the bead-setting rings, his weight on the treadle switch 234 opens the control circuit for the bead-setting mechanism to prevent its operation during such period of manual adjustment. This switch may also be employed to instantly arrest the operation of the unit F in cases of emergency.

There is also a safety-switch 235, (Figs. 32 and 33) located at the loading-end of the first-conveyor component, and it functions to prevent the operation of the conveyor until and unless there is a chuck and core disposed upon an inclined runway 236, ready to be picked up by the plates 35 of the chains. Here, the weight of the chuck and core upon the runway 236 causes the runway to tip and operate a switch 237, mounted underneath, which closes the circuit and permits the operator to actuate the solenoid provided, of course, that the other safety-switches are all closed.

An emergency push-button switch 238, which controls the movement of the conveyor components, is conveniently located within easy reach of each of the operators of the several manually controlled units in order that any operator may arrest the movement of the conveyor in cases of emergency.

*Turn table structure.*—A turn table structure 261, which is illustrated in Figs. 53, 54 and 64 of the drawings, is interposed between the carcass building and the carcass finishing components of the machine to automatically transfer the core-and-chuck units from one of the components to the other component of the machine in order that they may be returned to the point at which they were first delivered to the tire-building machine. The turn table is logically a portion of the conveyor mechanism since it is operated in synchronism therewith and functions to transport the core-and-chuck units from the final section of conveyor chain of the carcass-building component of the machine to the first conveyor chain of the carcass-finishing component of the machine.

The turn table has a base 262 upon which a table 263 is rotatably mounted and adapted to be driven in conventional manner from a shaft and gear mechanism 264 that is connected to the conveyor drive through the sprocket 265 and chain 266. The table 263 has a plurality of brackets 267 each of which is equipped with a pneumatically operated jaw 268 that operates to rotatably retain one end of the chuck shaft of the core-and-chuck unit to transport it from the carcass-building to the tire-finishing component of the machine.

The jaw 268 embodies an upper, relatively fixed bearing portion 269 and a reciprocable lower portion 270 that is actuated by an air cylinder 271. The supply of air to the cylinder 271 is controlled by a valve 272 through an arm 273 that is actuated by the weight of the core-and-chuck unit when it is delivered to the receiving jaw 268 from the final component of the carcass-building conveyor chain over the transfer arms 274. The transfer arms 274 are inclined a sufficient degree to permit of the automatic transfer of the core-and-chuck unit from the conveyor chain to the turn table structure. A second valve 279 automatically controls the release of air pressure from the corresponding cylinder 271 when the core-and-chuck unit reaches the position for delivery to the finishing component of the machine over the transfer arms 276.

Air pressure is supplied to the apparatus mounted on the rotatable table 263 through an air coupling 277 which embodies a stationary hollow stem $277^a$ that receives air pressure from a suitable supply pipe, and a manifold distributing cap $277^b$ that rotates with the table 263 to distribute air thereto. A suitable base $277^c$ serves to rigidly mount the stem $277^a$ on the turn table base 262.

The stem $277^a$ has an enlarged head $277^d$ that serves as a portion of a bearing on which the cap $277^b$ is journaled. Packing rings $277^e$ which have converging wedging surfaces that serve to confine suitable oil-saturated fibrous packing $277^f$, constitute a portion of the rotatable cap $277^b$. The packing rings are retained by fibre rings $277^g$ and lock nuts $277^h$. Oil is supplied to the packing $277^f$ through suitable oil ducts that are closed by lugs $277^x$. The cap $277^b$ has a removable top $277^h$. Air pressure is delivered to the rotatable table 263 through the ports $277^k$.

The valve 272 is mounted on the bracket 267 by a bracket arm 278 that also provides a pivotal mounting for the arm 273. Compressed air is supplied to the valve 272 from the air coupling 277 through a suitable port $272^a$. A second fluid connection conveys the air from the port $272^b$ of the valve 272 through the automatic release valve 279 and a pipe 280 to the air cylinder 271 that operates the movable portion 270 of the jaw 268. The air valve 272 is of conventional design embodying a spring-closed valve stem $272^c$ and an actuating pin $272^d$ that engages the arm 273.

The weight of the core-and-chuck unit depresses arm 273 of the valve 272 to admit air pressure to the actuating cylinder. This automatically causes the jaw 268 to grip the core-and-chuck unit during its transfer to the tire finishing component of the machine.

The air releasing valve 279, which is best shown in Figure 68, embodies a spring-closed valve $279^a$ that is operated by a pin $279^b$ to supply air from the port $279^c$, that connects with valve 272, to the cylinder 271 of the jaw through a chamber $279^d$. A normally spring-closed valve $279^e$ (Fig. 68) connects the chamber $279^d$ with an exhaust port $279^f$ when the valve actuating arm 281 drops to the position shown in the drawings. The actuating arm 281 is raised to open valve $279^a$ and close exhaust port $279^f$ by a cam surface $262^a$ (Fig. 64) that is a part of the base 262 and which terminates at the point where the core-and-chuck unit is released from the jaw 268 and which again engages the arm 281 to raise it just prior to the time when the jaw 268 picks up a core-and-chuck unit from the transfer arms 274.

The travel of the lower portion 270 of the jaw is so regulated that the core-and-chuck unit is securely held in the jaw, although sufficient clearance is allowed to permit an inspector to rotate the partially finished carcass to examine it before it is delivered to the tire finishing component of the machine.

The turn table is so connected to the carcass building portion of the conveyor chain by the gear and chain mechanism that one of the brackets 267 is presented at the delivering end of the arms 274 and to the receiving end of the transfer arms 276 with each movement of the conveyor chain from station to station.

*Finishing component of machine.*

The finishing component of the machine embodies machine elements M to Q inclusive that are shown in Figures 55, 56, 57, 69, 70 and 71, are similar in structure to the corresponding units of the carcass building component of the machine and are similarly driven.

The operatively associated machine elements M to Q inclusive, includes a chafing strip pull-on unit M; a breaker-strip-and-cushion pull-on unit N; a stitching unit O for properly molding the breaker-strip-and-cushion to the tire carcass; a tread-applying unit P; and a tread stitching and trimming unit Q. This component of the machine completes the assembly of the tire casing which is afterwards vulcanized.

The core-and-chuck units, on which the completed tire carcass is mounted, are received by the transfer arms 281 and are conveyed to the first unit of the finishing component of the machine by the conveyor chains. Manifestly, the function of the conveyor chains for the tire finishing component of the machine are the same as that of the corresponding chains of the carcass building component of the machine and are driven in synchronism therewith.

(13.) *Chafing strip pull-on unit M.*—The chafing strip pull-on unit M embodies a stock rack 282 from which chafing strips of any desired kind are supplied to a set of rolls 283 which stitch the strips to the carcass in a manner similar to the application of the fabric to the partially formed carcass.

The structure of this unit is substantially the same as that of the fabric pull-on units, such as unit C, and further description thereof is deemed not necessary.

The core-and-chuck unit is moved from the chafing strip pull-on unit M to the breaker-strip-and-cushion applying unit N by the conveyor chains.

(14.) *Breaker strip and gum cushion supply unit N.*—The breaker strip and gum cushion supply unit is of substantially the same structure as the fabric supply unit C and is controlled in a similar manner. The breaker strip and gum cushion is in the form of a strip that is applied to the tire carcass from the supply roll 284 by operating the core-and-chuck unit by a foot treadle switch 260 to effect the rotation of the partially formed tire casing. The breaker strip and gum cushion material is severed and the overlapped ends are joined by a conventional stitching operation in preparation for the succeeding stitcher operation that is performed by unit O.

(15.) *Breaker strip and cushion stitching unit O.*—This stitching unit is a counterpart of the fabric stitching unit E and is operated in a like manner and by a mechanism (including a core supporting and rotating structure) which corresponds to the mechanism employed with unit C. The detailed description previously given of unit C therefore applies with equal force to this unit.

(16.) *Tread setting unit P.*—After the breaker strip and gum cushion are stitched to conformity with the tire carcass, the core-and-chuck unit is transferred to a tread setting unit P over a pair of transfer arms 285 that correspond in detail of operation and structure to the arms 127 that are employed for a corresponding purpose with a bead setting unit F. Centering spindles 131, that are advanced and retracted by the operation of the hand lever 158 and the lever mechanism 131, correspond to the similarly numbered parts of unit F.

The tread setting unit P, which is illustrated in Figures 55, 56, 69, 70 and 71, embodies a reciprocable tread-expanding head 287 that is slidably mounted on a pedestal bearing 288 (Figs. 55 and 56) and is adapted to be advanced and retracted by a pair of rods 289 and their cooperating eccentrics 290 that are driven from the main driving shaft 196 through a magnetic clutch 291, in substantially the manner described for the bead setting rods 138 and eccentrics 139 previously described in relation to unit F.

The tread expanding head 287 embodies a spider member $287^a$ which supports a radial cylinder group $287^b$ and a plurality of cylinders $287^c$ that are arranged around the periphery of the spider and are adapted to operate tread stitcher wheels or pressure rolls 293.

The cylinder group $287^b$ supports a plurality of laterally extending fingers 292 that are radially advanced and retracted by a series of radial air cylinders each of which embodies a cylinder sleeve $287^d$ and a cooperating piston $292^a$. Each of the pistons $292^a$ is connected to a corresponding finger 292 and has a guide rod $292^b$ and a spring $292^c$ connected thereto to insure its proper operation. Each of the fingers 292 is also provided with a guide bracket $292^d$ that properly positions the tread band $11^a$ on the series of fingers 292. A supply pipe $287^e$ delivers compressed air to the actuating cylinders $287^c$ to control the radial advancement and retraction of the fingers 292.

A stop $287^f$, which is mounted on the spider $287^a$, serves to restrict the radial movement of the fingers 292 to an expansion of the tread band which is of a proper degree to permit the expanded tire tread band to be easily received over the tire carcass $11^b$.

Each of the series of tread stitcher wheels or pressure rolls 293, which are so mounted on the spider as to engage the tread band between pairs of the tread-band-receiving fingers 292, is carried by a bell crank arm 294 that is operated from a corresponding cylinder $294^a$. The bell crank arm 294 is pivotally mounted on an extension from the stop $287^f$ that is secured to the spider $287^a$ and is actuated from a piston 295 that reciprocates within the cylinder $294^a$. Air pressure is admitted to the cylinder $294^a$ from a supply pipe $294^b$.

The tread band may thus be expanded a sufficient degree to be received over the tire carcass $11^b$ by air pressure that is introduced into the series of cylinders $287^c$ by the operation of a suitably positioned hand valve 296.

A disc switch 298, which is shown in section in Figure 72, embodies a cylinder $298^a$ that supports a pair of stationary contact members $298^f$, and a piston $298^b$ which actuates a contact disc $298^c$ into engagement with the contact members $298^f$ when air is admitted to the cylinder. A cover $298^d$ serves to enclose the contact mechanism. An air pipe 298ᵉ connects with the pipe 287ᵉ in order that the switch will be closed when air pressure is admitted into the cylinders 287ᶜ of the tread expanding mechanism.

This arrangement prevents the advancement of the tread expanding head 287 when the tread band is not expanded a sufficient degree to pass over the periphery of the tire carcass 11ᵇ.

A cam-operated valve 297, which is controlled by a cam surface 290ᵃ on the eccentric 290 by means of which the valve is held open during the period that the eccentric is passing over its dead center position, controls the supply of air to cylinders 294ᵃ to actuate the pressure rolls 293. Compression springs (not shown), that are interposed between the rods 289 and the eccentrics 290, provide a considerable interval during which tread-setting head remains in its final advanced operating position. The tread-setting wheels 293 may, during this period, be forced against the surface of the tread band 11ᵃ. By this arrangement the operation of tread setting wheels 293 is automatically controlled during the advancement and retraction of the tread setting head 287 in such manner that it is only necessary for the operator to energize magnetic clutch 291 to advance the tread-setting head, to set the tread band on the tire carcass by pressure rolls 293, to retract the pressure rolls by the cam device 290ᵃ, and to withdraw the fingers 292 from under the band 11ᵃ by the retraction of the head 287 as the eccentrics return to their illustrated positions. The cams 290 make one complete rotation to complete this cycle of operation.

An interlocking switch 256 is mounted on the operating arm 158 that controls the advancement and retraction of the centering spindles 131 and an interlocking switch 300 is controlled by the transfer arms 285 in such manner that, when the transfer arms are down or in position to convey the core-and-chuck unit to the unit P, the circuit for energizing the clutch 291 is interrupted whereas, when the arms 285 are raised, the circuit for energizing the clutch 291 is completed through the interlock 300.

The remainder of the control circuit and switching mechanism for the unit P, including the treadle switch 260, the starting push button switch 340, the circuit interrupting cam switch 154 and the main circuit switch 317 is similar in detail to the correspondingly numbered devices described in conjunction with the bead setting unit F.

(17.) *Tread stitching and trimming unit Q*.—The tread stitching and trimming unit Q corresponds in detail to the unit K of the carcass building component of the machine, hence the preceding description of unit K is intended to include this unit.

This completes the description of the machines for assembling the component parts of a tire that may be subsequently vulcanized and cured in any desirable manner. The core and carcass may now be delivered directly to a conveying device which may transfer the core and carcass to an oven, leaving the chuck member to again traverse the tire building machine after it is provided with another core.

*Electrical control system for machine.*

This machine may be operated from a unitary source of power or may employ individual motors for driving the several elements of the machine or any groupment thereof. A single motor X is shown as driving the shaft 196 from which the various machine elements derive power through connections established by the magnetic clutches previously described.

The electrical control system may, for convenience of illustration and description, be divided into components that are common to all machines and are governed by a master operator who is stationed at unit B, or other convenient location from which he may view the operation of the machine, and components that specifically relate to the machine elements except in so far as they are interlocked with and controlled by other components of the system.

The components of the control system that are common to all of the units include the main motor control, the circuit arrangement for controlling the movement of the chuck-and-core conveyor, and a system of signal lights for indicating to the master operator, the stage of operation of the respetice machine elements.

Although the circuits of these several components of the machine control system are separately shown, the apparatus associated with each unit is shown below the various headings in Fig. 52 in order that the positioning of the several pieces of apparatus and their relation to the system as a whole may more clearly be indicated.

In the machine units that employ duplicate systems of control, only one of the systems and its relation to the remaining equipment is shown.

Referring particularly to Figure 52 of the drawings, the main driving motor X is manually governed by a drum controller which gradually excludes a starting resistor 310 from the motor circuit in the usual manner employed with shunt wound motors, to connect the motor X to a main supply circuit 311 through a master switch 312. As previously described the motor X operates the main driving shaft 196.

The magnetic clutch and brake mechanisms are respectively controlled by electromagnet coils 226ᵃ, 202ᵃ, 93ᵃ, 151ᵃ and 215ᵃ which are energized from the main supply circuit 311 through double pole switches 312 to 317, inclusive. Each of the switches has an actuating coil 318 to 323 inclusive, and certain of the switches have holding-circuit interlocks 324 to 328, inclusive, for establishing retaining circuits for the corresponding switches when they are closed. The remaining structural elements, such as switches, interlocks and the like, have been previously described in relation to the machine element to which they appertain. Such apparatus is diagrammatically shown in the circuit diagram and is numbered in accordance with the apparatus represented. Further details of the circuits and the sequence of operation of the several switches will be hereinafter described in connection with the operation of the control system.

*Conveyor control system.*—The chuck-and-core conveyor is normally controlled by the master operator through a "start" push-button switch 329 and an automatically operated limit switch 229 that arrests the movement of the conveyor at predetermined points in its travel. An emergency "stop" push-button switch 330, which is under the control of the master operator for arresting the movement of the conveyor at intermediate points of travel, and the set of emergency push-button switches 238 are connected in series relation with the actuating coil 318 of the switch 312. One of the emergency switches 238 is positioned within easy reach of each machine element operator and at the respective turn-tables for arresting or preventing the movement of the conveyor during emergency conditions. The interlocking switches 233 are also included in the circuit with the switches 238 to prevent the operation of the conveyor when the machine spindles are in other than their retracted positions. The interlock switch 229 is connected in this circuit to prevent operation of the conveyor unless a core member is placed in receiving position at the beginning of unit A.

*System of signal lamps.*—Each of the manually controlled units has a switch for energizing a lamp that is located in the station of the master operator. A three-way wiring system is employed in order that the machine element operator may indicate to the master operator that the particular machine element at which he is stationed has completed its cycle of operation, and in order that the master operator may deenergize the bank of lamps located in his station and a series of lamps, one of which is placed at each machine, to indicate to the machine element operator that the conveyor is about to be moved. Each machine element operator has within convenient reach, a three-way switch 331, the common contact member of which is connected through a lamp 332, located at the particular machine unit, to a second lamp 333 that is placed in the station of the master operator. The remaining pair of contact members of the three-way switch are respectively connected to a pair of conductors 334, one of which is energized in accordance with the position of a three-way switch 335 that is controlled by the master operator.

With this system, when the machine element operator actuates the switch 331 to one of its closed positions, as indicated by the dotted outline thereof, the lamps 332 and 333 are energized through the three-way switch 335 that is controlled by the master operator and which is assumed to be in the position indicated. When the bank of signal lamps indicates that every machine-element operator is awaiting the movement of the conveyor to advance each core-and-chuck unit a step in the cycle of operation, the master operator throws the switch 335 to its remaining closed position which deenergizes both the bank of lamps at the central control station and the lamps located at the individual machines. The signalling operation is again performed in substantially the same manner by throwing the respective switches 331 to their other closed positions.

Each of the automatically operated machine elements energizes a lamp 336 through the auxiliary contact fingers 253 of the cam-operated switches 98 and 184$^b$, to indicate completed operations.

*Control system for fabric supply units B, D, G, I, M and N.*—Each of the above noted fabric supply units employs a magnetic clutch 202 that is energized from the coil 202$^a$ as previously described. The clutch is closed so long as the treadle switch 260 is depressed. In this way the operator has complete control of the rotation of the core-and-chuck.

Each automatic machine element is under the supervision of the operator of the immediately preceding manually controlled machine element. For this purpose an emergency push button switch 337, which is connected in the circuit of the succeeding automatic unit in a manner presently to be described, is mounted within convenient reach of the fabric-supply-unit operator in order that he may instantly arrest operation of the succeeding automatic machine element in cases requiring such action. Each of the fabric-supply units also has an indicating switch 331 for signaling the master operator when his machine has completed its cycle and an emergency push button switch 238 for arresting movement of the conveyor. Since each of the units B, D, G, I, M and N has a corresponding system of control it is deemed sufficient to describe the control system for one of these units.

*Control system for stitching units C, E, H, J, K, O and Q.*—Each of the above designated machine elements is automatically controlled to stitch down the fabric applied by the preceding operation. The electromagnet coil 202ª, which controls the rotation of the chuck-engaging spindles, is connected in shunt with the coil 93ª that controls the operation of the stitching mechanism in order that the stitching of the fabric may begin simultaneously with the rotation of the core. The automatic operation of these mechanisms is initiated by a starting switch 242 that automatically completes the circuit for closing the switch 314 when the spindles of the machine element are advanced to engagement with the core-and-chuck unit.

The previously described automatic starting switch 242 is most clearly shown in Figures 45 and 46 of the drawings. The spindle operation establishes electrical contact between the contact sleeve 249 and contact member 247 to initiate operation of the automatic units as hereinbefore set forth.

After the switch 313 is closed, its interlock contactor 325 completes a holding circuit for the switch which extends through the cam switch 98. This circuit is maintained closed until the cam 99 rotates a sufficient degree to open the switch 98 and establish a signal circuit through the auxiliary contact fingers 253 to energize the signal lamp 336 which is located at the station of the master operator.

The circuit established by the switch 242 is maintained until the pin 243, which is mounted on the stitching member and advanced therewith, lifts the contact sleeve 249 from engagement with the contact member 247. The switch 242 is maintained open during the remainder of the operation by the latch 250 in the manner described.

Each of the units E, H, J, K, O and Q employs a corresponding system of control except that in the unit K the emergency push-button switch 337, which is shown as included in the circuit of the actuating coil 320 is made a portion of the equipment for the second preceding unit instead of the immediately preceding unit which is automatically controlled.

*Control system for underbead and overbead stitching unit H.*—The unit H embodies, in addition to the circuits just described, a system for controlling an overbead stitching mechanism that starts its operation immediately upon the completion of the underbead stitching operation. The previously described bayonet switch 257 temporarily completes a circuit for initially closing the switch 316 when the underbead stitching mechanism of the unit H finishes its operation. The electromagnet coil 215ª is thus energized to close the corresponding clutch 215 which initiates the operation of the overbead stitching mechanism.

The operation of the overbead stitcher continues until the notched cam 184 opens the switch 184ᵇ to interrupt the energizing circuit for actuating coil 322, and to establish a signal circuit through contact fingers 253 for indicating to the master operator that the unit H has completed its operation.

*Control system for the bead-applying unit F.*—The advancement and retraction of the bead-applying heads 135 of the machine element F is controlled by a push-button switch 339 that completes a circuit which includes the interlock 326 that is closed only when the arm 158 occupies its retracted position, the emergency treadle switch 234 that is illustrated in Fig. 37, and the actuating coil 321 of the switch 315 which controls the magnetic clutch 151. When the switch 315 closes, it establishes a holding circuit for the coil 321 through the interlock 326, the cam switch 154 and the emergency switch 234. The switch 315 is maintained closed until the bead applying heads are advanced to engagement with the carcass to impose a predetermined bonding pressure upon the beads that are being united with the partially formed carcass. When the bead setting heads advance to substantially their innermost positions, the cam 152 operates to arrest further movement of the bead-setting heads by opening the switch 154.

The beads are maintained under pressure until the "start" push-button switch 339 is again depressed to retract the bead-setting heads. This operation takes place in substantially the manner described for the advancement of the heads.

*Control system for tread applying unit P.*—The control system for the tread-applying machine element is very similar to the system for controlling the bead-setting unit F, the feature of difference being that the unit P employs an air actuated interlock 298 that completes the control circuit only when the tread expanding fingers properly hold the tread member in position for its application to the tire carcass unit. The remaining apparatus, which is similarly numbered, performs similar functions in both machine elements.

The treadle switch 234 is so positioned that when the operator steps forward to place the tread member over the receiving fingers on the expansion head, he automatically interrupts the circuit which controls the advance of the expansion head. This protects him from accidental operation of the machine when the tread member is being manually adjusted.

It is essential that the expansion head be operated to expand the tread member a sufficient degree to be received over the tire carcass before the expansion head is advanced to its depositing position. This expansion is effected by air pressure that is admitted to the several controlled cylinders and the advancing system is interlocked with this pneumatically operated mechanism by means of the interlock air disc 298 which is raised to engagement with a pair of contact members when air pressure is supplied to the expansion head. This arrangement prevents forward movement of the expansion head until the retaining fingers occupy their outermost positions.

It is also necessary that the tire carcass be properly positioned and held by the machine spindles before the expansion plate is advanced. Therefore, the lever 158, which manually controls the advancement and retraction of the spindles, has an interlock 256 that functions in the manner of the correspondingly numbered interlock described in relation to unit F.

The emergency treadle switch 234 is identical in both machine elements.

*Operation of complete machine.*

The complete operation of my machine may be most conveniently and clearly described by tracing the progress of a single core-and-chuck unit in its travel through the various stages of operation of the machine, it being understood, however, that the several components of the machine operate simultaneously to perform their individual functions on core-and-chuck units that are progressively and successively advanced through the several stages of operation.

In view of the relatively complete description that has been given of the various machine parts, the electrical control system and its associated apparatus, it is deemed necessary to explain only in a general way the operation of the several components of the system in order that their co-relation and sequence of operation may be clearly understood.

The core 11 is first assembled on the chuck 12 by means of the key shaft 22 which advances the chuck pins 14 to engagement with the internal periphery of the core 11. This unit, in its assembled relation, will be hereinafter referred to as a core-and-chuck unit.

The master operator closes the main line switch 312 to energize the electrical system of the machine. The main driving motor X, which operates the line shaft 196, is accelerated by gradually excluding portions of the resistor 310 from the motor circuit in the conventional manner. The various machine elements are driven from the line shaft 196 by connections established through the previously described magnetic clutches.

If it be assumed that the core-and-chuck unit, assembled as previously described, be placed upon the receiving treadle 236 of the unit "A" and the conveyor push button switch 329 depressed, the core-and-chuck unit will be engaged by the conveyor plates 35 and carried into the drying chamber 13 which is heated to a suitable temperature by the steam coils 37. At the entrance of the drying chamber the core 11 is given a coating of rubber cement, or other substance, to insure proper adhesion of the tire fabric to the core.

Since the conveyor of unit "A" constitutes a portion of the main conveyor system, opportunity will here be taken to explain the general operation of the conveyor system. As previously explained, the control circuit for actuating the magnetic clutch 226, which connects the conveyor driving shaft 29 to the line shaft 196, is interlocked with the various machine spindles by switches 233 that are closed when their corresponding spindles occupy their respective retracted positions. Thus it will be seen that the conveyor will not operate unless the interlocking switches 229 and 233, and the emergency push button switches 230 and 238, occupy their respective closed positions. When the push button switch 329 is momentarily depressed, it establishes an energizing circuit for the coil 318 of the conveyor controlling switch 312 which is maintained closed after the release of the switch 329 by a holding circuit that is completed by the switch interlock 324.

The operation of the conveyor continues until one of the depending pins 228, that are carried by the conveyor chain, engages the switch 229 to interrupt the above mentioned holding circuit and thus arrest further movement of the conveyor chain.

It is to be understood in this description of the operation of the machine that the term "conveyor" embraces all of the conveyor elements including the portion of the conveyor chain that traverses the drying oven 13 and the turn table operating mechanism that is advanced in synchronism with the step by step movement of the several conveyor chain units.

If it is assumed that an emergency arises which requires the instant arrest of the conveyor chain, either the master operator or any one of the operators of the component machine elements may depress an emergency push button switch 330 or 338 to instantly arrest further movement of the conveyor chain. In this manner absolute control of the movement of the conveyor chain is at all times provided.

The interval of time during which the core and its coating of cement is exposed to treatment in the drying chamber may be regulated by so designing the portion of the conveyor chain which traverses the drying chamber 13 as to maintain the core-and-chuck unit in the drying chamber for a desired number of successive operations of the main conveyor. In this manner various periods of treatment of the cemented core may be obtained.

The operation of the conveyor chain is so adjusted that it successively moves the core-and-chuck units carried thereby into correct operative relation with the successive machine elements.

Assuming that the core-and-chuck unit has been advanced to unit B by the conveyor, the machine element operator advances the machine spindles to engage the core-and-chuck shaft 19 in the manner illustrated and described in relation to Figs. 4, 4ᴀ and 5 of the drawings by operating the hand lever 58. Attention is invited to Fig. 4 of the drawings which shows the link connections that are operated by the hand lever 58 to advance and retract the machine spindles 44 and 45 when the lever 58 is actuated.

*Operation of fabric-supply unit B.*—The core-and-chuck unit is conveyed from the drying chamber 13 over the inclined rails 38 to engagement with the conveyor chains 25′ and 26′ that are associated with unit B. When the latter conveyor is moved by the master operator to advance the core-and-chuck unit to station B the unit operator advances the spindles 44 and 45 to engage the chuck shaft by actuating hand lever 58 in the manner described.

It is assumed at this point that the fabric supply turret 65 is provided with suitable tire fabric that is rolled upon the customary metal shells. The unit operator draws a sufficient length of fabric from supply rolls 64 to adjust the end of the first ply of fabric along the median peripheral line of the core where it is engaged by the tacky surface remaining from the application of the rubber cement that was partially dried in the chamber 13. The operator now depresses treadle switch 260 which affects the rotation of the core-and-chuck unit to draw a complete layer of fabric over the periphery of the core. The fabric strip is now severed and the ends of the fabric on the core are overlapped and united in a manner familiar to those skilled in the art. The tensioning equipment described in relation to Figs. 27 to 31 regulates the tension at which the fabric is supplied to the core and insures that a constant and uniform tension be imposed upon the fabric as it is applied to each successive core.

If, during the operation of this unit, the fabric of a single roll is exhausted, the operator may quickly bring a fresh supply of fabric into operative relation with the core by means of the latch mechanism 77 as previously described.

After the operator has properly placed a complete layer of fabric over the core he retracts the machine spindles 44 and 45 by moving the hand lever 58 in a reverse direction which releases the core-and-chuck unit from engagement with the machine spindles and places it in position for transfer to the next station by the conveyor chain. When the spindle 45 is retracted, it effects the closure of interlock switch 233 to complete the control circuit for the conveyor and permit of its operation when the remaining portions of the circuit for the conveyor control system are completed.

When the first layer of fabric is properly applied to the core 11 and the machine spindles retracted, the operator of unit B indicates to the master operator that he is awaiting movement of the conveyor chain by closing switch 331 in its indicated position. This energizes lamps 332 and 333 for the specified purpose.

When the panel of signal lamps indicates to the master operator that every machine has completed its individual function he extinguishes the signal lights by actuating switch 335 and depresses the push button switch 329 to advance the conveyor another step in its operation. The movement of the conveyor is automatically arrested by the limit switch 229 to position the core-and-chuck unit in operative relation with unit C in the manner described for the preceding unit B.

*Operation of first stitching unit C.*—The operator of unit B steps to the first stitching unit C and actuates the spindle-controlling hand lever 58 thereof to advance the spindles 87 of the unit C to engagement with the core-and-chuck unit after which he returns to unit B since further control of unit C is automatic.

The parts shown in dotted outline in Fig. 46 of the drawings show the relative position of the switching apparatus and the stitcher mechanism before the spindle 87 is advanced to engagement with the core-and-chuck unit. In this position the contact sleeve 249 is held out of engagement with the cooperating contact member 247 by the latch 250. When the spindle 87 is advanced to engage the core-and-chuck unit, it actuates the bell-crank 244 to the position shown in Fig. 45 of the drawings. This operation of the bell crank causes the pin 245 to force the sleeve 249 from engagement with the retaining latch 250 and establish electrical contact between members 247 and 249. A starting circuit is thus automatically completed for closing the switch 314 to effect the rotation of the core-and-chuck unit by energizing the magnetic clutch 202. The operation of the stitching mechanism is initiated by the simultaneous energization of the clutch 93 which connects the portions of the driving clutch 91 as illustrated in Figs. 11 and 45 of the drawings.

The crank arm 92 now slowly operates to lift the carriage 102 to advance the stitching wheels 107 radially over the periphery of the rotating tire carcass and to thus form the fabric that was applied by unit B to the contour of the core member. Locking pins 115 maintain the stitcher-discs 107 at the proper distance from the median line of the tread. After the carriage 102 has moved a sufficient distance to advance the stitcher discs 107 partially over the periphery of the tire carcass, the cam roller 118 travels over the cam surface 119ª to effect the retraction of the locking pins 115 and thus permit the stitcher discs 107 to maintain pressure against the tire fabric along the bead-receiving portion thereof since this portion of the tire demands a spacing of the discs that is less than the spacing required for the initial engagement of the discs with the tread surface of the tire. Thus it will be seen that the inner limitation to the mutual approach of the stitcher discs 107 is controlled by the adjustable stop bolts 115ª. These bolts also prevent clashing of the stitcher discs if, by reason of accident or mistake, the discs are advanced when no tire is engaged by the spindles of the machine.

When the stitcher discs 107 have advanced to the completion of their travel over the surface of the tire carcass, the air pressure that is introduced into cylinders 104 to maintain the stitcher discs in contact with the tire fabric is released by the actuation of the latch 120ᵇ which permits the weights 109 to retract the stitcher discs 107 in the manner previously described. The release of the arm 120ᵈ by the latch 120ᵇ is effected by the engagement of the adjusting nuts 112ᵉ with the eye 120ª of the actuating arm 120. The rotation of the crank arm 92 continues with the stitcher discs in their retracted positions until the notched portion of the cam 99 effects the opening of the control switch 314 to arrest further rotation of the core-and-chuck unit and to release the driving portion 91 of the shaft for the stitching mechanism.

The weight of the stitcher carriage 102 on the crank arm 92 returns the stitcher mechanism to its lowermost position as illustrated in Fig. 45. When the stitcher disc returns to its lowermost position the locking pins 115 are again advanced to their locking positions by the operation of the roller 118 in contact with the cam surface 119ª. Air pressure is again introduced into the cylinders 104 by the engagement of actuating pin 112ᶜ with the valve arm 120ᵈ as previously described.

As the stitcher mechanism advances toward its uppermost position, the pin 243 engages the contact disc 249 and again raises the disc to its uppermost position as shown in the full line views of Fig. 46. The disc 249 in its upward travel lifts the pin 245 which effects the retraction of the latch 251 into the hollow end of the bell-crank 244 and returns the crank to the position shown.

This maintains the interruption of the starting circuit until the spindles 87 are again advanced to engagement with the core-and-chuck unit.

When the switch 98 occupies its open position, the contact fingers 253 establish a signal circuit that energizes the lamp 336 in the cab of the master operator to indicate to him that the unit C has completed its operation.

The operator of unit B now retracts the spindles 87 of the unit C by actuating hand lever 58 in the manner previously described and the master operator advances the core-and-chuck units through another stage in their travel.

*Operation of second fabric supply unit C and second stitching unit E.*—The second ply of fabric is placed upon the tire carcass in a manner and by a mechanism identical with that described with reference to unit B and the fabric thus applied is stitched to conformity with the core by a second stitching unit E which is the same as the mechanism of unit C. Further description of the operation of these units is deemed not necessary.

*Operation of bead-applying unit F.*—Before the core member is advanced to unit F the operator of unit F manually adjusts a pair of bead rings to the bead-setting heads in preparation for their application to the partially completed carcass. During such manual adjustment of the bead rings the operator stands on treadle switch 234 which opens to prevent operation of the bead-setting heads through accident or mistake.

When the partially completed carcass reaches the end of the first section of the conveyor chain it is delivered to the unit F by the connecting arms 127 which occupy their horizontal positions when the core-and-chuck unit is being transferred from the conveyor chains 24' and 25' to the bead applying unit F. The operator of unit F now actuates hand lever 158 to engage the core-and-chuck unit between the centering spindles of the machine. This operation also raises the arms 127 and completes an interlocking circuit through switch 256 for the head-operating control switch 315.

The operator now depresses push button switch 339 which energizes clutch 151 to advance the bead applying heads 135 and force the bead rings into proper engagement with the tire carcass. The movement of the heads 135 is automatically arrested by the cam switch 154 when the bead-applying heads occupy the positions shown in Fig. 13 of the drawings.

After the bead rings have been subjected to pressure for a sufficient period of time to insure their proper union with the partially formed tire carcass, the operator again depresses push button switch 339 to retract the bead applying heads 135. The operation of the bead-applying heads is arrested when they occupy their retracted positions by the cam 152 in the manner described.

The operator of unit F now actuates hand lever 158 to release the core-and-chuck unit from the centering spindles of the bead-applying machine and to lower the arms 125 over which the core-and-chuck unit is transferred to the beginning of the third section of the conveyor chain.

The operator of unit F throws signal switch 331 to indicate to the master operator that unit F has completed its operation.

A signal switch, which is located at the beginning of the third section of conveyor chain, is depressed by the core-and-chuck unit when it arrives at the beginning of the conveyor chain to energize a signal lamp in the station of the master operator to indicate to him that a carcass is in position to be received by the third conveyor unit.

*Operation of fabric applying unit G and fabric stitching unit H.*—The carcass is advanced through stage G, the operation of which corresponds in detail to that described for unit B, and is then conveyed by the chains 24″ and 25″ to unit H where the layer of fabric applied by unit G is stitched to conformity with the contour of the carcass down to the bead rings in the manner described with relation to unit C and by similar mechanism.

When the underbead stitching mechanism has completed its stage in the stitching operation of unit H, it automatically starts the overbead stitching mechanism by temporarily establishing a circuit through switch 257. The clutch 215 is thereby energized to advance the overbead stitching unit to complete the stitching operation for the third layer of fabric.

The energization of the magnetic clutch 215 effects the rotation of shaft 167 to operate the opposed eccentrics 166ᵃ and thus advance the stitcher units 164 over the periphery of the tire carcass.

The stitcher units 164 are maintained in engagement with the tire carcass by air pressure introduced into cylinders 173 that is controlled from the valve 180 and by the cam 181 that is operated by shaft 167 in the manner described. The cam surface 181 admits air to the operating cylinders 167 of the stitcher discs when the discs are initially advanced to engagement with the tire carcass and is so timed that when the discs have finished their stitching operation the air pressure is released from the cylinders 167 to permit the weights 178 to retract the stitcher discs from engagement with the tire carcass. The operation of the shaft 167 continues until it is arrested by the operation of cam switch 184.

The switch 184, when in its open position, completes a signal circuit through contact fingers 253 that indicates to the master operator that unit H has completed its operation. The hand lever 158 of unit H is now actuated to release the core-and-chuck unit and permit its travel to the succeeding fabric-applying unit I.

*Operation of fabric-applying unit I and fabric-stitching unit J.*—The carcass is next advanced by the conveyor chain to unit I where the fourth layer of fabric is applied which is stitched down to the bead ring by the unit J in the manner described in relation to unit C.

*Operation of stitching and trimming unit K.*—The overbead stitching mechanism of unit K is started by the closing of switch 242 in substantially the manner described in relation to the stitching unit C. The operation of clutch 93 rotates shaft 167 to advance the stitcher discs in the manner described for the overbead stitching mechanism of unit H it being remembered at this point that the last layer of fabric that was applied by unit I has been stitched to the outer wall of the bead rings by the unit J. The cam 181 controls the admission of air pressure to the cylinders associated with the stitcher discs through the valve 180. The cam 184, which is also mounted on the shaft 167, actuates the valve 192, which is shown in Figs. 24 and 25, to supply compressed air to the trimming mechanism 190 when the stitching operation is completed. The trimming operation is of short duration and after a couple of revolutions of the core-and-chuck unit the valve 192 is closed to retract the trimming arms 185. The continued operation of shaft 167 actuates cam switch 98 to arrest further operation of unit K and to indicate to the master operator that the conveyor chain may be moved.

The core-and-chuck unit is engaged by the conveyor chain after completion of the operation of unit K and is delivered to the turn table 261 that constitutes a portion of the conveyor mechanism and which is operated in synchronism therewith. The weight of the core-and-chuck unit actuates arm 273 of the air valve to cause the jaw of the turn table bracket to grip the core-and-chuck unit during its conveyance from the carcass building portion of the machine to the carcass finishing portion of the machine. During this period of conveyance an inspector thoroughly examines the tire carcass to observe any irregularities in its construction and to insure the production of uniformly built tires.

This completes what is termed the "carcass building" stage in the operation of the machine and conditions the tire carcass for receiving the chafing strip, the breaker strip and cushion and tread member that is applied by the tire finishing units M to Q inclusive of the machine.

*Operation of turn table.*—When the stitching and trimming operation performed by unit K is completed, the core-and-chuck unit is delivered by the conveyor chain to the transfer arms 274 which in turn deliver the core-and-chuck unit to the jaw 268 of the turn table 261. As previously described, the jaw 268 closes a sufficient degree to rotatably hold the core-and-chuck unit in its travel from the carcass building component of the machine to the tire finishing component of the machine, thus permitting an inspector to make a thorough examination of the tire carcass in its partially finished form.

The turn table 261 carries the core-and-chuck unit in its step by step progress to the finishing component of the machine and delivers it to the transfer arms 281 over which it is carried by the slight inclination of the arms to the beginning of the conveyor chains for the tire finishing component of the machine. The conveyor chains deliver the core-and-chuck unit to the chafing strip applying unit M.

*Operation of chafing strip applying unit M, breaker strip and cushion applying unit N, and stitching unit O.*—The pull-on operations of the chafing strip applying unit and the breaker strip and cushion applying units M and N is substantially the same as the corresponding operations described in relation to unit B of the carcass building component of the machine which supplies fabric instead of the chafing strips and the breaker-strip-and-cushion to the tire.

The core-and-chuck unit moves successively through machines M and N, where the chafing strips and the breaker-strip-and-cushion are put on in the manner described, to machine O which stitches these parts to the tire carcass. The core-and-chuck unit is next delivered by the conveyor chain to the transfer arms 285 of the tread applying unit P.

*Operation of tread-setting unit P.*—The core-and-chuck is centered with relation to the unit P by the manual operation of hand lever 158 which advances the centering spindles 131 in a manner similar to that described for the bead-applying unit F. After the core-and-chuck unit is properly centered between the spindles, a tread band, which has been previously placed over the laterally extending fingers 292 of the head 287 is expanded by opening the valve 286 to radially advance each of the fingers a distance sufficient to admit the bead member over the partially completed tire carcass. This operation also closes interlocking switch 298.

After the fingers have been advanced to expand the tire, the head 287 is advanced over the tire carcass by depressing push button control switch 340 to operate the eccentrics 290. Since the expanding head is definitely limited in its travel, it positions the tread member accurately over the tire carcass in which position it is retained by the subsequent operation of the stitcher rolls 294. The second valve 297 is now automatically opened to force the stitching rolls 294 against the tread of the tire between adjacent fingers in such manner as to locally secure the tread member to the tire carcass in order that the fingers may subsequently be withdrawn leaving the tread band positioned on the tire carcass.

This machine is also equipped with a safety treadle switch 234, on which the operator stands while applying the tread band to the receiving fingers of the head, and interlock switches 256 and 300 that prevent the advancement of the head when the transfer arms are in their lowered position or before the core-and-chuck unit is properly centered by the advancement of the centering spindles 131.

From the tread applying unit the core-and-chuck unit is carried by the fourth section of the conveyor chain to the final stitching and trimming unit Q. The operation of this unit is substantially the same as that of the unit K of the carcass building machine and further description thereof is deemed not necessary.

The assembled tire casing and the core 11 is removed from the core-and-chuck unit and vulcanized to complete its manufacture. The chuck, with a replaced core is returned through the tire building machine where the replaced core serves as a mould on which another tire casing is built up.

*Modifications of tire building machine.*

Figure 53 of the drawings is a diagrammatic plan view of a modified form of tire building machine which incorporates, in addition to the previously described elements, a turn table 342 that is similar to the turn table 261, a modified form of spindle advancing and retracting mechanism that permits of the simultaneous control of the spindles of all of the machines by the master operator instead of by the machine element operators, and certain other features that will be hereinafter described.

*Spindle advancing and retracting mechanism.*—Figs. 58, 59 and 60 illustrate a modified form of spindle advancing and retracting mechanism which enables the master operator to simultaneously control the spindles of all of the units except the bead setting unit F and the tread applying unit P. With the system as hereinbefore described, each unit operator must not only give attention to the manual control of the spindles of his particular machine, but he must also advance and retract the spindles of the immediately succeeding automatic unit. This modified form of spindle controlling mechanism enables the master operator to control the spindles of all of the units, except as above noted, and thus permits the machine element operator to devote his entire attention to the specific operation on which he is employed.

In order to simplify the spindle controlling mechanism, the spindles of the carcass building component of the machine are operated from a master shaft 343 and the spindles of the tire finishing component of the machine are operated from a second master shaft. Both of the master shafts are driven from the main line shaft 196 through a pair of magnetic clutches 344 and 345 (only the energizing coil 345$^a$ of which is shown). The two clutches are controlled in a manner presently to be described, by a single push button switch 346 that is placed in the station of the master operator.

An eccentric mechanism 347, which is shown in detail in Fig. 60, serves to operate the spindle advancing and retracting mechanism that was formerly described as operated by the hand lever 58. In the modified form of control, the hand lever 58, which is shown in Figs. 4 and 5, is replaced by a spur-gear drive 348 and 349, an eccentric 350 that is mounted on gear wheel 349, a connecting rod 351 and a link 352 that connects the transverse shaft 59 and operating rod 60 of the spindle mechanism to the master shaft 343. The connecting rod 351 has a slidable head 353 that is forced outwardly against the head 354 by a compression spring 355.

The motion of the gear wheel 349 is automatically arrested at diametrically opposite points (one position being shown in the drawings) by a cam switch 356 that is similar in every respect to the previously described switch 154. A cam wheel 357 which is shown in Fig. 61 of the drawings, effects the operation of the switch 356 at the desired stages in the movement of the machine spindles. The cam 357 is connected to one of the gear wheels 349 by a shaft 358. One such switch 356 is required for each of the master shafts.

*Control system for spindle-operating mechanism.*—The electrical control system for effecting the operation of this modified spindle advancing and retracting mechanism is shown as a portion of Fig. 52 in which 344$^a$ and 345$^a$ respectively designate energizing coils of the clutches 344 and 345 which are adapted to be connected to the supply circuit through a pair of line switches 359 and 360. Each of the switches has an actuating coil 361 and 362 that is energized through the push button switch 346 and an interlock 363 and 364 that establishes a holding circuit for its respective switch in the conventional manner. The cam switches 356 effect the automatic opening of switches 359 and 360 when the machine spindles occupy their innermost and outermost positions as previously explained.

*Modified form of starting switch for automatic stitching units.*—Figs. 62 and 63 illustrate a modified form of switch 365 for automatically starting the rotation of the spindles and the operation of the stitching mechanism when the spindles are advanced to engagement with the core-and-chuck unit. The switch 365 is mounted on one of the brackets 62 of the stitching unit in such manner as to cooperate with a rod 366 that is carried by one of the spindle sleeves 46 and a pin 245 that is carried by the stitcher mechanism.

The switch 365 embodies a reciprocatable rod 367 of insulating material which has a pair of electrically connected contact segments 368 that cooperate with contact fingers 369 and 370 to establish a control circuit for the spindle rotating mechanism and the stitching mechanism. The rod 367 also has a lug 371 that cooperates with the contact finger 369 to maintain the rod in its uppermost position (as shown in dotted outline) so long as the rod 366 depresses the contact finger 369 to resilient engagement with the rod 367. The rod 367 is actuated against the action of spring 372 to its uppermost position by the pin 245 of the stitcher mechanism in the manner described for the switch 242. The spring 372 returns the rod 367 to its lowermost position when the rod 366 retracts to release the engagement of the finger 369 with the lug 371. The switch 365 is thus maintained open after one operation of the stitching mechanism and is returned to its normal position as shown in Fig. 62 after the release of the core-and-chuck unit by the spindles 87.

For certain installations of my tire building machine, it may be desirable to dispense with the use of the turn tables and arrange the carcass-building and tire-finishing components of the machine in alignment. This is a particularly desirable arrangement where a number of machines are to be installed.

The advantages that are to be derived from a machine of this general character are manifold. The continuous and rapid production of tire casings of a uniform quality by a comparatively few workmen greatly reduces the cost of manufacture of each tire casing and provides a product that is independent of the changeable and varied characteristics of the individual workmen. The operation of the machine is, to a greater degree than with previously designed machines, independent of changes in the quality and nature of the fabric or other materials used in the manufacture of the tire casings. Fewer workmen and men of less skill and of a lower order of intelligence are demanded for the operation of this machine, which particularly makes for reduced operating expense where there is a large labor turnover that necessitates the frequent training of new men for operating the various machines.

Although I have illustrated and described a form of machine embodying my invention as it has been reduced to practice, together with a few of the more important modifications, it is to be understood that this is illustrative only since obviously many other modifications of the machine and the arrangement of its parts may be employed without departing from the teachings of my invention. I desire, therefore, that only such limitations shall be imposed as are indicated by the spirit and scope of the appended claims in which it is my intention to claim the features of my invention as broadly as is permitted by the prior art.

What I claim is:

1. The herein described method of simultaneously building a plurality of tires which consists in progressively and successively mounting a series of tire-forming cores on a traveling conveyor; then mounting the cores independently of the conveyor and then simultaneously moving all of said cores, together, in an approximately rectilinear course and successively subjecting the cores of said series to fabric-supplying and stitching operations.

2. The herein described method of simultaneously building a plurality of tires which consists in progressively and successively mounting a series of tire-forming cores on a traveling conveyor; then mounting the cores independently of the conveyor; then simultaneously moving all of said cores, together, in an approximately rectilinear course and successively subjecting the cores of said series to fabric-supplying and stitching operations; and then successively applying a pair of bead-elements to the stitched fabric on each core.

3. The herein described method of simultaneously building a plurality of tires which consists in progressively and successively mounting a series of tire-forming cores on a traveling conveyor; then mounting the cores independently of the conveyor; then simultaneously moving all of said cores, together, in an approximately rectilinear course and successively subjecting the cores of said series to fabric-supplying and stitching operations; then successively applying a pair of bead-elements to the stitched fabric on each core; and then applying over the bead-carrying cores additional fabric.

4. The herein described method of simultaneously building a plurality of tires which consists in progressively mounting a series of tire-forming cores on a traveling conveyor; then mounting the cores independently of the conveyor; then simultaneously moving all of said cores, together, in an approximately rectilinear course and successively subjecting the cores of said series to fabric-supplying and stitching operations; then successively applying a pair of bead-elements to the stitched fabric on each core; then applying over the bead-carrying cores additional fabric and subjecting the same to stitching operations to stitch the fabric above, about and below the bead-elements; then trimming surplus fabric therefrom; and finally effecting thereon certain finishing operations; the specified operations being all effected in a machine in which the various operating elements are operatively associated for successive action.

5. The herein described method of simultaneously building a plurality of tires which consists in progressively and successively mounting a series of tire-forming cores on a traveling conveyor; then mounting the cores independently of the conveyor; then simultaneously moving all of said cores, together, in an approximately rectilinear course and successively subjecting the cores of said series to fabric-supplying and stitching operations; then successively applying a pair of bead-elements to the stitched fabric on each core; then applying over the bead-carrying cores additional fabric and successively subjecting the same to stitching operations to stitch the fabric above, about and below the bead-elements; then trimming surplus fabric therefrom; and finally effecting thereon certain finishing operations; the specified operations being all effected in a machine in which the various operating elements are operatively associated for successive action and whereby a plurality of tires may be treated simultaneously.

6. The herein described method of simultaneously building a plurality of tires which consists in progressively and successively mounting a series of tire-forming cores on a traveling conveyor; then simultaneously moving all of said cores, together, in an approximately rectilinear course and bringing all of the cores to a condition of rest; then mounting the cores independently of the conveyor; then successively subjecting the cores of said series to fabric-supplying and stitching operations; then successively applying a pair of bead-elements to the stitched fabric on each core; then applying over the bead-carrying cores additional fabric and successively subjecting the same to stitching operations to stitch the fabric above, about and below the bead-elements; then trimming surplus fabric therefrom;

and finally effecting thereon certain finishing operations; the specified operations being all effected in a machine in which the various operating elements are operatively associated for successive action and whereby a plurality of tires may be treated simultaneously.

7. The herein described method of simultaneously building a plurality of tires which consists in successively setting a plurality of tire-forming cores in motion to effect their positioning from one point of rest to another; then simultaneously bringing the cores to a position of rest; then mounting the cores independently of the conveyor then effecting independent rotative movement of each core; and then superposing tire-fabric on each core while the same is in motion and successively stitching the same on the core.

8. The herein described method of simultaneously building a plurality of tires which consists in successively setting a plurality of tire-forming cores in motion to effect their positioning from one point of rest to another; then simultaneously bringing the cores to a position of rest; then mounting the cores independently of the conveyor then effecting independent rotative movement of each core; then superposing tire-fabric on each core while the same is in motion and successively stitching the same on the core; and then applying bead-elements to one of the cores while another is having fabric superposed thereon.

9. The herein described method of simultaneously building a plurality of tires which consists in successively setting a plurality of tire-forming cores in motion to effect their positioning from one point of rest to another; then simultaneously bringing the cores to a position of rest; then mounting the cores independently of the conveyor then effecting independent rotative movement of each core; then superposing tire-fabric on each core while the same is in motion and successively stitching the same on the core; then applying bead-elements to one of the cores while another is having fabric superposed thereon; and then stitching the superposed fabric on the bead-elements.

10. The herein described method of simultaneously building a plurality of tires which consists in successively setting a plurality of tire-forming cores in motion to effect their positioning from one point of rest to another; then simultaneously bringing the cores to a position of rest; then mounting the cores independently of the conveyor then effecting independent rotative movement of each core; then superposing tire-fabric on each core while the same is in motion and successively stitching the same on the core; then applying bead-elements to one of the cores while another is having fabric superposed thereon; then stitching the superposed fabric on the bead-elements; and then trimming the cores successively.

11. A machine for building a plurality of tires at one time, including in combination, a plurality of tire-forming cores, a core-conveyor therefor, a series of fabric-supplying units disposed longitudinally of the straightaway path of travel of the conveyor, a series of fabric-stitching units similarly disposed and there being one stitching-unit for each supplying-unit, a bead-setting unit also similarly disposed, means for mounting the cores independently of the conveyor and in operative association with the units, and means for operating the conveyor to effect its movement in a rectilinear course and, thus, effect the positioning of tire-forming cores in relation to the different units.

12. A machine for building a plurality of tires at one time, including in combination, a plurality of tire-forming cores, a core-conveyor therefor, a series of fabric-supplying units disposed in approximate alignment longitudinally of the straightaway path of travel of the conveyor, a series of fabric-stitching units similarly disposed, a bead-setting unit also similarly disposed, means for mounting the cores independently of the conveyor and in operative association with the units, and means for operating the conveyor to effect its movement in a rectilinear course and, thus, effect the positioning of tire-forming cores in relation to the different units.

13. A machine for building a plurality of tires at one time, including in combination, a shifting instrumentality, a series of fabric-supplying units disposed in approximate alignment longitudinally of the path of travel of the shifting instrumentality, a series of fabric-stitching units similarly disposed and there being one stitching-unit for each supplying-unit, a bead-setting unit also similarly disposed, means for mounting the cores independently of the conveyor and in operative association with the units, and means for operating the shifting instrumentality to effect its movement in a rectilinear course and, thus, effect the positioning of tire-forming cores in relation to the different units.

14. A machine for building a plurality of tires at one time, including in combination, a plurality of tire-forming cores, a core-conveyor therefor, a series of fabric-supplying units disposed in approximate alignment longitudinally of the path of travel of the conveyor, a series of fabric-stitching units similarly disposed and there being one stitching-unit for each supplying-unit, a bead-setting unit also similarly disposed, means for mounting the cores independently of the conveyor and in operative association with the units, and means for operating the conveyor to effect its movement in a rectilinear course, and thus, effect the positioning of tire-forming cores in relation to the different units.

15. A machine for building a plurality of tires at one time, including in combination, a plurality of tire-forming cores, a core-conveyor therefor for supporting and shifting a plurality of tire-forming cores simultaneously, a series of fabric-supplying units disposed in approximate alignment longitudinally of the path of travel of the conveyor, a series of fabric-stitching units similarly disposed and there being one stitching-unit for each supplying-unit, a bead-setting unit also similarly disposed, means for mounting the cores independently of the conveyor and in operative association with the units, and means for operating the conveyor to effect its movement in a rectilinear course, and thus, effect the positioning of tire-forming cores in relation to the different units.

16. A machine for building a plurality of tires at one time, including in combination, a core-conveyor for supporting and shifting a plurality of tire-forming cores simultaneously, a series of fabric-supplying units disposed in approximate alignment longitudinally of the path of travel of the conveyor, a series of fabric-stitching units similarly disposed and there being one stitching-unit for each supplying-unit, means juxtaposed to each of the fabric-supplying and stitching units and independent of the conveyor for temporarily sustaining each core while being acted upon by the unit, a bead-setting unit also similarly disposed, and means for operating the conveyor to effect its movement in a rectilinear course and, thus, effect the positioning of tire-forming cores in relation to the different units.

17. A machine for building a plurality of tires at one time, including in combination, a core-conveyor for supporting and shifting a plurality of tire-forming cores simultaneously, a series of fabric-supplying units disposed in approximate alignment longitudinally of the path of travel of the conveyor, a series of fabric-stitching units similarly disposed and there being one stitching-unit for each supplying unit, means juxtaposed to each of the fabric-supplying and stitching units and independent of the conveyor for temporarily sustaining each core while being acted upon by the unit, means for effecting rotative movement of each core while thus temporarily sustained, a bead-setting unit also similarly disposed, and means for operating the conveyor to effect its movement in a rectilinear course and, thus, effect the positioning of tire-forming cores in relation to the different units.

18. A machine for building a plurality of tires at one time, including in combination, a core-conveyor for supporting and shifting a plurality of tire-forming cores simultaneously, a series of fabric-supplying units disposed in approximate alignment longitudinally of the path of travel of the conveyor, a series of fabric-stitching units similarly disposed and there being one stitching-unit for each supplying unit, means juxtaposed to each of the fabric-supplying and stitching units and independent of the conveyor for temporarily sustaining each core while being acted upon by the unit, means for effecting rotative movement of each core while thus temporarily sustained, a bead-setting unit also similarly disposed, means juxtaposed to the bead-setting unit for temporarily sustaining each core when it is brought to a position of rest opposite thereto, and means for operating the conveyor to effect its movement and, thus, effect the positioning of tire-forming cores in relation to the different units.

19. A machine for building a plurality of tires at one time, including in combination, a core-conveyor for supporting and shifting a plurality of tire-forming cores simultaneously, a series of fabric-supplying units disposed in approximate alignment longitudinally of the path of travel of the conveyor, a series of fabric-stitching units similarly disposed and there being one stitching-unit for each supplying unit, means juxtaposed to each of the fabric-supplying and stitching units and independent of the conveyor for temporarily sustaining each core while being acted upon by the unit, means for effecting rotative movement of each core while thus temporarily sustained, a bead-setting unit also similarly disposed, means juxtaposed to the bead-setting unit for temporarily sustaining each core when it is brought to a position of rest opposite thereto, and means for operating the conveyor to effect its periodic movement and, thus, effect the positioning of tire-forming cores in relation to the different units.

20. A machine for building tires for vehicles and the like, including a core-conveyor for shifting a series of tires in an approximately straightaway course successively from point to point, a fabric-supplying unit disposed longitudinally of the path of travel of the conveyor, a stitching-unit juxtaposed to the path of travel of the conveyor and independent of the fabric-supplying unit and operative to act on each core moved by the conveyor in succession to the supplying of fabric thereto by the fabric-supplying unit and a core-sustaining device associated with each unit for mounting each core independent of the conveyor.

21. A machine for building tires for vehicles and the like, including a core-conveyor for shifting a series of tires in an approximately straightaway course successively from point to point, a fabric-supplying unit disposed longitudinally of the path of travel of the conveyor, a stitching-unit juxtaposed to the path of travel of the conveyor and independent of the fabric-supplying unit and operative to act on each core moved by the conveyor in succession to the supplying of fabric thereto by the fabric-supplying unit, a core-sustaining device associated with each unit for mounting each core independent of the conveyor, and a bead-setting structure also juxtaposed to the path of travel of the conveyor.

22. A machine for building tires for vehicles and the like, including a core-conveyor for shifting a series of tires in an approximately straightaway course successively from point to point, a fabric-supplying unit disposed longitudinally of the path of travel of the conveyor, a stitching-unit juxtaposed to the path of travel of the conveyor and independent of the fabric-supplying unit and operative to act on each core moved by the conveyor in succession to the supplying of fabric thereto by the fabric-supplying unit, a core-sustaining device associated with each unit for mounting each core independent of the conveyor, a bead-setting structure also juxtaposed to the path of travel of the conveyor, and a trimming unit similarly disposed in relation to the conveyor for trimming fabric from each core.

23. A machine for building a plurality of tires at one time, including in combination, a core-conveyor, a series of fabric-supplying units disposed longitudinally of the path of travel of the conveyor, a series of fabric-stitching units similarly disposed, a bead-setting unit also similarly disposed, means for mounting the cores independently of the conveyor and in operative association with the units, means for operating the conveyor to effect its movement in an approximately rectilinear course, and, thus, effect the positioning of tire-forming cores in relation to the different units, and means for actuating each of the fabric-supplying and stitching units simultaneously and as each core is juxtaposed in relation thereto successively.

24. A machine for building a plurality of tires at one time, including in combination, a core-conveyor, a fabric-supplying unit disposed longitudinally of the path of travel of the conveyor, a fabric-stitching unit similarly disposed, a bead-setting unit also similarly disposed, means for operating the conveyor to effect its movement and, thus, effect the positioning of tire-forming cores in relation to the different units, means for mounting each core independent of the conveyor, and means for actuating the fabric-supplying and stitching units simultaneously and as each core is juxtaposed in relation thereto successively.

25. A machine for building a plurality of tires at one time, including in combination, a core-conveyor, a series of fabric-supplying units disposed in approximate alignment and longitudinally of the path of travel of the conveyor, a series of fabric-stitching units similarly disposed, there being one for each supplying-unit, a bead-setting unit also similarly disposed, means for operating the conveyor to effect its movement and, thus, effect the positioning of tire-forming cores in relation to the different units, means for mounting each core independent of the conveyor, and means for actuating each of the fabric-supplying and stitching units simultaneously and as each core is juxtaposed in relation thereto successively.

26. A machine for building a plurality of tires at one time, including in combination, a core-conveyor, a series of fabric-supplying units disposed longitudinally of the path of travel of the conveyor, a series of fabric-stitching units similarly disposed a bead-setting unit also similarly disposed, means for operating the conveyor to effect its movement and, thus, effect the positioning of tire-forming cores in relation to the different units, means for mounting each core independent of the conveyor, and means for actuating each of the fabric-supplying and stitching units simultaneously and as each core is juxtaposed in relation thereto successively by traveling an approximately straight line.

27. A machine for building a plurality of tires at one time, including in combination, a core-conveyor, a fabric-supplying unit disposed longitudinally of the path of travel of the conveyor, a fabric-stitching unit similarly disposed, a bead-setting unit also similarly disposed, means for operating the conveyor to effect its movement and, thus, effect the positioning of tire-forming cores in relation to the different units, means for mounting each core independent of the conveyor, and means for actuating the fabric-supplying and stitching units simultaneously and as each core is juxtaposed in relation thereto successively, the action of said three units being successive as each core is presented thereto.

28. A machine for building a plurality of tires at one time, including in combination, a core-conveyor, a series of fabric-supplying units disposed in approximate alignment and longitudinally of the path of travel of the conveyor, a series of fabric-stitching units similarly disposed, there being one for each supplying-unit, a bead-setting unit also similarly disposed, means for operating the conveyor to effect its movement and, thus, effect the positioning of tire-forming cores in relation to the different units, means for mounting each core independent of the conveyor, and means for actuating each of the fabric-supplying and stitching units simultaneously and as each core is juxtaposed in relation thereto successively and simultaneously on a plurality of cores at any given moment.

29. A machine for building a plurality of tires at one time, including in combination, a core-conveyor for positioning tire-forming cores, a series of fabric-supplying units disposed longitudinally of the path of travel of the conveyor, a series of fabric-stitching units similarly disposed, a bead-setting unit also similarly disposed for applying bead-elements to each of the cores, means for operating the conveyor to effect its movement and, thus, effect the positioning of tire-forming cores in relation to the different units, means for mounting each core independent of the conveyor, means for actuating the several fabric-supplying and stitching units simultaneously so that each may become active on each core as it is juxtaposed in relation thereto successively, and means for actuating the bead-setting unit independently of the supplying and stitching units.

30. A machine for building a plurality of tires at one time, including in combination, a core-conveyor for positioning tire-forming cores, a series of fabric-supplying units disposed longitudinally of the path of travel of the conveyor, a series of fabric-stitching units similarly disposed, there being one for each supplying-unit, a bead-setting unit also similarly disposed for applying bead-elements to each of the cores, means for operating the conveyor to effect its movement and, thus, effect the positioning of tire-forming cores in relation to the different units, means for mounting each core independent of the conveyor, means for actuating the several fabric-supplying and stitching units simultaneously so that each may become active on each core as it is juxtaposed in relation thereto successively, and means for actuating the bead-setting unit independently of the supplying and stitching units.

31. A machine for building a plurality of tires at one time, including in combination, a core-conveyor for positioning tire-forming cores, a series of fabric-supplying units disposed longitudinally of the path of travel of the conveyor, a series of fabric-stitching units similarly disposed, there being one for each supplying-unit, a bead-setting unit also similarly disposed for applying bead-elements to each of the cores, means for operating the conveyor to effect its movement and, thus, effect the positioning of tire-forming cores in relation to the different units, means for mounting each core independent of the conveyor, means for actuating the several fabric-supplying and stitching units simultaneously so that each may become active on each core as it is juxtaposed in relation thereto successively, means for actuating the bead-setting unit independently of the supplying and stitching units, and means for superposing and stitching fabric on each core after action of the bead-setting unit to apply bead-elements thereto.

32. A machine for building a plurality of tires at one time, including in combination, a core-conveyor, a series of fabric-supplying units disposed longitudinally of the path of travel of the conveyor, a series of fabric-stitching units similarly disposed and one for each supplying-unit, a bead-setting unit also similarly disposed, means for operating the conveyor to effect its movement and, thus, effect the positioning of tire-forming cores thereon in relation to the different units, means for mounting each core independent of the conveyor, means for actuating each of the fabric-supplying and stitching units, means for actuating the bead-setting unit independently of the supplying and stitching units, and means for controlling the travel of the conveyor so that it cannot move unless and until the operation of the different units has been effected and completed.

33. A machine for building a plurality of tires at one time, including in combination, a core-conveyor, a series of fabric-supplying units disposed longitudinally of the path of travel of the conveyor, a series of fabric-stitching units similarly disposed, and one for each supplying-unit, a bead-setting unit also similarly disposed, means for operating the conveyor to effect its movement and, thus, effect the positioning of tire-forming cores thereon in relation to the different units, means for mounting each core independent of the conveyor, means for actuating each of the fabric-supplying and stitching units, means for actuating the bead-setting unit independently of the supplying and stitching units, and means for automatically controlling the travel of the conveyor so that it cannot move unless and until the operation of the different units has been effected and completed.

34. A machine for building tires and the like, including in combination a series of relatively stationary units disposed in spaced relation, a traveling core-supporting carrier movable in relation to the different units for simultaneously positioning a plurality of tire-forming cores successively in operative relation thereto, means associated with each station for mounting a core independently of the carrier when detached therefrom, and means for controlling movement of the carrier in respect to the different units.

35. A machine for building tires and the like, including in combination a series of relatively stationary units disposed in spaced relation, a traveling core-supporting carrier movable in relation to the different units for simultaneously positioning a plurality of tire-forming cores successively in operative relation thereto, means associated with each station for mounting a core independently of the carrier and detached therefrom, and means for automatically controlling movement of the carrier to bring it to rest when it shall have thereby been juxtaposed to certain of the units.

36. A machine for building tires, including in combination, a travelling core-transporting and positioning component, a series of fabric-supplying units disposed longitudinally of the path of travel of said component, a series of fabric-stitching units interposed between certain of the supplying units and longitudinally of the path of travel of the component, means for controlling the travel of the component whereby a series of tire-forming cores may be brought into operating position in relation to the respective units, a bead-setting unit interposed between two of the specified units, and a bridging or core-transferring structure juxtaposed to the bead-setting structure for transporting cores in respect thereto.

37. A tire-building machine for making a plurality of tires simultaneously including a supporting-structure; a series of fabric-supplying units sustained by the structure and thereby connected together in operative association; a series of stitching units, one associated with each fabric-supplying unit; a bead-setting unit associated with one set of the fabric-supplying and stitching units; and a core-conveying structure comprising core-sustaining link-elements adapted to travel in an approximately rectilinear course longitudinally over the supporting-structure to position a plurality of tire-forming cores successively in operative relation to each of the fabric supplying, stitching and bead-setting units.

38. A machine for simultaneously building a plurality of tires including, in combination, a supporting-structure, a core-transporting conveyor comprising core-sustaining link elements adapted to travel in an approximately rectilinear course thereover, a plurality of associated operating units mounted on the supporting-structure, and driving mechanism common to the conveyor and the units for operating the same, whereby a series of tire-forming cores are successively positioned by the conveyor in relation to each of the units for progressive operation thereby, first to apply one or more plies of fabric to each core, then to stitch the same about the core, then to apply bead-elements thereto, and then to apply additional fabric over the bead-elements.

39. A machine for simultaneously building a plurality of tires including, in combination, a supporting-structure, a core-transporting conveyor comprising core-sustaining link elements adapted to travel in an approximately rectilinear course thereover, a plurality of associated operating units mounted on the supporting-structure, and driving mechanism also mounted thereon and common to the conveyor and the units for operating the same, whereby a series of tire-forming cores are successively positioned by the conveyor in relation to each of the units for progressive operation thereby, first to apply one or more plies of fabric to each core, then to stitch the same about the core, then to apply bead-elements thereto, then to apply additional fabric over the bead-elements, and finally to trim off the surplus fabric.

40. A machine for simultaneously building a plurality of tires including, in combination, a supporting-structure, a core transporting conveyor comprising core-sustaining link elements adapted to travel in an approximately rectilinear course thereover, a plurality of associated operating units mounted on the supporting-structure and including a fabric-supplying component, a stitching-component, and a bead-applying component, and driving mechanism common to the conveyor and the units for operating the same, whereby a series of tire forming cores are successively positioned by the conveyor in relation to each of the units for progressive operation thereby, first to apply one or more plies of fabric to each core, then to stitch the same about the core, then to apply bead-elements thereto, and then to apply additional fabric over the bead-elements.

41. A machine for simultaneously building a plurality of tires including, in combination, a supporting-structure, a core-transporting conveyor comprising core-sustaining link elements adapted to travel in an approximately rectilinear course thereover, a plurality of associated operating units mounted on the supporting-structure and including a fabric-supplying component, a stitching-component, a bead-applying-component, and a trimming-component, and driving mechanism also mounted thereon and common to the conveyor and the units for operating the same, whereby a series of tire-forming cores are successively positioned by the conveyor in relation to each of the units for progressive operation thereby, first to apply one or more plies of fabric to each core, then to stitch the same about the core, then to apply bead-elements thereto, then to apply additional fabric over the bead-elements, and finally to trim off the surplus fabric.

42. A machine for simultaneously building a plurality of tires including, in combination, a supporting-structure, a core-transporting conveyor comprising core-sustaining link elements adapted to travel in an approximately rectilinear course thereover, a plurality of associated operating units mounted on the supporting-structure and including a bead-applying component, a plurality of fabric-supplying and stitching components at one side thereof, and a set of fabric-supplying and stitching-components at the opposite side of the bead-applying component, and driving mechanism also mounted thereon and common to the conveyor and the units for operating the same, whereby a series of tire-forming cores are successively positioned by the conveyor in relation to each of the units for progressive operation thereby, first to apply one or more plies of fabric to each core, then to stitch the same about the core, then to apply bead-elements thereto, then to apply additional fabric over the bead-elements, and finally to trim off the surplus fabric.

43. A machine for simultaneously building a plurality of tires including, in combination, a supporting-structure, a core-transporting conveyor comprising core-sustaining link elements adapted to travel in an approximately rectilinear course thereover, a plurality of associated operating units mounted on the supporting-structure and including a bead-applying component, a plurality of fabric-supplying and stitching components at one side thereof, a set of fabric-supplying and stitching-components, and a trimming component operatively associated with one of the stitching components, and driving mechanism also mounted thereon and common to the conveyor and the units for operating the same, whereby a series of tire-forming cores are successively positioned by the conveyor in relation to each of the units for progressive operation thereby, first to apply one or more plies of fabric to each core, then to stitch the same about the core, then to apply bead-elements thereto, then to apply additional fabric over the bead-elements, and finally to trim off the surplus fabric.

44. A machine for building tires including, in combination, a traveling core-transporting conveyor for positioning tire-forming cores, a fabric-supplying unit disposed in operating proximity to the path of travel of the conveyor, a stitching unit operatively associated with the fabric-supplying unit and also disposed in operating proximity to the conveyor, a bead-setting unit associated with the conveyor and the stitching unit for applying bead-elements to each core; means for mounting each core independently of the conveyor when it arrives in juxtaposition to the bead-setting unit and fabric-supplying and stitching units disposed parallel to the path of travel of the conveyor for operating on a core in succession to the application thereto of bead-elements.

45. A machine for building tires including, in combination, a traveling core-transporting conveyor, for positioning tire-forming cores, a fabric-supplying unit disposed in operating proximity to the path of travel of the conveyor, a stitching unit operatively associated with the fabric-supplying unit and also disposed in operating proximity to the conveyor, a bead-setting unit associated with the conveyor and the stitching unit for applying bead-elements to each core; means for mounting each core independently of the conveyor when it arrives in juxtaposition to the bead-setting unit fabric-supplying and stitching units disposed parallel to the path of travel of the conveyor for operating on a core in succession to the application thereto of bead-elements, and a stitching and trimming unit operatively associated with the conveyor and juxtaposed to the said last-mentioned fabric-supplying and stitching units.

46. A tire-building machine including a traveling core-transporting conveyor for effecting a positioning of a plurality of tire-forming cores; a fabric-supplying unit operatively associated with the conveyor for effecting application to each core, successively, of a tire-fabric; a stitching-unit also operatively associated with the conveyor and operating on each core, successively, to form fabric about each core after application thereto of the fabric by the fabric-supplying unit, a bead-applying unit also operatively associated with the conveyor and operating in succession to the aforementioned stitching-unit to apply a pair of bead-elements to opposite sides of the core; means for mounting each core independently of the conveyor when it arrives in juxtaposition to the bead-setting unit fabric-supplying and stitching mechanism for successively applying additional fabric to the then bead-carrying core and for stitching such fabric down upon the core; trimming mechanism also operatively associated with the conveyor and operating on each core in succession to action thereon of the aforementioned stitching-unit; driving mechanism common to the conveyor and to the specified units for effecting travel of the conveyor to position each core in respect to each unit, progressively; and means for controlling the travel of the conveyor so as to bring each core to a position of rest opposite one or another of the units for action thereby on the core.

47. A machine for building tires including in combination the following units, operatively associated, to-wit: a conveyor having a traveling movement; a core-loading unit; a fabric-supplying or pull-on unit; a fabric-stitching unit for effecting a forming action on the fabric applied to a core by the pull-on structure; a second fabric-supplying or pull-on unit for applying a second ply of fabric to each core; a stitching unit operatively associated therewith for forming a second ply about the core; a bead-applying unit associated with the stitching unit; a third fabric-supplying or pull-on unit for applying a third ply of fabric to the core; a stitching unit associated therewith; a fourth fabric-supplying or pull-on unit for applying a fourth ply of fabric to the core; a stitching unit associated therewith; a combined stitching and trimming unit associated with the aforementioned fourth stitching unit; and driving mechanism common to the conveyor and to said units for successively effecting action on each of several cores of the fabric-supplying, stitching and bead-applying units.

48. A machine for building tires including in combination the following units, operatively associated, to-wit; a conveyor; a core-loading and cementing unit; a fabric-supplying or pull-on unit; a fabric-stitching unit for effecting a forming action on the fabric applied to a core by the pull-on structure; a second fabric-supplying or pull-on unit for applying a second ply of fabric to each core; a stitching unit operatively associated therewith for forming a second ply about the core; a bead-applying unit associated with the stitching unit; a third fabric-supplying or pull-on unit for applying a third ply of fabric to the core; a stitching unit associated therewith; a fourth fabric-supplying or pull-on unit for applying a fourth ply of fabric to the core; a stitching unit associated therewith; a combined stitching and trimming unit associated with the aforementioned fourth stitching unit; and driving mechanism common to said units for successively effecting action on each of several cores of the fabric-supplying, stitching and bead-applying units.

49. A machine for building tires including in combination the following units, operatively associated, to-wit; a conveyor having a traveling movement; a core-loading and cementing unit; a fabric-supplying or pull-on unit; a fabric-stitching unit for effecting a forming action on the fabric applied to a core by the pull-on structure; a second fabric-supplying or pull-on unit for applying a second ply of fabric to each core; a stitching unit operatively associated therewith for forming a second ply about the core; a bead-applying unit associated with the stitching unit; a third fabric-supplying or pull-on unit for applying a third ply of fabric to the core; a stitching unit associated therewith; a fourth fabric-supplying or pull-on unit for applying a fourth ply of fabric to the core; a stitching unit associated therewith; a trimming unit associated with the aforementioned fourth stitching unit; and driving mechanism common to the conveyor and to said units for successively effecting action on each of several cores of the fabric-supplying, stitching and bead-applying units.

50. A machine for building tires including in combination the following units, operatively associated, to-wit; a conveyor having a traveling movement; a core-loading and cementing unit; a fabric-supplying or pull-on unit; a fabric-stitching unit for effecting a forming action on the fabric applied to a core by the pull-on structure; a second fabric-supplying or pull-on unit for applying a second ply of fabric to each core; a stitching unit operatively associated therewith for forming a second ply about the core; a bead-applying unit associated with the stitching unit; a third fabric-supplying or pull-on unit for applying a third ply of fabric to the core; a stitching unit associated therewith; a fourth fabric-supplying or pull-on unit for applying a fourth ply of fabric to the core; a stitching unit associated therewith; a combined stitching and trimming unit associated with the aforementioned fourth stitching unit; and driving mechanism common to the conveyor and to said units for successively effecting action on each of several cores of the fabric-supplying, stitching and bead-applying units.

51. A continuous tire-building machine including a core-transporting conveyor, a series of units operatively associated with each other and disposed longitudinally of the conveyor for the successive juxtaposing to each unit of a series of tire-forming cores, and mechanism for controlling the travel of the conveyor including means for bringing the conveyor and, thus, the series of cores to positions of rest opposite each unit, and a core-supporting device associated with each unit for temporarily mounting each core independently of the conveyor.

52. A continuous tire-building machine including a core-transporting conveyor, a series of units operatively associated with each other and disposed longitudinally of the conveyor for the successive juxtaposing to each unit of a series of tire-forming cores, and mechanism for controlling the travel of the conveyor including means for automatically bringing the conveyor and, thus, the series of cores to positions of rest opposite each unit, and a core-supporting device associated with each unit for temporarily mounting each core independently of the conveyor.

53. A continuous machine for building tires including in combination a core-transporting conveyor, a series of fabric-supplying and stitching units operatively associated with the conveyor and in relation to which units the conveyor is adapted to position a plurality of tire-forming cores, a bead-applying unit interposed between the associated fabric-supplying and stitching units, and means for controlling the travel of the conveyor to bring the same and, thus, the plurality of cores supported thereon to positions of rest opposite the fabric-supplying, stitching and bead-applying units, and a core-supporting device associated with each unit for temporarily mounting each core independently of the conveyor.

54. A continuous machine for building tires including in combination a core-transporting conveyor, a series of fabric-supplying and stitching units operatively associated with the conveyor and in relation to which units the conveyor is adapted to position a plurality of tire-forming cores, a bead-applying unit interposed between the associated fabric-supplying and stitching units, means for controlling the travel of the conveyor to bring the same and, thus, the plurality of cores supported thereon to positions of rest opposite the fabric-supplying, stitching and bead-applying units, and means associated with each of said units for supporting a core independently of the conveyor while each respective unit is in operation to perform its designed function.

55. A continuous machine for building tires including in combination a core-transporting conveyor, a series of fabric-supplying and stitching units operatively associated with the conveyor and in relation to which units the conveyor is adapted to position a plurality of tire-forming cores, a bead-applying unit interposed between the associated fabric-supplying and stitching units, means for controlling the travel of the conveyor to bring the same and, thus, the plurality of cores supported thereon to positions of rest opposite the fabric-supplying, stitching and bead-applying units, means associated with each of said units for supporting a core independently of the conveyor while each respective unit is in operation to perform its designed function, and means for effecting rotation of the cores while supported free of the conveyor opposite the fabric-supplying and stitching units.

56. A machine for building a plurality of tires simultaneously including a traveling core-transporting conveyor; a series of fabric-supplying units operatively associated with the conveyor and operable simultaneously to apply a plurality of plies of fabric to a plurality of cores; a series of fabric-stitching units operable to stitch the fabric onto a plurality of fabric-covered cores simultaneously; a head-setting unit for applying a pair of bead-elements at opposite sides of each core as an action successive to one of the stitching operations; fabric-supplying and stitching units for supplying and stitching the fabric about the bead-elements then on the fabric-covered core; a trimming-unit operatively associated with the conveyor for trimming surplus fabric from the respective cores as an action successive to the final stitching operation, and core-supporting means for mounting cores independently of the conveyor and in operative association with the units.

57. A continuous machine for building a complete tire by a series of successive and related actions including in combination, a traveling conveyor for simultaneously transporting a plurality of core-forming units; a series of fabric-supplying units operatively associated with the conveyor; stitching units operatively associated with the different fabric-supplying units; a bead-applying unit operatively associated with the conveyor for mounting bead-elements on opposite sides of each of the fabric-covered cores; fabric-supplying and stitching units for respectively applying fabric onto, and stitching the same down upon, each core successively as the latter is presented to each unit; means for controlling the travel of the conveyor for bringing each of a series of cores to a position of rest opposite the respective units for action on the cores by such units; a fabric-trimming unit associated with the conveyor for removing superfluous fabric from each core, and core-supporting means for mounting cores independently of the conveyor and in operative association with the units; whereby a series of tires are progressively built up during the continuous travel of a series of tire-forming cores through the machine.

58. A machine for simultaneously building a plurality of tires including a support, a core-conveyor traveling thereover and comprising a plurality of alined and associated components, means common to these components for simultaneously driving the same, and a single means for controlling the travel of the several components; in combination with a core-loading and cementing unit operatively associated with one of the conveyor-components, and a plurality of fabric-supplying and stitching units operatively associated with another of the conveyor-components.

59. A machine for simultaneously building a plurality of tires including a support, a core-conveyor traveling thereover and comprising a plurality of alined and associated components, and means common to these components for simultaneously driving the same; in combination with a core-loading and cementing unit operatively associated with one of the conveyor-components, a plurality of fabric-supplying and stitching units operatively associated with another of the conveyor-components, a bead-applying unit operating between two of the conveyor-components, and fabric-supplying and stitching units operatively associated with a third of the conveyor-components.

60. A machine for simultaneously building a plurality of tires including a support, a core-conveyor traveling thereover and comprising a plurality of alined and associated components, means common to these components for simultaneously driving the same, and a single means for controlling the travel of the several components: in combination with a core-loading and cementing unit operatively associated with one of the conveyor-components, a plurality of fabric-supplying and stitching units operatively associated with another of the conveyor-components, a bead-applying unit operating between two of the conveyor-components, and fabric-supplying and stitching units operatively associated with a third of the conveyor-components.

61. A machine for simultaneously building a plurality of tires including a support, a core-conveyor traveling thereover and comprising a plurality of alined and associated components, and means common to these components for simultaneously driving the same; in combination with a core-loading and cementing unit operatively associated with one of the conveyor-components, a plurality of fabric supplying and stitching units operatively associated with another of the conveyor-components, a bead-applying unit operating between two of the conveyor-components, fabric-supplying and stitching units operatively associated with a third of the conveyor-components, and fabric-trimming mechanism associated with one of the stitching units for removing surplus fabric from each of the cores as they successively are presented to the last of the stitching units.

62. A machine for simultaneously building a plurality of tires including a support, a core-conveyor traveling thereover and comprising a plurality of alined and associated components, means common to these components for simultaneously driving the same, and a single means for controlling the travel of the several components; in combination with a core-loading and cementing unit operatively associated with one of the conveyor-components, a plurality of fabric-supplying and stitching units operatively associated with another of the conveyor-components, a bead-applying unit operating between two of the conveyor-components, fabric-supplying and stitching units operatively associated with a third of the conveyor-components, and fabric-trimming mechanism associated with one of the stitching units for removing surplus fabric from each of the cores as they successively are presented to the last of the stitching units.

63. A machine for simultaneously building a plurality of tires including a support, a core-conveyor traveling thereover and comprising a plurality of alined and associated components, and means for controlling the travel of the several components; in combination with a core-loading and cementing unit operatively associated with one of the conveyor-components, a plurality of fabric-supplying units operatively associated with another of the conveyor-components, an underbead stitching-unit operatively associated with each of the fabric-supplying units, a bead-setting unit operatively interposed between two of the conveyor-components, a plurality of fabric-supplying units operatively associated with a third of the conveyor-components, an underbead and overbead stitching-unit associated with the first of the last-mentioned fabric-supplying units, an underbead stitching unit associated with another of the last-mentioned fabric-supplying units, and an overbead stitching and trimming unit associated with the last-mentioned underbead stitching unit.

64. A machine for simultaneously building a plurality of tires including a support, a core-conveyor traveling thereover and comprising a plurality of associated components, means common to these components for simultaneously driving the same, and single means for controlling the travel of the several components; in combination with a core-loading unit operatively associated with a plurality of fabric-supplying units operatively associated with another of the conveyor-components, and underbead stitching unit operatively associated with each of the fabric-supplying units, a bead-setting unit operatively interposed between two of the conveyor-components, a plurality of fabric-supplying units operatively associated with a third of the conveyor-components, an underbead and overbead stitching-unit associated with the first of the last-mentioned fabric-supplying units, an underbead stitching unit associated with another of the last-mentioned fabric-supplying units, and an overbead stitching and trimming unit associated with the last-mentioned underbead stitching unit.

65. A machine for simultaneously building a plurality of tires including a support, a core-conveyor traveling thereover and comprising a plurality of alined and associated components, means common to these components for simultaneously driving the same, and single means for controlling the travel of the several components; in combination with a core-loading and cementing unit operatively associated with one of the conveyor-components, a plurality of fabric-supplying units operatively associated with another of the conveyor-components, an underbead stitching unit operatively associated with each of the fabric-supplying units, a bead-setting unit operatively interposed between two of the conveyor-components, a plurality of fabric-supplying units operatively associated with a third of the conveyor-components, an underbead and overbead stitching-unit associated with the first of the last-mentioned fabric-supplying units, an underbead stitching unit associated with another of the last-mentioned fabric-supplying units, and an overbead stitching and trimming unit associated with the last-mentioned underbead stitching-unit.

66. A machine for building tires including a traveling core-conveyor, means for driving the same, means for automatically and periodically bringing the conveyor to successive positions of rest, a core-loading unit operatively associated with the core-conveyor, a plurality of fabric-supplying units disposed along the path of travel of the conveyor, an underbead stitching-unit operatively associated with each of the fabric-supplying units, a bead-setting unit disposed in the path of the travel of the conveyor and at a point beyond the last of the stitching-units, a plurality of fabric-supplying units disposed in the path of travel of the core-conveyor beyond the bead-setting unit, an underbead and overbead stitching-unit associated with the first of the last-mentioned fabric-supplying units, an underbead stitching-unit associated with another of the last-mentioned fabric-supplying units, and an overbead stitching unit associated with the last-mentioned underbead stitching-unit.

67. A machine for building tires including a traveling core-conveyor, means for driving the same, means for automatically and periodically bringing the conveyor to successive positions of rest, a core-loading and cementing unit operatively associated with the core-conveyor, a plurality of fabric-supplying units disposed along the path of travel of the conveyor, an underbead stitching-unit operatively associated with each of the fabric-supplying units, a bead-setting unit disposed in the path of travel of the conveyor, a plurality of fabric-supplying units disposed in the path of travel of the core-conveyor beyond the bead-setting unit, an underbead and overbead stitching unit associated with the first of the last-mentioned fabric-supplying units, an underbead stitching-unit associated with another of the last-mentioned fabric-supplying units, and an overbead stitching and trimming unit associated with the last-mentioned underbead stitching-unit.

68. A machine for building tires including a traveling core-conveyor, means for driving the same, means for automatically and periodically bringing the conveyor to successive positions of rest, a core-loading and cementing unit operatively associated with the core-conveyor, a plurality of fabric-supplying units disposed along the path of travel of the conveyor, an underbead stitching-unit operatively associated with each of the fabric-supplying units, a bead-setting unit disposed in the path of travel of the conveyor and at a point beyond the last of the stitching units, a plurality of fabric-supplying units disposed in the path of travel of the core-conveyor beyond the bead-setting unit, an underbead and overbead stitching unit associated with the first of the last-mentioned fabric-supplying units, an underbead stitching-unit associated with another of the last-mentioned fabric-supplying units, and an overbead stitching and trimming unit associated with the last-mentioned underbead stitching-unit.

69. A machine for simultaneously building a plurality of tires including a core-conveyor for simultaneously transporting a plurality of tire-making cores through the machine, a core-loading structure operatively associated therewith, a fabric-supplying unit for successively applying a first ply of fabric to each of the cores on the conveyor, a fabric-stitching unit associated therewith for forming the first ply of fabric on each of the cores successively, a second fabric-supplying unit disposed in the path of travel of the core-conveyor for applying a second ply of fabric successively to each of the cores, a second stitching-unit for forming the second ply on each of these cores, a bead-setting unit for applying a pair of bead-elements at opposite sides of the fabric-covered cores, a third fabric-supplying unit for applying a third ply of fabric on the bead-carrying cores, a fabric stitching-unit associated with the third fabric-supplying unit and including underbead and overbead stitching instrumentalities, a fourth fabric-supplying unit, a stitching-unit associated therewith for performing an underbead operation on each of the cores successively, and a fifth stitching-unit for performing an overbead stitching operation combined with a fabric-trimming mechanism for severing surplus fabric from each of the cores successively.

70. A machine for simultaneously building a plurality of tires including a supporting structure, a core-conveyor traveling thereover, means on the support for effecting travel of the conveyor over the support and thereby transporting a plurality of cores, means for automatically arresting the travel of the conveyor so as to bring each of the cores thereon to positions of rest, a plurality of fabric-supplying, stitching and bead-setting units disposed on the support opposite the positions of rest of the cores, means for controlling the travel of the conveyor, means on the support and in juxtaposition to the rest-positions of the cores for temporarily mounting such cores independently of the conveyor and in operative association with the units, and independent means for throwing each of said units into and out of operation at the will of an operator.

71. A machine for simultaneously building a plurality of tires including a supporting structure, a core-conveyor traveling thereover, means on the support for effecting travel of the conveyor over the support and thereby transporting a plurality of cores, means for automatically arresting the travel of the conveyor so as to bring each of the cores thereon to positions of rest, a plurality of fabric-supplying, stitching and bead-setting units disposed on the support opposite the positions of rest of the cores, a single means for at all times controlling the travel of the conveyor, means on the support and in juxtaposition to the rest-positions of the cores for temporarily mounting such cores independently of the conveyor and in operative association with the units, and independent means for throwing each of said units into and out of operation at the will of an operator.

72. A machine for simultaneously building a plurality of tires including a supporting structure, a core-conveyor traveling thereover, means on the support for effecting travel of the conveyor over the support and thereby transporting a plurality of cores, means for automatically arresting the travel of the conveyor so as to bring each of the cores thereon to positions of rest, a plurality of fabric-supplying, stitching and bead-setting units disposed on the support opposite the positions of rest of the cores, means for controlling the travel of the conveyor, means on the support and in juxtaposition to the rest-positions of the cores for temporarily mounting such cores independently of the conveyor and in operative association with the units, independent means for throwing each of said units into and out of operation at the will of an operator, and safety-mechanism associated with the conveyor for controlling the movement of the same until operations on all of the several units have been completed.

73. A machine for simultaneously building a plurality of tires including a supporting structure, a core-conveyor traveling thereover, means on the support for effecting travel of the conveyor over the support and thereby transporting a plurality of cores, means for automatically arresting the travel of the conveyor so as to bring each of the cores thereon to positions of rest, a plurality of fabric-supplying, stitching and bead-setting units disposed on the support opposite the positions of rest of the cores, a single means for controlling the travel of the conveyor, independent means for throwing each of said units into and out of operation at the will of an operator, safety-mechanism associated with the conveyor for controlling the movement of the same until operations on all of the several units have been completed, and a safety-controlling means juxtaposed to the bead-setting structure and operative on the conveyor-driving means.

74. A machine for simultaneously building a plurality of tires which includes, in coacting combination, a general supporting structure, a core-conveyor traveling thereover for transporting a plurality of tire-forming cores in a substantially horizontal plane, a core-loading unit associated with one end of the conveyor, a series of fabric-supplying units disposed in alignment along the path of travel of the conveyor and operative successively to superpose a plurality of plies of tire-fabric upon each core, an underbead stitching unit operative upon the first of the plies of fabric superposed on the cores, a bead-setting unit on the supporting structure and operable to apply to each of the cores, successively, a pair of beads, a second series of fabric-supplying units for superposing fabric upon the cores successively and over the beads previously applied thereto, and underbead and overbead stitching mechanism associated with the second series of fabric-supplying units for forming the fabric onto the cores and over the beads.

75. A machine for simultaneously building a plurality of tires which includes, in coacting combination, a general supporting structure, a core-conveyor traveling thereover for transporting a plurality of tire-forming cores in a substantially horizontal plane, a core-loading unit associated with one end of the conveyor, a series of fabric-supplying units disposed in alignment along the path of travel of the conveyor for successively superposing a plurality of plies of tire-fabric upon each core, an underbead stitching unit for operating upon the first of the plies of fabric superposed on the cores, a bead-setting unit on the supporting structure and operable to apply to each of the cores, successively, a pair of beads, a second series of fabric-supplying units for superposing fabric upon the core successively and over the beads applied thereto, underbead and overbead stitching-units associated with the second series of fabric-supplying units, and trimming-mechanism associated with one of the stitching-units for removing superfluous fabric from each of the cores.

76. A machine for simultaneously building a plurality of tires which includes, in coacting combination, a general supporting structure, a core-conveyor traveling thereover for transporting a plurality of tire-forming cores in a substantially horizontal plane, a core-loading unit associated with one end of the conveyor, a series of fabric supplying units disposed in alignment along the path of travel of the conveyor for successively superposing a plurality of plies of tire-fabric upon each core, underbead stitching-units operative upon the first plies of fabric superposed on each core, a bead-setting unit on the supporting structure and operable to apply to each of the cores, successively, a pair of beads, a second series of fabric-supplying units for superposing fabric upon the core successively and over the beads applied thereto, an underbead stitching-unit associated with the second series of fabric-supplying units for forming a ply of fabric onto a part of each core, and a second stitching-unit for forming the fabric over the beads.

77. A machine for simultaneously building a plurality of tires which includes, in coacting combination, a general supporting structure, a core-conveyor traveling thereover for transporting a plurality of tire-forming cores in a substantially horizontal plane, a core-loading unit associated with one end of the conveyor, a series of fabric-supplying units disposed in alignment along the path of travel of the conveyor for successively superposing a plurality of plies of tire-fabric upon each core, underbead stitching-units operative upon the first plies of fabric superposed on each core, a bead-setting unit on the supporting structure and operable to apply to each of the cores, successively, a pair of beads, a second series of fabric-supplying units for superposing fabric upon the core successively and over the beads applied thereto, an underbead stitching-unit associated with the second series of fabric-supplying units for forming a ply of fabric onto a part of each core, a second stitching-unit for forming the fabric over the beads, and fabric-trimming mechanism associated therewith.

78. A machine for simultaneously building a plurality of tires by successive operations and including a unit-support, a conveyor for simultaneously transporting a plurality of tire-forming cores over the support, means for arresting the conveyor periodically to bring portions thereof to positions of rest, a series of units disposed on the support in substantial alignment and parallel to the path of travel of the conveyor and constituting operating-stations opposite the aforementioned points of rest of the conveyor, means for effecting a traveling movement of the conveyor from station to station, means located at the operating-stations for mounting the cores independently of the conveyor, and safety-appliances active on the conveyor for maintaining it inactive at any of the operating stations while any of the units are in operation.

79. A machine for simultaneously building a plurality of tires by successive operations and including a unit-support, a conveyor for simultaneously transporting a plurality of tire-forming cores over the support, means for arresting the conveyor periodically to bring portions thereof to positions of rest, a series of units disposed on the support in substantial alignment and parallel to the path of travel of the conveyor and constituting operating-stations opposite the aforementioned points of rest of the conveyor, means for effecting a traveling movement of the conveyor from station to station, means located at the operating-stations for mounting the cores independently of the conveyor, safety-appliances active on the conveyor for maintaining it inactive at any of the operating-stations while any of the units are in operation, and means for setting said units into operation as cores are presented thereto by the conveyor.

80. A machine for simultaneously building a plurality of tires by successive operations and including a unit-support, a conveyor for simultaneously transporting a plurality of tire-forming cores over the support, means for arresting the conveyor periodically to bring portions thereof to positions of rest, a series of units disposed on the support in substantial alignment and parallel to the path of travel of the conveyor and constituting operating stations opposite the aforementioned points of rest of the conveyor, means for effecting a traveling movement of the conveyor from station to station, means located at the operating-stations for mounting the cores independently of the conveyor, safety appliances active on the conveyor for maintaining it inactive at any of the stations while any of the units are in operation, and means for setting said units into operation as cores are presented thereto by the conveyor, said means being under the control of each operator at each station and independent of the action of operators at the other units.

81. A machine for simultaneously making a plurality of tires which includes a unit-supporting-structure, a core-conveyor traveling thereover and including a plurality of components alined for effecting a movement of a series of cores from one end of the supporting structure to the other, a bead-setting unit interposed between two of the conveyor-components, a plurality of fabric-supplying units disposed on the support for superposing a plurality of plies of fabric successively on each of the cores, an underbead stitching-unit operatively associated with each of the fabric-supplying units, a plurality of fabric-supplying units operatively associated with the conveyor for superposing a plurality of plies of fabric on the core after beads have been applied thereto by the bead-setting structure, an underbead and overbead stitching unit associated therewith, an underbead stitching unit also associated therewith, a combined overbead stitching and trimming unit also associated with the conveyor, and means associated with the units for mounting the cores independently of the conveyor while being operated upon by said units, respectively.

82. A machine for simultaneously making a plurality of tires which includes a unit-supporting-structure, a core-conveyor traveling thereover and including a plurality of components alined for effecting a movement of a series of cores from one end of the supporting-structure to the other, a bead-setting unit interposed between two of the conveyor-components, a plurality of fabric-supplying units disposed on the support for superposing a plurality of plies of fabric successively on each of the cores, an underbead stitching-unit operatively associated with each of the fabric-supplying units, a plurality of fabric-supplying units operatively associated with the conveyor for superposing a plurality of plies of fabric on the core after beads have been applied thereto by the bead setting structure, an underbead and overbead stitching-unit associated therewith, an underbead stitching-unit also associated therewith, a combined overbead stitching and trimming unit also associated with the conveyor, means associated with the units for mounting the cores independently of the conveyor while being operated upon by said units, respectively, and safety appliances for controlling the travel of the conveyor to prevent movement of the same while any of the units are under operation.

83. A machine for simultaneously making a plurality of tires which includes a unit-supporting-structure, a core-conveyor traveling thereover and including a plurality of components alined for effecting a movement of a series of cores from one end of the supporting-structure to the other, a bead-setting unit interposed between two of the conveyor-components, a plurality of fabric-supplying units disposed on the support for superposing a plurality of plies of fabric successively on each of the cores, an underbead stitching-unit operatively associated with each of the fabric-supplying units, a plurality of fabric-supplying units operatively associated with the conveyor for superposing a plurality of plies of fabric on the core after beads have been applied thereto by the bead-setting unit, an underbead and overbead stitching-unit associated therewith, an underbead stitching unit also associated therewith, a combined overbead stitching and trimming unit also associated with the conveyor, means associated with the units for mounting the cores independently of the conveyor while being operated upon by said units, respectively, safety-appliances for controlling the travel of the conveyor to prevent movement of the same while any of the units are under operation, and means for effecting movement of the conveyor in a path of travel parallel to the positions of the units.

84. A machine for simultaneously building a plurality of tires including a supporting-structure, a conveyor for simultaneously transporting a series of cores through the machine, a core-loading and cementing unit, a fabric-supplying unit for applying the initial ply of fabric to the core, a fabric-stitching unit for forming the initial fabric ply on the core, a second fabric-supplying unit for superposing a second ply of fabric upon the aforementioned initial ply, a second stitching unit for forming the second ply of fabric, a bead-setting unit operatively associated with the second stitching unit, a third fabric-supplying unit for superposing a third ply of fabric onto the core, a third stitching unit for forming the third ply onto the second ply and over the beads thereon, a fourth supplying unit for superposing a fourth ply of fabric onto the third ply, an underbead stitching unit for forming the fourth ply, and an overhead stitching and trimming unit for forming the last ply of fabric about the beads thereon and for then severing surplus fabric therefrom.

85. A machine for simultaneously building a plurality of tires including a supporting-structure, a conveyor for simultaneously transporting a series of cores through the machine, a core-loading and cementing unit, a fabric-supplying unit for applying the initial ply of fabric to the core, a fabric-stitching unit for forming the initial fabric ply on the core, a second fabric-supplying unit for superposing a second ply of fabric upon the aforementioned initial ply, a second stitching unit for forming the second ply of fabric, a bead-setting unit operatively associated with the second stitching unit for applying beads to the core, a third fabric-supplying unit for superposing a third ply of fabric onto the core, a third stitching unit for forming the third ply onto the second ply and over the beads thereon, a fourth fabric-supplying unit for superposing a fourth ply of fabric onto the third ply, an underbead stitching unit for forming the fourth ply, an overbead stitching and trimming unit for forming the last ply of fabric about the beads thereon and for then severing surplus fabric therefrom, and a driving unit common to the conveyor and the several specified units.

86. A machine for simultaneously building a plurality of tires including a unit-support, a core-transporting conveyor traveling over the support, and a core-loading and cementing unit operatively associated with one end of the conveyor for first positioning each of a series of cores onto the conveyor and, then, for treating cement applied to the cores after they have been positioned on the conveyor.

87. A machine for simultaneously building a plurality of cores including a unit-support, a conveyor for simultaneously transporting a plurality of core chucks over the support, a series of operating units disposed on the support and parallel to the path of travel of the conveyor and constituting working stations, means for arresting the travel of the conveyor periodically to bring portions thereof to rest opposite said stations, and chuck-driving mechanism associated with each station and mounting each chuck independently of the conveyor for effecting rotary movement of each of the cores independently.

88. A machine for simultaneously building a plurality of cores including a unit-support, a conveyor for simultaneously transporting a plurality of core-chucks over the support, a series of operating units disposed on the support and parallel to the path of travel of the conveyor and constituting working stations, means for arresting the travel of the conveyor periodically to bring portions thereof to rest opposite said stations, chuck-driving mechanism associated with each station and mounting each chuck independently of the conveyor for effecting rotary movement of each of the cores independently, and means common to the conveyor and to the chuck-rotating mechanisms for effecting movement thereof, first of the conveyor to position the chucks opposite the stations and, then, of the chucks while the conveyor is at rest.

89. A machine for simultaneously building a plurality of tires including a unit-support, a core-transporting conveyor traveling over the support, and a core-loading and cementing unit operatively associated with one end of the conveyor for first positioning each of a series of cores onto the conveyor and, then, for treating cement applied to the cores after they have been positioned on the conveyor, said cementing unit including a cement-drying chamber straddling the conveyor and through which the latter travels.

90. A machine for simultaneously building a plurality of tires including a unit-support, a series of tire-making units disposed thereon in spaced relation and a core-conveyor for transporting tire-forming cores from unit to unit and comprising a pair of spaced-apart chains, sprockets for the conveyor-chains, shafts for supporting the sprockets, and standards by which these shafts are sustained.

91. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, shafts for supporting the sprockets, and standards by which these shafts are sustained; each chain comprising a series of flat links connected together.

92. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, and shafts for supporting the sprockets; each chain comprising a series of flat links connected together, flanged rollers journaled in the links at the points of their connection, and tracks upon which the rollers travel.

93. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, shafts for supporting the sprockets, and standards by which these shafts are sustained; each chain comprising a series of flat links connected together, flanged rollers journaled in the links at the points of their connection, and tracks upon which the rollers travel.

94. A machine for simultaneously building a plurality of tires including a unit-support, a series of tire-making units disposed thereon in spaced relation, and a core-conveyor for transporting tire-forming cores from unit to unit and comprising a pair of spaced apart chains, each chain comprising a series of flat links connected together, flanged rollers journaled in the links at the points of their connection, and core-gripping plates carried by certain of the links.

95. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, shafts for supporting the sprockets, and standards by which these shafts are sustained; each chain comprising a series of flat links connected together, flanged rollers journaled in the links at the points of their connection, and core-gripping plates carried by certain of the links.

96. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, shafts for supporting the sprockets, and standards by which these shafts are sustained; each chain comprising a series of flat links connected together, flanged rollers journaled in the links at the points of their connection, tracks upon which the rollers travel, and core-gripping plates carried by certain of the links.

97. A machine for simultaneously building a plurality of tires including a unit-support, a series of tire-making units disposed thereon in spaced relation, and a core-conveyor for transporting tire-forming cores from unit to unit and comprising a pair of spaced-apart chains, sprockets for the conveyor-chains, shafts for supporting the sprockets, and standards by which these shafts are sustained; each chain comprising a series of flat links connected together, flanged rollers journaled in the links at the points of their connection, tracks upon which the rollers travel, core-gripping plates carried by certain of the links, and means for actuating the sprocket-shafts for effecting movement of the conveyor-chains.

98. A machine for simultaneously building a plurality of tires including a unit-support, a core-conveyor traveling thereover for transporting a series of core-chucks from spaced-apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, means associated with the stations for mounting the core-chucks independently of the conveyor while being operated on by said units, and a core-rotating mechanism associated with the supplying-unit and mounted on the support and independent of and relatively stationary with respect to the conveyor.

99. A machine for simultaneously building a plurality of tires including a unit-support, a core-conveyor traveling thereover for transporting a series of core-chucks from spaced-apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, means associated with the stations for mounting the core-chucks independently of the conveyor while being operated on by said units, and a core-rotating mechanism associated with the supplying-unit and mounted on the support and independent of and relatively stationary with respect to the conveyor; said rotating mechanism including a pair of spindle-supporting standards mounted on the support, and a pair of chuck-engaging spindles supported in said standards.

100. A machine for simultaneously building a plurality of tires including a unit-support, a core-conveyor traveling thereover for transporting a series of core-chucks from spaced apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, and a core-rotating mechanism associated with the supplying-unit; said rotating mechanism including a pair of spindle-supporting standards mounted on the support, and a pair of chuck-engaging spindles supported in said standards, said spindles comprising a hollow actuating-cylinder and a driving-shaft.

101. A machine for simultaneously building a plurality of tires including a unit-support, a core-conveyor traveling thereover for transporting a series of core-chucks from spaced apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, and a core-rotating mechanism associated with the supplying-unit; said rotating mechanism including a pair of spindle-supporting standards mounted on the support, a pair of chuck-engaging spindles supported in said standards; said spindles comprising a hollow actuating-cylinder and a driving-shaft encompassed by the cylinder and slidable in conjunction therewith.

102. A machine for simultaneously building a plurality of tires including a unit-support, a core-conveyor traveling thereover for transporting a series of core-chucks from spaced apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, and a core-rotating mechanism associated with the supplying-unit; said rotating-mechanism including a pair of spindle-supporting standards mounted on the support, a pair of chuck-engaging spindles supported in said standards; said spindles comprising a hollow actuating-cylinder and a driving-shaft encompassed by the cylinder and slidable in conjunction therewith, said driving shaft being provided with chuck-receiving sockets to sustain the core-chucks.

103. A machine for simultaneously building a plurality of tires including a unit-support, a core-conveyor traveling thereover for transporting a series of core-chucks from spaced-apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, and a core-rotating mechanism associated with the supplying unit; said rotating-mechanism including a pair of spindle-supporting standards mounted on the support, a pair of chuck-engaging spindles supported in said standards; said spindles comprising a hollow actuating-cyclinder and a driving-shaft encompassed by the cylinder and slidable in conjunction therewith; and means connected to one of said driving-shafts for effecting rotation thereof and, thus, of the core-chuck supported by the spindles.

104. A machine for simultaneously building a plurality of tires including a unit-support, a core-conveyor traveling thereover for transporting a series of core-chucks from spaced-apart stations or positions of rest, and a series of units disposed at the stations in parallel relation to the path of travel of the conveyor, one of said units comprising a fabric-supplying unit, means for arresting the conveyor to bring a portion thereof to rest opposite the supplying-unit, and a core-rotating mechanism associated with the supplying-unit; said rotating-mechanism including a pair of spindle-supporting standards mounted on the support, a pair of chuck-engaging spindles supported in said standards; said spindles comprising a hollow actuating-cylinder and a driving-shaft encompassed by the cylinder and slidable in conjunction therewith, means connected to one of said driving-shafts for effecting rotation thereof and, thus, of the core-chuck supported by the spindles; the shaft-driving mechanism including a gear-wheel, a spacing-collar, a keyway formed in the shaft to permit sliding of the shaft in the gear, and means for driving said gear.

105. A machine for simultaneously building a plurality of tires including a unit-support, a core-conveyor traveling thereover for simultaneously transporting a series of core-chucks from one station on the support to another, operating-units disposed on the support in spaced-apart relation and opposite the stations on the support; one of said units comprising a fabric-supplying structure and including a core-rotating mechanism comprising standards, spindles therein and including a hollow actuating-cylinder and a driving-shaft encompassed thereby and slidable in conjunction therewith, and means for operating said spindles to engage or disengage the core-chucks including bell-cranks pivoted to the standards, a toggle connected to the bell-cranks, and an operating-handle connected to the toggle, whereby movement of the handle in either direction will cause both spindles to move inwardly or outwardly at the will of the operator.

106. A machine for simultaneously building a plurality of tires including a unit-support, a core-conveyor traveling thereover for simultaneously transporting a series of core-chucks from one station on the support to another, operating units disposed on the support in spaced-apart relation and opposite the stations on the support; one of said units comprising a fabric-supplying structure and including a core-rotating mechanism comprising a pair of spindle-supporting standards, spindles therein and including a hollow actuating cylinder and a driving-shaft encompassed thereby and slidable in conjunction therewith, and means for operating said spindles to engage or disengage the core-chucks including a toggle, and an operating-handle connected to the toggle, whereby movement of the handle in either direction will cause both spindles to move inwardly or outwardly at the will of the operator.

107. A machine for simultaneously building a plurality of tires including a unit-support, a core-conveyor traveling thereover for simultaneously transporting a series of core-chucks from one station on the support to another, operating units disposed on the support in spaced-apart relation and opposite the stations on the support; one of said units comprising a fabric-supplying structure and including a core rotating-mechanism comprising a pair of spindle-supporting standards, spindles therein and including a hollow actuating-cylinder and a driving-shaft encompassed thereby and slidable in conjunction thereby, and means for operating said spindles to engage or disengage the core-chucks including bell-cranks pivoted to the standards, each bell-crank being bifurcated for pivotal connection to each side of the spindles, a toggle connected to the bell-cranks, and an operating-handle connected to the toggle, whereby movement of the handle in either direction will cause both spindles to move inwardly or outwardly at the will of the operator.

108. A machine for simultaneously building a plurality of tires including, in combination, a unit-support, a core-conveyor traveling thereover for simultaneously transporting a series of cores from station to station on the support, means associated with the stations for temporarily mounting the cores independently of the conveyor, a series of operating units disposed at the stations on the support independently of and relatively stationary to the conveyor, one of said units constituting a fabric-supplying unit and including a supporting-standard, a rotatable roll-carrying turret on the standard, a pair of spaced A-shaped uprights upstanding from the turret, a bracket-supporting shaft extending between and through the uprights, a pendant bracket sustained by the shaft at opposite sides of the uprights, and a tension device supported in each bracket.

109. A machine for simultaneously building a plurality of tires including, in combination, a unit-support, a core-conveyor traveling thereover for simultaneously transporting a series of cores from station to station on the support, means associated with the stations for temporarily mounting the cores independently of the conveyor, a series of operating units disposed at the stations on the support independently of and relatively stationary to the conveyor, one of said units constituting a fabric-supplying unit and including a supporting-standard, a rotatable roll-carrying turret on the standard, a king-pin interposed between the turret and standard and constituting a pivot for the turret, a pair of spaced A-shaped uprights upstanding from the turret, a bracket-supporting shaft extending between and through the uprights, a pendant bracket sustained by the shaft at opposite sides of the uprights, idlers carried by the bracket, and a tension device supported in each bracket.

110. A machine for simultaneously building a plurality of tires including, in combination, a unit-support, a core-conveyor traveling thereover for simultaneously transporting a series of cores from station to station on the support, means associated with the stations for temporarily mounting the cores independently of the conveyor, a series of operating units disposed at the stations on the support independently of and relatively stationary to the conveyor, one of said units constituting a fabric-supplying unit and including a supporting-standard, a rotatable roll-carrying turret on the standard, a king-pin interposed between the turret and standard and constituting a pivot for the turret, a pair of spaced A-shaped uprights upstanding from the turret, a bracket-supporting shaft extending between and through the uprights, a pendant bracket sustained by the shaft at opposite sides of the uprights, idlers carried by the bracket, a tension-device supported in each bracket, and a stock-supporting shaft sustained by the upright in a plane above the bracket-supporting shaft.

111. A machine for simultaneously building a plurality of tires including, in combination, a unit-support, a core-conveyor traveling thereover for simultaneously transporting a series of cores from station to station on the support, a series of operating units disposed at the stations on the support, one of said units constituting a fabric-supplying unit and including a supporting-standard, a rotatable roll-carrying turret on the standard, a king-pin interposed between the turret and standard and constituting a pivot for the turret, a pair of spaced A-shaped uprights upstanding from the turret, a bracket-supporting shaft extending between and through the uprights, a pendant bracket sustained by the shaft at opposite sides of the uprights, idlers carried by the bracket, a tension-device supported in each bracket, said tension-device comprising a band-pulley, a tension-roll-shaft to which the pulley is keyed, a pair of semi-circular arms engaging the pulley, a link connecting the arm at one end and an adjusting-device for connecting the other ends and including an expansion-spring, a bolt extending between the arms and encompassed by the spring, and an eccentric yoke connected to the bolt and one of the arms to provide for a quick release or engagement of the arms with the pulley.

112. A machine for simultaneously building a plurality of tires including a unit-support, a series of units disposed on the support in spaced relation, a core-conveyor for simultaneously transporting a series of cores over the support and from unit to unit; means associated with the units for temporarily mounting the tire-forming cores in juxtaposition thereto and independently of the conveyor; one of said units constituting a fabric-supplying structure comprising a standard secured to the support, a turret rotatably mounted on the standard, a plurality of sources of fabric-supply sustained by the turret, and a selective controlling device whereby the operator may throw one supply out of action, after depletion of its stock, and bring into action a fresh supply thereof; said controlling device comprising a latch-mechanism mounted on the standard.

113. A machine for simultaneously building a plurality of tires including a unit-support, a series of units disposed on the support in spaced relation, a core-conveyor for simultaneously transporting a series of cores over the support and from unit to unit; means associated with the units for temporarily mounting the tire-forming cores in juxtaposition thereto and independently of the conveyor; one of said units constituting a fabric-supplying structure comprising a standard secured to the support, a turret rotatably mounted on the standard, a plurality of sources of fabric-supply sustained by the turret, and a selective controlling device whereby the operator may throw one supply out of action, after depletion of its stock, and bring into action a fresh supply thereof; said controlling device comprising a latch-mechanism mounted on the standard and comprising a handle, a train of elements and shafts connected thereto, and a latch operated thereby, a hollow bracket on the turret and into which the latch is designed to project, and a spring for holding the latch in engagement with the bracket.

114. A machine for simultaneously building a plurality of tires including a unit-support, a series of operating units disposed in spaced relation thereon and constituting operating stations, a core-conveyor traveling in relation to said unit stations, the respective units being each mounted on the support independent of and relatively stationary to one of said units constituting a fabric-supplying structure comprising a pair of spaced standards, chuck-sustaining members sustained by said standards, means for operating said members to engage or disengage them with a core-chuck positioned in relation thereto by the conveyor, and means for effecting a rotation of one of said members to revolve the core-chuck sustained by the members, a turret rotatably mounted on one of the standards, and stock-holding and tension-devices carried by the turret and adapted to superpose a ply of fabric upon the core during its rotative movement.

115. A machine for simultaneously building a plurality of tires including a unit-support, a series of operating units disposed in spaced relation thereon and constituting operating stations, a core-conveyor traveling in relation to said unit stations, the respective units being each mounted on the support independent of and relatively stationary to one of said units constituting a fabric-supplying structure comprising a pair of spaced standards, chuck-sustaining members sustained by said standards, means for operating said members to engage or disengage them with a core-chuck positioned in relation thereto by the conveyor, means for effecting rotation of one of said members to revolve the core-chuck sustained by the members, a turret rotatably mounted on one of the standards, stock-holding and tension devices carried by the turret and adapted to superpose a ply of fabric upon the core during its rotative movement, and means for controlling the operation of the chuck-rotating mechanism to effect a simultaneously drawing of the fabric from the stock-supplying structure and a stretching of the fabric along its medial line as it is superposed upon the core while rotating.

116. A machine for simultaneously building a plurality of tires including a unit-support, a series of operating units disposed in spaced relation on the support, a core-conveyor for transporting a series of core-chucks and cores from unit to unit, means for controlling the conveyor to bring portions thereof to rest opposite the units; and a core-supporting device associated with each unit and to which a core is temporarily transferred from the conveyor while at that unit; said units comprising fabric-supplying structures including standards, chuck-sustaining spindles journaled in the standards, a fabric-sustaining turret on the standard for each unit, and means for actuating the chuck-sustaining spindles of a plurality of the units simultaneously, whereby plies of fabric may be simultaneously superposed upon a plurality of cores.

117. A machine for simultaneously building a plurality of tires including a unit-support, a series of operating units disposed in spaced relation on the support, a core-conveyor for transporting a series of core-chucks and cores from unit to unit, means for controlling the conveyor to bring portions thereof to rest opposite the units; and a core-supporting device associated with each unit and to which a core is temporarily transferred from the conveyor while at that unit; said units comprising fabric-supplying structures including a pair of standards disposed at opposite sides of the path of the conveyor, chuck-sustaining spindles journaled in the standards, a fabric-sustaining turret on the standard for each unit, and means for actuating the chuck-sustaining spindles of a plurality of the units simultaneously, whereby plies of fabric may be simultaneously superposed upon a plurality of cores.

118. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising standards upstanding from the unit-support, chuck-engaging and rotating spindles journaled in the standards, and means for effecting rotation of one of the spindles and thereby of the chuck and core which it sustains; and a core-supporting device associated with each unit and to which a core is temporarily transferred from the conveyor while at that unit.

119. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core; and a core-supporting device associated with each unit and to which a core is temporarily transferred from the conveyor while at that unit.

120. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting-casting disposed between the pair of standards, a shaft formed with an offset crank-portion and a magnetic-clutch for controlling the operation of the shaft.

121. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting-casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, and primary driving-mechanism for operating the same.

122. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting-casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, and primary driving-mechanism for operating the same; and a core-supporting device associated with each unit and to which a core is temporarily transferred from the conveyor while at that unit.

123. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting-casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, primary driving-mechanism for operating the same, and an oil-switch mounted on the casting and operating to stop the shaft and crank after a complete revolution thereof.

124. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores; a core-supporting device mounted independent of and relatively stationary to the conveyor, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting-casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, primary driving-mechanism for operating the same, and an oil-switch mounted on the casting and operating to stop the shaft and crank after a complete revolution thereof.

125. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores; a core-supporting device mounted independent of and relatively stationary to the conveyor, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, primary driving-mechanism for operating the same, and an oil-switch mounted on the casting and operating to stop the shaft and crank after a complete revolution thereof, said switch being operated by means comprising a cam keyed to the shaft and provided with a notched-out portion which is in constant engagement with a main actuating-arm of the switch.

126. A machine for simultaneously building a plurality of tires including a unit-support; a core-transporting conveyor traveling over the support and operable to effect a positioning of a series of cores and core-chucks simultaneously; a series of units mounted on the support and constituting rest-stations in reference to which the conveyor positions the chucks and their cores, one of the units including stitching-mechanism for forming fabric about the core that has been superposed thereon; said stitching mechanism comprising a pair of standards upstanding from the unit-support, chuck-engaging and rotating spindles journaled in the standards, means for effecting rotation of one of the spindles and thereby of the chuck and core which it sustains, and stitching-devices having a movement in relation to the core and involving a supporting casting disposed between the pair of standards, a shaft formed with an offset crank-portion, a magnetic-clutch for controlling the operation of the shaft, a gear on the shaft, a pinion meshing with the gear, an axle-shaft on which the pinion is keyed, a sprocket-wheel carried by the shaft, primary driving-mechanism for operating the same, and an oil-switch mounted on the casting and operating to stop the shaft and crank after a complete revolution thereof, said switch being operated by means comprising a cam keyed to the shaft and provided with a notched-out portion which is in constant engagement with a main actuating-arm of the switch.

127. A machine for simultaneously building a plurality of tires including a unit-support, a core-conveyor operable to transport a plurality of core chucks and cores from one operating position to another, and a series of units arranged on the support and in parallelism with the path of travel of the conveyor, one of the units comprising a fabric-stitching structure which includes standards, means sustained thereby for supporting and rotating each chuck and its core, a casting mounted between the standards, stitcher-arms on the casting, means active on the arms for maintaining the same resiliently against the surface of the core, and a motor also active on each arm and having a normal tendency to swing the same on its pivot.

128. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a fabric stitching structure which includes standards upstanding from the unit support, means sustained thereby for supporting and rotating each chuck and its core, a casting mounted between the standards, a pair of stitcher-arms pivoted on the casting, means active on the arms for maintaining the same resiliently against the surface of the core, and a motor in the form of a weight also active on each arm and having a normal tendency to swing the same on its pivot.

129. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a fabric-stitching structure which includes standards upstanding from the unit support, means sustained thereby for supporting and rotating each chuck and its core, a casting mounted between the standards, a pair of stitcher-arms pivoted on the casting, fluid-pressure means active on the arms for maintaining the same resiliently against the surface of the core, and a motor also active on each arm and having a normal tendency to swing the same on its pivot.

130. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a fabric-stitching structure which includes standards upstanding from the unit support, means sustained thereby for supporting and rotating each chuck and its core, a casting mounted between the standards, a pair of stitcher-arms pivoted on the casting, fluid-pressure means active on the arms for maintaining the same resiliently against the surface of the core, and a motor in the form of a weight also active on each arm and having a normal tendency to swing the same on its pivot.

131. A machine for simultaneously building a plurality of tires including a unit-support, a core-conveyor operable to transport a plurality of core chucks and cores from one operating position to another, and a series of units arranged on the support and in parallelism with the path of travel of the conveyor, one of the units comprising a fabric-stitching structure which includes standards upstanding from the unit support, means sustained thereby for supporting and rotating each chuck and its core, a casting mounted between the standards, a pair of stitcher-arms pivoted on the casting, means active on the arms for maintaining the same resiliently against the surface of the core, a motor also active on each arm and having a normal tendency to swing the same on its pivot, and means actuatable at the will of the operator for releasing said stitcher-arms to permit a spreading movement thereof away from the core.

132. A machine for simultaneously building a plurality of tires including a unit-support, a core-conveyor operable to transport a plurality of core chucks and cores from one operating position to another, and a series of units arranged on the support and in parallelism with the path of travel of the conveyor, one of the units comprising a fabric-stitching structure which includes standards, means sustained thereby for supporting and rotating each chuck and its core, a casting mounted between the standards, stitcher-arms on the casting, means active on the arms for maintaining the same resiliently against the surface of the core, a motor also active on each arm and having a normal tendency to swing the same on its pivot, and means actuatable at the will of the operator for releasing said stitcher-arms to permit a spreading movement thereof away from the core.

133. A machine for simultaneously building a plurality of tires including a unit-support, a core-conveyor operable to transport a plurality of core chucks and cores from one operating position to another, and a series of units arranged on the support and in parallelism with the path of travel of the conveyor, one of the units comprising a fabric-stitching structure which includes standards upstanding from the unit support, means sustained thereby for supporting and rotating each chuck and its core, a casting mounted between the standards, a pair of stitcher-arms pivoted on the casting, fluid-pressure means active on the arms for maintaining the same resiliently against the surface of the core, a motor also active on each arm and having a normal tendency to swing the same on its pivot, and means actuatable at the will of the operator for releasing said stitcher-arms to permit a spreading movement thereof away from the core.

134. A machine for simultaneously building a plurality of tires including a unit-support, a core-conveyor operable to transport a plurality of core chucks and cores from one operating position to another, and a series of units arranged on the support and in parallelism with the path of travel of the conveyor, one of the units comprising a fabric-stitching structure which includes standards upstanding from the unit support, means sustained thereby for supporting and rotating each chuck and its core, a casting mounted between the standards, a pair of stitcher-arms pivoted on the casting, fluid-pressure means active on the arms for maintaining the same resiliently against the surface of the core, a motor in the form of a weight also active on each arm and having a normal tendency to swing the same on its pivot, and means actuatable at the will of the operator for releasing said stitcher-arms to permit a spreading movement thereof away from the core.

135. A machine for simultaneously building a plurality of tires including a unit-support, a core-conveyor operable to transport a plurality of core chucks and cores from one operating position to another, and a series of units arranged on the support and in parallelism with the path of travel of the conveyor, a core-supporting device associated with each unit and mounted independently of and relatively stationary with respect to the conveyor, one of the units comprising a fabric-stitching structure which includes standards upstanding from the unit-support, a casting mounted between the standards, a pair of stitcher-arms on the casting, fluid-pressure means active on the arms for maintaining the same resiliently against the surface of the core, a motor in the form of a weight also active on each arm and having a normal tendency to swing the same on its pivot, means actuatable at the will of the operator for releasing said stitcher-arms to permit a spreading movement thereof away from the core, and stitcher-disks rotatably mounted at the ends of the arms and having radial movement to contact with the fabric-covered core.

136. A machine for simultaneously building a plurality of tires including a unit-support, a core-conveyor operable to transport a plurality of core chucks and cores from one operating position to another, and a series of units arranged on the support and in parallelism with the path of travel of the conveyor, a core-supporting device associated with each unit and mounted independently of and relatively stationary with respect to the conveyor, one of the units comprising a fabric-stitching structure which includes standards upstanding from the unit-support, means sustained thereby for supporting and rotating each chuck and its core, a casting mounted between the standards, a pair of stitcher-arms pivoted on the casting, fluid-pressure means active on the arms for maintaining the same resiliently against the surface of the core, a motor also active on each arm and having a normal tendency to swing the same on its pivot, means actuatable at the will of the operator for releasing said stitcher-arm to permit a spreading movement thereof away from the core, and stitcher-disks rotatably mounted at the ends of the arms and having radial movement to contact with the fabric-covered core.

137. A machine for simultaneously building a plurality of tires including a unit-support, a core-conveyor operable to transport a plurality of core chucks and cores from one operating position to another, and a series of units arranged on the support and in parallelism with the path of travel of the conveyor, a core-supporting device associated with each unit and mounted independently of and relatively stationary with respect to the conveyor, one of the units comprising a fabric-stitching structure which includes standards upstanding from the unit-support, means sustained thereby for supporting and rotating each chuck and its core, a casting mounted between the standards, a pair of stitcher-arms pivoted on the casting fluid-pressure means active on the arms for maintaining the same resiliently against the surface of the core, a motor in the form of a weight also active on each arm and having a normal tendency to swing the same on its pivot, means actuatable at the will of the operator for releasing said stitcher-arms to permit a spreading movement thereof away from the core, and stitcher-disks rotatably mounted at the ends of the arms and having radial movement to contact with the fabric-covered core.

138. A machine for simultaneously building a plurality of tires including a unit-support, a core-conveyor operable to transport a plurality of core-chucks and cores from one operating position to another, and a series of units arranged on the support and in parallelism with the path of travel of the conveyor; one of the units comprising a fabric-stitching structure which includes standards upstanding from the unit support, means sustained thereby independent of and relatively stationary with respect to the core-conveyor for supporting and rotating each chuck and its core, and an underbead stitcher-mechanism operable in relation to the core.

139. A machine for simultaneously building a plurality of tires including a unit-support, a core-conveyor operable to transport a plurality of core-chucks and cores from one operating position to another, and a series of units arranged on the support and in parallelism with the path of travel of the conveyor; one of the units comprising a fabric-stitching structure which includes standards upstanding from the unit support, means sustained thereby for supporting and rotating each chuck and its core, an underbead stitcher-mechanism operable in relation to the core and comprising a stitcher-carrying head, and means for actuating the same vertically.

140. A machine for simultaneously building a plurality of tires including a unit-support, a core-conveyor operable to transport, a plurality of core-chucks and cores from one operating position to another, and a series of units arranged on the support and in parallelism with the path of travel of the conveyor; one of the units comprising a fabric-stitching structure which includes standards upstanding from the unit support, means sustained thereby for supporting and rotating each chuck and its core, and an underbead stitcher-mechanism operable in relation to the core and comprising a stitcher-carrying head, means for actuating the same vertically including guides formed on the standards, a link connected to the head, a crank connected to the link, a shaft on which the crank is formed, and means for rotating said shaft and thereby effect actuation of the head.

141. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, a pair of plate-members mounted on the head, fluid-pressure cylinders sustained by the plate-members, a piston working in each cylinder, a stitcher-carrying arm pivoted on the head and to which the piston is connected, and a stitcher-disk carried by the arm.

142. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, members mounted on the head, fluid-pressure cylinders sustained by the members, a piston working in each cylinder, a stitcher-carrying arm pivoted on the head and to which the piston is connected, a stitcher-disk carried by the arm, and means for actuating the arms into inoperative positions.

143. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, a pair of plate-members mounted on the head, fluid-pressure cylinders sustained by the plate-members, a piston working in each cylinder, a stitcher-carrying arm pivoted on the head and to which the piston is connected, a stitcher-disk carried by the arm, and means for actuating the arms into inoperative positions including a motor connected to the arms.

144. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, a pair of cylinder-sustaining members mounted on the head, fluid-pressure cylinders sustained by the members, a piston working in each cylinder, a stitcher-carrying arm pivoted on the head and to which the piston is connected, a stitcher-disk carried by the arm, an arm-actuating weight, and a connecting-element between the weight and the arm.

145. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, a pair of cylinder-sustaining members mounted on the head, fluid-pressure cylinders sustained by the members, a piston working in each cylinder, a stitcher-carrying arm pivoted on the head and to which the piston is connected, a stitcher-disk carried by the arm, and a motor connected to the arms and comprising a weight and a connecting-element between the weight and the arm, each of said motors operating also to move the piston in the cylinder to return it to normal position.

146. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, cylinder-sustaining members mounted on the head, fluid-pressure cylinders sustained by the members, pistons working in each cylinder, a stitcher-carrying arm pivoted on the head and to which the piston is connected, a stitcher-disk carried by the arm, means for actuating the arms into inoperative positions including a motor connected to the arms, each of said motors operating also to move the piston in the cylinder to return it to normal position, and means for regulating the inward movement of the arms under the influence of said pressure-fluid devices.

147. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, a pair of cylinder-sustaining members mounted on the head, fluid-pressure cylinders sustained by the members, pistons working in each cylinder, a stitcher-carrying arm pivoted on the head and to which the piston is connected, a stitcher-disk carried by the arm, means for actuating the arms into inoperative positions including a motor connected to the arms and comprising a weight and a connecting element between the weight and the arm, each of said motors operating also to move the piston in the cylinder to return it to normal position, and means for regulating the inward movement of the arms under the influence of said pressure-fluid devices including adjusting-devices interposed between the head and the arms and in the direct line of movement thereof.

148. A machine for simultaneously building a plurality of tires including a unit-support, a core-conveyor operable to transport a plurality of core-chucks and cores from one operating position to another, a series of units arranged on the support and in parallelism with the path of travel of the conveyor, a core-supporting device associated with a unit and to which a core is temporarily transferred from the conveyor for action by the unit, one of the units comprising a fabric-stitching structure, a standard, a stitcher-carrying head sustained by the standard, means for actuating the head in relation to the core, stitcher-carrying members sustained by the head and also movable in relation to the core, and pressure-fluid operated mechanism for actuating the members in respect to the core.

149. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, means for actuating the head in relation to the core, and stitcher-carrying members sustained by the head and also movable in relation to the core.

150. A machine for simultaneously building a plurality of tires including a unit-support, a core-conveyor operable to transport a plurality of core-chucks and cores from one operating position to another, a series of units arranged on the support and in parallelism with the path of travel of the conveyor, a core-supporting device associated with a unit and to which a core is temporarily transferred from the conveyor for action by the unit, one of the units comprising a fabric-stitching structure including means for supporting and rotating each chuck and its core, a standard for sustaining the chuck-supporting and rotating means, a stitcher-carrying head sustained by the standard, means for actuating the head in relation to the core, stitcher-carrying members sustained by the head and also movable in relation to the core, and pressure-fluid operated mechanism for actuating the members in respect to the core.

151. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure, a standard, a stitcher-carrying head sustained by the standard, means for actuating the same in relation to the core, stitcher-carrying members sustained by the head and also movable in relation to the core, pressure-fluid operated mechanism for actuating the members in respect to the core, and a motor connected with each member for returning it to inoperative position.

152. A machine for simultaneously building a plurality of tires including a unit-support, a core-conveyor operable to transport a plurality of core-chucks and cores from one operating position to another, a series of units arranged on the support and in parallelism with the path of travel of the conveyor, a core-supporting device associated with a unit and to which a core is temporarily transferred from the conveyor for action by the unit, one of the units comprising a fabric-stitching structure including means for supporting and rotating each chuck and its core, a standard for sustaining the chuck-supporting and rotating means, a stitcher-carrying head sustained by the standard, means for actuating the same in relation to the core, stitcher-carrying members sustained by the head and also movable in relation to the core, pressure-fluid operated mechanism for actuating the members in respect to the core, and a motor connected with each member for returning it to inoperative position.

153. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, means for actuating the same in relation to the core, stitcher-carrying arms sustained by the head and also movable in relation to the core, pressure-fluid operated mechanism for actuating the arms in respect to the core, and a motor connected with each arm for returning it to inoperative position and comprising a weight and a connection between the weight and the arms.

154. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, means for actuating the same in relation to the core, stitcher-carrying arms sustained by the head and also movable in realtion to the core, pressure-fluid operated mechanism for actuating the arms in respect to the core, a motor connected with each arm for returning it to inoperative position comprising a weight and a connection between the weight and the arms, and means for controlling the flow of pressure-fluid comprising cylinders mounted on the head, a source of fluid-supply connected to the cylinders, and valve-mechanism associated therewith.

155. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a fabric-stitching structure including means for supporting and rotating each chuck and its core, a standard for sustaining the chuck-supporting and rotating means, a stitcher-carrying head sustained by the standard, stitcher-carrying arms pivoted on the head, and pressure-fluid actuating mechanism constituting mechanism for controlling the stitcher-carrying arms.

156. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including standards upstanding from the unit-support, a turret rotatably mounted on one of the standards, a fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head (stitcher-carrying arms mounted on the head, fluid-pressure operated means for actuating the arms in one direction, and a weight-motor for moving the arms in the opposite direction and into inoperative positions.

157. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operating on the fabric on the core including a stitcher-sustaining head, stitcher-carrying arms mounted on the head, fluid-pressure operated means for actuating the arms in one direction, and a weight-motor for moving the arms in the opposite direction and into inoperative positions.

158. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard, means sustained by the standard for supporting and rotating each chuck and its core, means operative for effecting a stitching-operation on the fabric on the core including stitcher-carrying arms, fluid-pressure operated means for actuating the arms in one direction, and a weight-motor for moving the arms in the opposite direction and into inoperative positions.

159. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard, means sustained by the standard for supporting and rotating each chuck and its core, means operative for effecting a stitching-operation on the fabric on the core including a stitcher-sustaining head, stitcher-carrying arms mounted on the head, fluid-pressure operated means for actuating the arms in one direction, and a weight-motor for moving the arms in the opposite direction and into inoperative positions.

160. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, and a weight-motor for moving the arms in the opposite direction and into inoperative positions.

161. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying-unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction and into inoperative positions, and a second fabric-supplying unit arranged in spaced relation from the stitching mechanism and operating to superpose a second ply of fabric onto the core after the latter has been transported from a position of rest opposite the stitching-mechanism to a position of rest opposite the second fabric-supplying unit.

162. A machine for simultaneously building a plurality of tires including a unit-support, a core-conveyor operable to transport a plurality of core-chucks and cores from one operating position to another, and a series of units arranged on the support, one of the units comprising a fabric-supplying structure including standards, a turret rotatably mounted on one of the standards, a fabric-supply sustained on and movable with the turret, means for rotating each chuck and its core to draw fabric from one or another of the plurality of sources of supply, means operating during the rotation of the core to tension the fabric as it passes from the supply source and is superposed on the core; in operative combination with a stitching-mechanism for forming the fabric on the core after being superposed thereon by the fabric-supplying unit, said stitching-mechanism including a standard, means sustained by the standard for supporting and rotating each chuck and its core, means operative during the rotation of the core for effecting a stitching-operation on the fabric on the core including stitcher-carrying arms mounted on the head, fluid-pressure operated means for actuating the arms in one direction, a weight-motor for moving the arms in the opposite direction and into inoperative position, and a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means.

163. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction and into inoperative position, and a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means.

164. A machine of simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction and into inoperative positions, a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, and a second stitching-mechanism arranged in spaced relation from the second fabric-supplying unit and operable to stitch down upon the core fabric supplied thereto from the second fabric-supplying unit.

165. A machine for simultaneously building a plurality of tires including a core-conveyor operable to transport a plurality of core-chucks and cores from one operating position to another, and a series of units arranged in substantial parallelism with the path of travel of the conveyor, a core-supporting device associated with a unit and to which a core is temporarily transferred from the conveyor for action by the unit, one of the units comprising a fabric-supplying structure, a turret, a fabric-supply sustained on and movable with the turret, means for supporting and rotating each chuck and its core to draw fabric from the sources of supply, means operating during the rotation of the core to tension the fabric as it passes from the supply-source and is superposed on the core; in operative combination with stitching-mechanism for forming the fabric on the core after being superposed thereon by the fabric-supplying unit, said stitching-mechanism including means for supporting and rotating each chuck and its core, means operative during the rotation of the core for effecting a stitching-operation on the fabric on the core including stitcher-carrying arms mounted on the head, means for actuating the arms in one direction, a motor for moving the arms in the opposite direction and into operative positions, a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, and a second stitching-mechanism operable to stitch down upon the core fabric supplied thereto from the second fabric-supplying unit, such second stitching action occurring after the core and its chuck have been transported from a position of rest opposite the second fabric-supplying unit to a position of rest opposite the second fabric-stitching unit.

166. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction, a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, and a second stitching-mechanism arranged in spaced relation from the second fabric-supplying unit and operable to stitch down upon the core fabric supplied thereto from the second fabric-supplying unit, such second stitching action occurring after the core and its chuck have been transported from a position of rest opposite the second fabric-supplying unit to a position of rest opposite the second fabric-stitching unit.

167. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit support and at opposite sides of the path of travel of the conveyor, a turret rotatably mounted on one of the standards, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with stitching mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction, a second fabric-supplying unit arranged in spaced relation from the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, a second stitching-mechanism arranged in spaced relation from the second fabric-supplying unit and operable to stitch down upon the core fabric supplied thereto from the second fabric-supplying unit, such second stitching action occurring after the core and its chuck have been transported from a position of rest opposite the second fabric-supplying unit to a position of rest opposite the second fabric-stitching unit, and a bead-setting unit associated with the second stitching-mechanism and active to apply bead-elements to the fabric-covered core in succession to the stitching operation.

168. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit-support and at opposite sides of the path of travel of the conveyor, a turret rotatably mounted on the standard, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction, a second fabric-supplying unit arranged in spaced relation from the stitching-mechanism and operating to superpose a second ply of fabric onto the core after the latter has been transported from a position of rest opposite the stitching-mechanism to a position of rest opposite the second-fabric-supplying unit, said second fabric-supplying unit including means for supporting and rotating the chuck and core and means for supplying fabric to the core while the latter is rotating under the action of the last-mentioned means, a second stitching-mechanism arranged in spaced relation from the second fabric-supplying unit and operable to stitch down upon the core fabric supplied thereto from the second fabric-supplying unit, such second stitching-action occurring after the core and its chuck have been transported from a position of rest opposite the second fabric-supplying unit to a position of rest opposite the second fabric-stitching unit, and a bead-setting unit arranged in spaced relation from one of the fabric-stitching units and operable, after the core and its chuck have been transported from a position of rest opposite the stitching-unit to a position of rest opposite the bead-setting unit, automatically to apply to the fabric-covered core a plurality of bead-elements.

169. A machine for simultaneously building a plurality of tires including a core-conveyor operable to transport a plurality of core-chucks and cores from one operating position to another, and a series of units arranged in substantial parallelism with the path of travel of the conveyor, one of the units comprising a fabric-supplying structure, a turret, a fabric-supply sustained on and movable with the turret, means for supporting and rotating each chuck and its core to draw fabric from sources of supply, means operating during the rotation of the core to tension the fabric as it passes from the supply-source and is superposed on the core; in operative combination with a stitching-mechanism for forming the fabric on the core after being superposed thereon by the fabric-supplying unit, means for supporting and rotating each chuck and its core, means operative during the rotation of the core for effecting a stitching-operation on the fabric on the core, a second fabric-supplying unit arranged in spaced relation to the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, a second stitching-mechanism arranged in spaced relation to the second fabric-supplying unit and operable to stitch down upon the core fabric supplied thereto from the second fabric-supplying unit, such second stitching action occurring after the core and its chuck have been transported from a position of rest opposite the second fabric-supplying unit to a position of rest opposite the second fabric-stitching unit, a bead-setting unit arranged in spaced relation from one of the fabric-stitching units and operable, after the core and its chuck have been transported from a position of rest opposite the stitching unit to a position of rest opposite the bead-setting unit, automatically to apply to the fabric-covered core a plurality of beads, and a set of fabric-supplying and stitching units arranged in spaced relation to the bead-setting unit and operable, first to superpose a ply of fabric upon the core and, then, to stitch the same down upon the overlying ply of fabric and over and around the beads previously applied thereto.

170. A machine for simultaneously building a plurality of tires including a unit-support, a core-conveyor operable to transport a plurality of core-chucks and cores from one operating position to another, and a series of units arranged on the support and in substantial parallelism with the path of travel of the conveyor, one of the units comprising a fabric-supplying structure including a pair of standards upstanding from the unit support and at opposite sides of the path of travel of the conveyor, a turret rotatably mounted on the standard, a plurality of sources of fabric-supply sustained on and movable with the turret, means sustained by the standards for supporting and rotating each chuck and its core to draw fabric from one or another of the plurality of sources of supply, means operating during the rotation of the core to tension the fabric as it passes from the supply-source and is superposed on the core; in operative combination with a stitching-mechanism for forming the fabric on the core after being superposed thereon by the fabric-supplying unit, said stitching-mechanism including a standard upstanding from the unit-support, means sustained by the standard for supporting and rotating each chuck and its core, means operative during the rotation of the core for effecting a stitching-operation on the fabric on the core including a stitcher-sustaining head, stitcher-carrying arms mounted on the head, fluid-pressure operated means for actuating the arms in one direction, a weight-motor for moving the arms in the opposite direction, a second fabric-supplying unit arranged in spaced relation to the stitching-mechanism and operating to superpose a second ply of fabric onto the core after the latter has been transported from a position of rest opposite the stitching-mechanism to a position of rest opposite the second fabric-supplying unit, said second fabric-supplying unit including means for supporting and rotating the chuck and core and means for supplying fabric to the core while the latter is rotating under the action of the last-mentioned means, a second stitching-mechanism arranged in spaced relation to the second fabric-supplying unit and operable to stitch down upon the core fabric supplied thereto from the second fabric-supplying unit, such second stitching action occurring after the core and its chuck have been transported from a position of rest opposite the second fabric-supplying unit to a position of rest opposite the second fabric-stitching unit, a bead-setting unit arranged in spaced relation from one of the fabric-stitching units and operable, after the core and its chuck have been transported from a position of rest opposite the stitching unit to a position of rest opposite the bead-setting unit, automatically to apply to the fabric-covered core a plurality of beads, and a set of fabric-supplying and stitching units arranged in spaced relation to the bead-setting unit and operable, first to superpose a ply of fabric upon the core and, then, to stitch the same down upon the overlying ply of fabric and over and around the beads previously applied thereto.

171. A machine for simultaneously building a plurality of tires including a traveling conveyor for simultaneously transporting a plurality of core-chucks and cores from one operating position to another, means at each operating position for mounting the cores independently of the conveyor, and a series of units arranged in parallelism with the path of travel of the conveyor, one of the units comprising a bead-applying unit, means for supporting each chuck and core, and bead-supporting and positioning mechanism operable in relation to the core at the will of the operator.

172. A machine for simultaneously building a plurality of tires including a traveling conveyor for simultaneously transporting a plurality of core-chucks and cores from one operating position to another, and a series of units arranged in parallelism with the path of travel of the conveyor, one of the units comprising a bead-supplying unit including standards, means sustained by the standards for supporting each chuck and core, and bead-supporting and positioning mechanism operable in relation to the core at the will of the operator.

173. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards upstanding from the unit-support, means sustained by the standards for supporting each chuck and core, and bead-supporting and positioning mechanism operable in relation to the core at the will of the operator.

174. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards upstanding from the unit-support, bead-supporting and positioning mechanism operable in relation to the core at the will of the operator comprising chuck-engaging members, and an operating means for throwing the members into and out of engagement with each chuck.

175. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards, means sustained by the standards for supporting each chuck and core, bead-supporting and positioning mechanism operable in relation to the core at the will of the operator comprising sliding chuck-engaging members, and a lever-operating means for throwing the sliding members into and out of engagement with each chuck.

176. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards upstanding from the unit-support, means sustained by the standards for supporting each chuck and core, bead-supporting and positioning mechanism operable in relation to the core at the will of the operator and comprising sliding chuck-engaging members, operating means for throwing the sliding members into and out of engagement with each chuck and comprising standards, slides sustained thereby, members surrounding the slides, and means for rotating said members.

177. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards upstanding from the unit-support, means sustained by the standards for supporting each chuck and core, bead-supporting and positioning mechanism operable in relation to the core at the will of the operator and comprising sliding chuck-engaging members, a lever-operating means for throwing the sliding members into and out of engagement with each chuck and comprising standards upstanding from the unit-support, slides sustained thereby, cylindrically-shaped members surrounding the slides, and means for rotating said members.

178. A machine for simultaneously building a plurality of tires including a unit-support, a traveling conveyor for simultaneously transporting a plurality of core-chucks and cores from one operating position to another, and a series of units arranged on the support and in parallelism with the path of travel of the conveyor, one of the units comprising a bead-applying unit including standards upstanding from the unit-support, means sustained by the standards for supporting each chuck and core, bead-supporting and positioning mechanism operable in relation to the core at the will of the operator and comprising sliding chuck-engaging members, and a lever-operating means for throwing the sliding members into and out of engagement with each chuck and comprising standards upstanding from the unit-support, slides sustained thereby, cylindrically-shaped members surrounding the slides, and means for rotating said members comprising a sprocket-and-chain structure.

179. A machine for simultaneously building a plurality of tires including a unit-support, a core-conveyor operable to transport a plurality of core-chucks and cores from one operating position to another, a series of units arranged on the support and in parallelism with the path of travel of the conveyor, one of the units comprising a bead-applying structure, and core-transferring means associated with the bead-applying unit and adapted to transfer a core and its chuck from the core-conveyor to a position at rest opposite the bead-applying unit.

180. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, and bead-carrying and applying mechanism sustained by the standards and movable in relation to the core.

181. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, and bead-carrying and applying mechanism sustained by the standards and movable in relation to the core, such means comprising a plurality of oppositely-moving heads, and means for effecting a sliding movement thereof.

182. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely-moving heads, and means for effecting a sliding movement thereof comprising arms connected to the heads, a shaft associated with the arms, and cranks carried by the shaft to impart a reciprocating motion to the heads.

183. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely-moving heads, means for effecting a sliding movement thereof comprising arms connected to the heads, a shaft associated with the arms, cranks carried by the shaft to impart a reciprocating motion to the head, and shock-absorbing means associated with the arms to relieve compression-strain upon the fabric on the core while the beads are being applied thereto.

184. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely-moving heads, means for effecting a sliding movement thereof comprising arms connected to the heads, a shaft associated with the arms, cranks carried by the shaft to impart a reciprocating motion to the head, shock-absorbing means associated with the arms to relieve compression strain upon the fabric on the core while the beads are being applied thereto, and power-operated means for actuating said arms comprising a sprocket-wheel on the shaft, a sprocket-wheel associated therewith, a sprocket-chain between the sprocket-wheels, gearing for rotating the shaft, worm-reduction gearing to provide a lower source of rotative power for the shaft and whereby the inward and outward movement of the bead-positioning head is effected, and means for actuating the gearing.

185. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely-moving heads, means for effecting a sliding movement thereof, comprising arms connected to the heads, a shaft associated with the arms, cranks carried by the shaft to impart a reciprocating motion to the head, shock-absorbing means associated with the arms to relieve compression-strain upon the fabric on the core while the beads are being applied thereto, power-operated means for actuating said arms comprising a sprocket-wheel on the shaft, a sprocket-wheel associated therewith, a sprocket-chain between the sprocket-wheels, gearing for rotating the shaft, worm-reduction gearing to provide a lower source of rotative power for the shaft and whereby the inward and outward movement of the bead-positioning head is effected, means for actuating the gearing, and means for controlling the shaft-drive comprising a solenoid clutch and brake.

186. A machine for simultaneously building a plurality of tires including a unit support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely-moving heads, means for effecting a sliding movement thereof comprising arms connected to the heads, a shaft associated with the arms, cranks carried by the shaft to impart a reciprocating motion to the head, shock-absorbing means associated with the arms to relieve compression-strain upon the fabric on the core while the beads are being applied thereto, power-operated means for actuating said arms, comprising a sprocket-wheel on the shaft, a sprocket-wheel associated therewith, a sprocket-chain between the sprocket-wheels, gearing for rotating the shaft, worm-reduction gearing to provide a lower source of rotative power for the shaft and whereby the inward and outward movement of the bead-positioning head is effected, means for actuating the gearing, means for controlling the shaft-drive comprising a solenoid clutch and brake, and driving-mechanism common to the several units and operatively connected to the bead applying mechanism.

187. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes standards upstanding from the unit-support, means sustained by the standards for supporting each core and its chuck, bead-carrying and applying mechanism sustained by the standards and movable in relation to the core, such means comprising a plurality of oppositely moving heads, means for effecting a sliding movement thereof comprising arms connected to the heads, a shaft associated with the arms, cranks carried by the shaft to impart a reciprocating motion to the head, shock-absorbing means associated with the arms to relieve compression-strain upon the fabric on the core while the beads are being applied thereto, and power-operated means for actuating said arms comprising a sprocket-wheel on the shaft, a sprocket-wheel associated therewith, a sprocket-chain between the sprocket-wheels, gearing for rotating the shaft, worm-reduction gearing to provide a lower source of rotative power for the shaft and whereby the inward and outward movement of the bead-positioning head is effected, means for actuating the gearing, and means for controlling the operation thereof, such means including a cam, a roller contacting therewith, an arm on which the roller is mounted, an electrical switch connected with the arm, and a solenoid clutch and brake mechanism associated with the switch.

188. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes spindles for supporting a chuck and its core, means for actuating the spindles, and chuck-transferring mechanism associated with the bead-applying unit.

189. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes sliding spindles for supporting a chuck and its core, lever-operated means for actuating the spindles, and chuck-transferring mechanism associated with the bead-applying unit.

190. A machine for simultaneously building a plurality of tires including a core-conveyor operable to transport a plurality of core-chucks and cores from one operating position to another, and a series of units arranged in parallelism with the path of travel of the conveyor, one of the units comprising a bead-applying structure which includes spindles for supporting a chuck and its core, means for actuating the spindles, chuck-transferring mechanism associated with the bead-applying unit, and a connection between such transferring mechanism and the spindle-actuating means whereby said transferring mechanism may be actuated at the will of the operator.

191. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes spindle-supporting standards upstanding from the unit-support, core-supporting spindles slidably mounted in the standards, and a lever-operated means for actuating said spindles including a bell-crank, a shaft mounted in one of the standards and on which the bell-crank is secured, a toggle connected to the bell-crank, and a hand-lever attached to the toggle, whereby the toggle and the core-supporting spindles may be actuated at the will of the operator.

192. A machine for simultaneously building a plurality of tires including a unit-support, a core-conveyor operable to transport a plurality of core-chucks and cores from one operating position to another, and a series of units arranged on the support and in parallelism with the path of travel of the conveyor, one of the units comprising a bead-applying structure which includes spindle-supporting standards upstanding from the unit-support, core-supporting spindles slidably mounted in the standards, and lever-operated means for actuating said spindles including a bell-crank, a shaft mounted in the standard and on which the bell-crank is secured, a toggle connected to the bell-crank, a hand-lever attached to the toggle, whereby the toggle and the core-supporting spindles may be actuated at the will of the operator, a worm wheel carried by said shaft, a worm-gear meshing with the worm-wheel, and an arm connected to the shaft.

193. A machine for simultaneously building a plurality of tires including a unit-support, a conveyor for simultaneously transporting a plurality of core-chucks and cores from one operating position to another on the support, a series of fabric-supplying and stitching units arranged in spaced relation on the support and in substantial parallelism with the path of travel of the conveyor, a bead-applying unit interposed between two of the aforementioned units, and a core-transferring structure associated with the bead-applying unit and comprising a pair of associated standards and arms pivoted thereon and normally movable into a transferring position in relation to the conveyor.

194. A machine for simultaneously building a plurality of tires including a unit-support, a conveyor for simultaneously transporting a plurality of core-chucks and cores from one operating position to another on the support, a series of fabric-supplying and stitching units arranged in spaced relation on the support and in substantial parallelism with the path of travel of the conveyor, a bead-applying unit interposed between two of the aforementioned units, and a core-transferring structure associated with the bead-applying unit and comprising a pair of associated standards, and arms pivoted thereon and normally movable into a transferring position in relation to the conveyor, said arms carrying weights at one end for normally maintaining the same in vertical position.

195. A machine for simultaneously building a plurality of tires including a unit-support, a core-transporting conveyor comprising a plurality of traveling components, and a chuck-transferring structure interposed between two of the components for transferring a chuck from one component to the other.

196. A machine for simultaneously building a plurality of tires including a unit-support, a core-transporting conveyor comprising a plurality of traveling components, and a chuck-transferring structure interposed between two of the components for transferring a chuck from one component to the other, said structure including pivoted arms adapted to swing into transferring position in relation to the conveyor-components.

197. A machine for simultaneously building a plurality of tires including a unit-support, a core-transporting conveyor comprising a plurality of traveling components, a chuck-transferring structure interposed between two of the components for transferring a chuck from one component to the other, said structure including pivoted arms adapted to swing into transferring position in relation to the conveyor-components, and core-supporting spindles associated with a bead-applying structure and arranged in the path of movement of the swinging arms.

198. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, and a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit.

199. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the head-setting unit and whereby a ply of fabric is superposed upon the fabric-covered core and, thus, over the beads applied thereto by the bead-setting unit, and means associated with the fabric-supplying unit for supporting and rotating the core-chuck and core while it rests thereat.

200. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, means associated with the fabric-supplying unit for supporting and rotating the core-chuck and core while it rests thereat, fabric-stretching mechanism associated with the fabric supplying unit whereby, during rotation of the core, a ply of fabric is stretched along a medial line while being withdrawn from said fabric-supplying unit; and an over-bead stitcher-unit associated with and operating successively to the last-mentioned fabric-supplying unit.

201. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and over-bead stitching mechanism associated with the last-mentioned fabric-supplying unit for forming the ply of fabric superposed thereby upon the core and whereby said ply is stitched both to and around the beads.

202. A machine for simultaneously building a plurality of tires including a traveling conveyor for simultaneously transporting a plurality of core-chucks and cores from one operating position to another, fabric-supplying and stitcher units associated with the conveyor-components, a transfer-structure, a bead-setting unit associated with the transfer-structure, a fabric-supplying unit operatively associated with the conveyor-component and constituting a station or position of rest for each core-chuck and core after operation thereon by bead-setting unit and whereby a ply of fabric is superposed upon the fabric-covered core and, thus, over the beads applied thereto by the bead-setting unit, and an underbead and overbead stitcher unit operatively associated with the second conveyor component and operable, first to stitch the fabric on the core down to each of the beads applied thereto by the bead-setting unit and, then, to stitch the fabric over the beads.

203. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and an underbead and overbead stitcher unit operatively associated with the second conveyor-component and in spaced relation from the last-mentioned fabric-supplying unit and operable, first to stitch the fabric on the core down to each of the beads applied thereto by the bead-setting unit, and, then, to stitch the fabric over the beads.

204. A machine for simultaneously building a plurality of tires including a traveling conveyor for simultaneously transporting a plurality of core-chucks and cores from one operating position to another, fabric-supplying and sticher units associated with the conveyor, a transfer structure, a bead-setting unit associated with the transfer-structure, a fabric-supplying unit operatively associated with the conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and a double stitching unit operatively associated with the conveyor and the last-mentioned fabric-supplying unit, one component of the double stitching unit performing an underbead stitching operation to stitch the fabric down to the beads positioned thereon by the bead-setting structure, and the other stitching component performing an overbead stitching operation to stitch the fabric over the beads, these stitching components operating successively.

205. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and a double stitching unit operatively associated with the conveyor and spaced from the last-mentioned fabric-supplying unit, one component of the double stitching unit performing an underbead stitching operation to stitch the fabric down to the beads positioned thereon by the bead-setting structure, and the other stitching component performing an overbead stitching operation to stitch the fabric over the beads.

206. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, means associated with the respective units for temporarily mounting the cores independently of the conveyor, a transfer-structure between two of the conveyor-components, a bead-setting unit associated with the transfer-structure, a fabric-supplying unit operatively associated with the second conveyor component and constituting a station or position of rest for each core-chuck and core after operation thereon by the bead-setting unit and whereby a ply of fabric is superposed upon the fabric-covered core and, thus, over the beads applied thereto by the bead-setting unit, a double stitching unit operatively associated with the conveyor and spaced from the last mentioned fabric-supplying unit, one component of the double stitching unit performing an underbead stitching operation to stitch the fabric down to the beads positioned thereon by the bead-setting structure, the other stitching component performing an overbead stitching operation to stitch the fabric over the beads, and means associated with the double stitching unit for supporting and successively rotating the core-chuck and its core during the underbead and overbead stitching operations.

207. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and a stitcher unit comprising two stitching components whereby two distinct stitching operations are performed, one an underbead stitching operation down to the beads applied to the core by the bead-setting unit and the other operating, when the underbead operation is complete, to stitch the fabric over the beads.

208. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, means associated with the respective units for temporarily mounting the cores independently of the conveyor, a transfer-structure between two of the conveyor-components, a head-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, a stitcher unit comprising two stitching components whereby two distinct stitching operations are performed, one an underbead stitching operation down to the beads set onto the core by the bead-setting unit and the other operating, when the underbead operation is complete, to stitch the fabric over the beads, and core-supporting and rotating means associated with the stitcher unit and operating to rotate the chuck and its core during the afore-mentioned stitching operations.

209. A machine for simultaneously building a plurality of tires including a traveling conveyor comprising a plurality of components for simultaneously transporting a plurality of core-chucks and cores from one operating position to another, fabric-supplying and stitcher units associated with one of said conveyor-components, a transfer-structure, a bead-setting unit associated with the transfer-structure, a fabric-supplying unit operatively associated with the second-conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and and underbead and overbead stitcher unit associated with the core-conveyor and including standards arranged at opposite sides of the path of travel of the conveyor, uprights upstanding from the standards, means between the uprights for supporting and rotating a chuck and its core, a stitcher-support extending between the uprights, stitcher-supporting slides movable on the support, pitmen connected to the slides and to an eccentric disk, stitcher-arms on the slides, and stitcher-disks carried by the arms.

210. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a bead-setting unit, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and an overbead and underbead stitcher unit arranged in spaced relation from the last-mentioned fabric-supplying unit and associated with the core-conveyor and including uprights, means between the uprights for supporting and rotating a chuck and its core, a stitcher-support extending between the uprights, stitcher-supporting slides movable on the support, stitcher-arms on the slides, stitcher-disks carried by the arms, and weight-motors active on the slides to retract them.

211. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and an underbead and overbead stitcher unit arranged in spaced relation from the last-mentioned fabric-supplying unit and associated with the core-conveyor and including standards arranged at opposite sides of the path of travel of the conveyor, uprights upstanding from the standards, means between the uprights for supporting and rotating a chuck and its core, a stitcher-support extending between the uprights, stitcher-supporting slides movable on the support, pitmen connected to the slides and to an eccentric disk, stitcher-arms on the slides, stitcher-disks carried by the arms, and weight-motors active on the slides to retract them.

212. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor-components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, and an underbead and overbead stitcher unit arranged in spaced relation from the last mentioned fabric-supplying unit and associated with the core-conveyor and including standards arranged at opposite sides of the path of travel of the conveyor, uprights upstanding from the standards, means between the uprights for supporting and rotating a chuck and its core, a stitcher-support extending between the uprights, stitcher-supporting slides movable on the support, pitmen connected to the slides and to an eccentric disk, stitcher-arms on the slides, stitcher-disks carried by the arms, weight-motors active on the slides to retract them, and pressure-operated means active on the stitcher arms for maintaining them resiliently in engagement with the fabric-covered core.

213. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor components, a transfer-structure between two of the conveyor-components, a bead-setting unit associated with the transfer-structure, a fabric-supplying unit operatively associated with the second conveyor-component and constituting a station or position of rest for each core-shuck and core after operation thereon by the bead-setting unit and whereby a ply of fabric is superposed upon the fabric-covered core and, thus, over the beads applied thereto by the bead-setting unit, and an underbead and overbead stitcher unit arranged in spaced relation from the last-mentioned fabric-supplying unit and associated with the core-conveyor and including standards arranged at opposite sides of the path of travel of the conveyor, uprights upstanding from the standards, means between the uprights for supporting and rotating a chuck and its core, a stitcher-support extending between the uprights, stitcher-supporting slides movable on the support, pitmen connected to the slides and to an eccentric disk, stitcher-arms on the slides, stitcher-disks carried by the arms, weight-motors active on the slides to retract them, pressure-operated means active on the stitcher-arms for maintaining them resiliently in engagement with the fabric covered core, and means for automatically controlling the flow of pressure-fluid to said means.

214. A machine for simultaneously building a plurality of tires including a unit-support, a traveling conveyor for simultaneously transporting a plurality of core-chucks and cores from one operating position to another and including a plurality of components, fabric-supplying and stitcher units associated with one of the conveyor components, a transfer-structure between two of the conveyor-components, a bead-setting unit associated with the transfer-structure, a fabric-supplying unit operatively associated with the second conveyor-component and constituting a station or position of rest for each core-chuck and core after operation thereon by the bead-setting unit and whereby a ply of fabric is superposed upon the fabric-covered core and, thus, over the beads applied thereto by the bead-setting unit, an underbead and overbead stitching unit operatively associated with the core-conveyor and comprising sandards mounted on the unit-support at opposite sides to the path of travel of the conveyor, means sustained by the standards for supporting and rotating a core and its chuck when positioned opposite this unit, an underbead stitching mechanism disposed in a plane below that of the axis of the core-supporting and rotating-means and comprising a support between the standards, a sliding head on the support and movable in respect to the axis of the core, means for actuating the head to position it in respect to the core, stitcher-arms pivoted on the head, a weight-motor connected to each stitcher-arm and having a normal tendency to swing the arm on its pivot in one direction, and fluid-pressure means active on the stitcher arms to move them in the opposite direction; in combination with an overbead stitching mechanism comprising uprights upstanding from the standards, a support extending between the uprights, slides movable on the support, pitmen connected to the slides, an eccentric member connected to the pitmen and operating to actuate the slides, weight-motors operative on the slides to move them in one direction, stitcher arms pivoted on the slides, and fluid-pressure means active on the arms to move them in relation to the core.

215. A machine for simultaneously building a plurality of tires including a core-supporting and rotating structure, a plurality of stitcher mechanisms operative successively upon the core, one to perform an underbead stitching operation, and the other an overbead stitching operation; the underbead stitching mechanism including a support, a stitcher-head slidable thereon, means for effecting movement of the head in respect to the core, stitcher-arms pivoted on the head, weight-motors having a normal tendency to swing the arms on their pivots in one direction, and fluid-pressure means active on the arms to swing them on their pivots in the opposite direction; the overbead stitching mechanism comprising a support, a pair of slides sustained thereby, means for effecting a sliding movement of the slides on their support including pitmen connected to the slides, an eccentric for actuating the pitmen, means for rotating the eccentric, stitcher-arms on the slides, fluid-pressure means active on the stitcher-arms, and weight-motors active on the slides to move them in one direction.

216. A machine for simultaneously building a plurality of tires including a core supporting and rotating structure, a plurality of stitcher mechanisms operative successively upon the core, one to perform an underbead stitching operation, and the other an overbead stitching operation; the underbead stitching mechanism including a support, a stitcher-head slidable thereon, means for effecting movement of the head in respect to the core, stitcher-arms pivoted on the head, weight-motors having a normal tendency to swing the arms on their pivots in one direction, and fluid-pressure means active on the arms to swing them on their pivots in the opposite direction; the overbead stitching mechanism comprising a support, a pair of slides sustained thereby, means for effecting a sliding movement of the slides on their support including pitmen connected to the slides, an eccentric for actuating the pitmen, means for rotating the eccentric, stitcher-arms on the slides, fluid-pressure means active on the stitcher-arms, weight-motors active on the slides to move them in one direction, and means for throwing the overbead stitching mechanism into operation in succession to the operation of the underbead stitching mechanism.

217. A machine for simultaneously building a plurality of tires including a core-supporting and rotating structure, a plurality of stitcher mechanisms operative successively upon the core, one to perform an underbead stitching operation, and the other an overbead stitching operation; and means for automatically throwing the overbead stitching mechanism into operation in succession to the operation of the underbead stitching mechanism.

218. A machine for simultaneously building a plurality of tires including a core-supporting and rotating structure, a plurality of stitcher-mechanisms operative successively upon the core, one to perform an underbead-stitching operation, and the other an overbead-stitching operation, the underbead-stitching mechanism including a support, a stitcher-head slidable thereon, means for effecting movement of the head in respect to the core, stitcher-arms on the head, motors having a normal tendency to swing the arms on their pivots in one direction, and means active on the arms to swing them on their pivots in the opposite direction; the overbead-stitching mechanism comprising a support, slides sustained thereby, means for effecting a sliding movement of the slides on their support including pitmen connected to the slides, an eccentric for actuating the pitmen, means for rotating the eccentric, stitcher-arms on the slides, means active on the stitcher-arms for actuating them, motors active on the slides to move them in one direction, and means for throwing the overbead stitching mechanism into operation in succession to the operation of the underbead-stitching mechanism.

219. A machine for simultaneously building a plurality of tires including a core-supporting and rotating structure, a plurality of stitcher-mechanisms operative successively upon the core, one to perform an underbead-stitching operation, and the other an overbead-stitching operation; the underbead-stitching mechanism including a support, a stitcher-head slidable thereon, means for effecting movement of the head in respect to the core, stitcher-arms pivoted on the head, weight-motors having a normal tendency to swing the arms on their pivots in one direction, and fluid-pressure means active on the arms to swing them on their pivots in the opposite direction; the overbead-stitching mechanism comprising a support, a pair of slides sustained thereby, means for effecting movement of the slides on their support including an eccentric, means for rotating the eccentric, stitcher-arms on the slides, fluid-pressure means active on the stitcher-arms for actuating them, weight-motors active on the slides to move them in one direction, and means for throwing the overbead-stitching mechanism into operation in succession to the operation of the underbead-stitching mechanism.

220. A machine for simultaneously building a plurality of tires including a core-supporting and rotating structure, a plurality of stitcher-mechanisms operative successively upon the core, one to perform an underbead-stitching operation, and the other an overbead-stitching operation; the underbead-stitching mechanism including a support, a stitcher-head slidable thereon, means for effecting movement of the head in respect to the core, stitcher-arms pivoted on the head, weight-motors having a normal tendency to swing the arms on their pivots in one direction, and fluid-pressure means active on the arms to swing them on their pivots in the opposite direction; the overbead-stitching mechanism comprising a support, a pair of slides sustained thereby, means for effecting a sliding movement of the slides on their support including pitmen connected to the slides, an eccentric for actuating the pitmen, means for rotating the eccentric, stitcher-arms on the slides, fluid-pressure means active on the stitcher-arms for actuating them, weight-motors active on the slides to move them in one direction, and means for throwing the overbead-stitching mechanism into operation in succession to the operation of the underbead-stitching mechanism.

221. A machine for simultaneously building a plurality of tires including a core-supporting and rotating structure, a plurality of stitcher-mechanisms operative successively upon the core, one to perform an underbead-stitching operation and the other an overbead-stitching operation; the underbead-stitching mechanism including a support, a stitcher-head slidable thereon, means for effecting movement of the head in respect to the core, stitcher-arms on the head, means having a normal tendency to swing the arms on their pivots in one direction, and means active on the arms to swing them on their pivots in the opposite direction; the overbead-stitching mechanism comprising a support, slides sustained thereby, means for effecting movement of the slides on their support including pitmen connected to the slides, an eccentric for actuating the pitmen, means for rotating the eccentric, stitcher-arms on the slides, means active on the stitcher-arms for actuating them, means active on the slides to move them in one direction, means for throwing the overbead-stitching mechanism into operation in succession to the operation of the underbead-stitching mechanism, and means active on the slides for moving them in a direction opposite to their movement under the influence of the arm-moving means.

222. A machine for simultaneously building a plurality of tires including a core-supporting and rotating structure, a plurality of stitcher-mechanisms operative successively upon the core, one to perform an underbead-stitching operation and the other an overbead-stitching operation; the underbead-stitching mechanism including a support, a stitcher-head slidable thereon, means for effecting movement of the head in respect to the core, stitcher-arms pivoted on the head, weight-motors having a normal tendency to swing the arms on their pivots in one direction, and fluid-pressure means active on the arms to swing them on their pivots in the opposite direction; the overbead-stitching mechanism comprising a support, a pair of slides sustained thereby, means for effecting a sliding movement of the slides on their support including pitmen connected to the slides, an eccentric for actuating the pitmen, means for rotating the eccentric, stitcher-arms on the slides, fluid-pressure means active on the stitcher-arms for actuating them, weight-motors active on the slides to move them in one direction, means for throwing the overbead-stitching mechanism into operation in succession to the operation of the underbead-stitching mechanism, and pneumatic means active on the slides for moving them in a direction opposite to their movement under the influence of the weight-motors.

223. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, and automatic means for controlling the flow of pressure-fluid to the pressure-means.

224. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure-means, and power-operated means for actuating the eccentric and, thus, the pitmen and slides.

225. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure means, power-operated means for actuating the eccentric and, thus, the pitmen and slides, and a chuck-transporting means associated with the unit.

226. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure means, power-operated means for actuating the eccentric and, thus, the pitmen and slides, a chuck-transporting means associated with the unit, and power-operated means for driving a core positioned by the chuck-transporting means in juxtaposition to the stitching-unit.

227. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure-means, power-operated means for actuating the eccentric and, thus, the pitmen and slides, a chuck-transporting means associated with the unit, a core-supporting device associated with the unit and relatively stationary with respect to the transporting means, and power-operated means for driving a core positioned by the chuck-transporting means adjacent the stitching-unit and while the pressure-means are active.

228. A machine for building tires including a core-chuck supporting structure, means for rotating said structure, stitcher-mechanism associated therewith and including a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, and a quick-return mechanism connected to the slides and adapted to move the same in a direction opposite that when actuated by the pressure-means, and stitcher-devices carried by and movable with the slides.

229. A machine for building tires including a core-chuck supporting structure, means for rotating said structure, stitcher-mechanism associated therewith and including a cross-piece between the standards, slides movable on the cross-piece, an eccentric-member interposed between the slides, pitmen connected to the eccentric-member, a lost-motion connection between the slides and the pitmen, whereby the pitmen are operable to move the slides in one direction, pressure-operated means connected to the slides and operable to move the same independently of the pitmen, a quick-return mechanism connected to the slides and adapted to move the same in the direction opposite that when actuated by the pressure-means, stitcher-devices carried by and movable with the slides, said quick-return mechanism including weight-motors connected to the slides, and pressure-operated means active on the stitcher-devices for actuating the same in relation to a core on the chuck-supporting structure.

230. A machine for building tires including a core-chuck supporting structure, means for rotating said structure, stitcher-mechanism associated therewith and including a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in the direction opposite that when actuated by the pressure-means, stitcher-devices carried by and movable with the slides, said quick-return mechanism including weight-motors connected to the slides, pressure-operated means active on the stitcher-devices for actuating the same in relation to a core on the chuck-supporting structure, a valve for controlling the flow of pressure fluid to the pressure-operated means, and mechanism for controlling the valve including a shaft on which the eccentric is mounted, a cam on the shaft, and a control-rod between the cam and the valve.

231. A machine for building tires including a core-chuck supporting structure, means for rotating said structure, stitcher mechanism associated therewith and including a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite that when actuated by the pressure-means, stitcher-devices carried by and movable with the slides, said quick return mechanism including weight-motors connected to the slides, pressure-operated means active on the stitcher devices for actuating the same in relation to a core carried by the core-chuck, a valve for controlling the flow of pressure-fluid to the pressure-operated means, and mechanism for controlling the valve including a shaft on which the eccentric is mounted, a cam on the shaft, a control-rod between the cam and the valve, and means for rotating said shaft including a sprocket thereon, and a main drive to which the sprocket is connected.

232. A machine for building tires including a core-chuck supporting structure, means for rotating said structure, stitcher mechanism associated therewith and including a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite that when actuated by the pressure-means, stitcher-devices carried by and movable with the slides, said quick-return mechanism including weight-motors connected to the slides, pressure-operated means active on the stitcher-devices for actuating the same in relation to a core on the core-chuck, a valve for controlling the flow of pressure-fluid to the pressure-operated means, mechanism for controlling the valve including a shaft on which the eccentric is mounted, a cam on the shaft, a control-rod between the cam and the valve, means for rotating said shaft including a sprocket thereon, a main drive to which the sprocket is connected, a cam on the shaft, and an electric oil-switch connected to the cam and whereby the drive on the shaft is automatically controlled.

233. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, an automatic means for controlling the flow of pressure-fluid to the pressure-means; in combination with stitcher-mechanism interposed between the standards and including a cross-piece, a head vertically slidable thereon in respect to a core that has been juxtaposed to the unit, stitcher-arms pivoted on the head, weight-motors having a normal tendency to swing the arms on their pivots away from the core, fluid-pressure operated means operable on said arms to move them toward the core, and stitcher-devices carried by and movable with the arms.

234. A machine for building tires including a core-supporting device, a fabric-stitching unit comprising standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure-means, power-operated means for actuating the eccentric and, thus, the pitmen and slides; in combination with a stitcher-mechanism interposed between the standards and including a cross-piece, a head vertically slidable thereon in respect to the core-supporting device, stitcher-arms pivoted on the head, weight-motors having a normal tendency to swing the arms on their pivots away from the core-supporting device, fluid-pressure-operated means operable on said arms to move them toward the device, and stitcher devices carried by and movable with the arms.

235. A machine for building tires including a fabric-stitching unit comprising standards, a cross-piece connecting the standards, a pair of slides movable on the cross-piece, pressure-fluid means active on the slides for moving them in one direction, motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure-means, power-operated means for actuating the eccentric and, thus, the pitmen and slides, a chuck-transporting means associated with the unit, power-operated means for driving a core positionable in respect to the unit; in combination with a stitcher-mechanism interposed between the standards and including a cross piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

236. A machine for building tires including a fabric-stitching unit comprising standards, a cross-piece connecting the standards, a pair of slides movable on the cross-piece, pressure-fluid means active on the slides for moving them in one direction, weight-motors also active on the slides to move them in the opposite direction, pitmen associated with the slides, an eccentric-member disposed between the slides and connected by the pitmen, a lost-motion connection between the pitmen and the slides, stitcher-arms on the slides, pressure-fluid means for actuating the arms in one direction, a source of supply for the pressure-means, automatic means for controlling the flow of pressure-fluid to the pressure-means, power-operated means for actuating the eccentric and, thus, the pitmen and slides, a chuck-transporting means associated with the unit, power-operated means for driving a core positionable by said means in respect to the unit and while the pressure-means are active; in combination with a stitcher-mechanism interposed between the standards and including a cross-piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

237. A machine for building tires including a core-chuck supporting structure, means for rotating said structure, stitcher-mechanism associated therewith and including supporting standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite to that when actuated by the pressure-means, and stitcher-devices carried by and movable with the slides; in combination with a second stitcher-mechanism interposed between the standards and including a cross-piece, a head vertically slidable thereon in respect to a core positionable in respect to the stitcher-mechanism, stitcher-arms pivoted on the head, weight-motors having a normal tendency to swing the arms on their pivots away from the core, fluid-pressure operated means operable on said arms to move them toward the core, and stitcher-devices carried by and movable with the arms.

238. A machine for building tires including a core-chuck supporting structure for sustaining a tire-forming core, means for rotating said structure, stitcher-mechanism associated therewith and including supporting standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite to that when actuated by the pressure-means, and stitcher-devices carried by and movable with the slides, said quick-return mechanism including weight-motors connected to the slides; in combination with a second stitcher-mechanism interposed between the standards and also including a cross-piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

239. A machine for building tires including a core-chuck supporting structure for sustaining a tire-forming core, means for rotating said structure, stitcher-mechanism associated therewith and including supporting standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite to that when actuated by the pressure-means, stitcher-devices carried by and movable with the slides, said quick-return mechanism including motors connected to and operating the slides, pressure-operated means active on the stitcher-devices for actuating the same in relation to the core; in combination with a second stitcher-mechanism interposed between the standards and including a cross-piece, a head vertically slidable thereon in respect to the core, stitcher-arms pivoted on the head, motors having a normal tendency to swing the arms on their pivots away from the core, fluid-pressure operated means operable on said arms to move them toward the core, and stitcher-devices carried by and movable with the arms.

240. A machine for building tires including a core-chuck supporting structure for sustaining a tire-forming core, means for rotating said structure, stitcher-mechanism associated therewith and including supporting standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite to that when actuated by the pressure-means, stitcher-devices carried by and movable with the slides, said quick-return mechanism including weight-motors connected to the slides, pressure-operated means active on the stitcher-devices for actuating the same in relation to the core, a valve for controlling the flow of pressure fluid to the pressure-mechanism, means for controlling the valve including a shaft on which the eccentric is mounted, a cam on the shaft, and a control-rod between the cam and the valve; in combination with a second stitcher-mechanism interposed between the standards and including a cross-piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

241. A machine for building tires including a core-chuck supporting structure for sustaining a tire-forming core, means for rotating said structure, stitcher-mechanism associated therewith and including supporting standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in a direction opposite to that when actuated by the pressure-means, stitcher-devices carried by and movable with the slides, said quick-return mechanism including weight-motors connected to the slides, pressure-operated means active on the stitcher-devices for actuating the same in relation to the core, a valve for controlling the flow of pressure-fluid to the pressure-mechanism, means for controlling the valve including a shaft on which the eccentric is mounted, a cam on the shaft, a control-rod between the cam and the valve, means for rotating said shaft including a sprocket thereon, and a main drive to which the sprocket is connected; in combination with a second stitcher-mechanism interposed between the standards and including a cross-piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

242. A machine for building tires including a core-chuck supporting structure for sustaining a tire-forming core, means for rotating said structure, stitcher-mechanism associated therewith and including supporting-standards, a cross-piece between the standards, slides movable on the cross-piece, an eccentric-member interposed between the slides, pitmen connected to the eccentric-member, a lost-motion connection between the slides and the pitmen whereby the pitmen are operable to move the slides in one direction, pressure-operated means connected to the slides and operable to move the same independently of the pitmen, a quick-return mechanism connected to the slides and adapted to move the same in the direction opposite to that when actuated by the pressure-means, stitcher-devices carried by and movable with the slides, said quick-return mechanism including weight-motors connected to the slides, pressure-operated means active on the stretcher-devices for actuating the same in relation to the core, a valve for controlling the flow of pressure-fluid to the pressure-mechanisms, means for controlling the valve including a shaft on which the eccentric is mounted, a cam on the shaft, a control-rod between the cam and the valve, means for rotating said shaft including a sprocket thereon, a main drive to which the sprocket is connected, a cam on the shaft, an electric oil-switch connected to the cam and whereby the drive of the shaft is automatically controlled; in combination with a second stitcher-mechanism interposed between the standards and including a cross-piece, a head vertically slidable thereon in respect to the core, stitcher-arms pivoted on the head, weight-motors having a normal tendency to swing the arms on their pivots away from the core, fluid-pressure operated means operable on said arms to move them toward the core, and stitcher-devices carried by and movable with the arms.

243. A machine for simultaneously making a plurality of tires including a unit-support, a conveyor for simultaneously transporting a plurality of core-supports and cores from one operating station to another and comprising a plurality of components, a series of fabric-supplying and stitching units operatively associated with one of the conveyor-components, a transfer-structure between two of the conveyor components, a bead-setting unit operatively associated with the transfer structure, a fabric-supplying unit operatively associated with another of the conveyor-components and operable to superpose a ply of fabric onto a core after passing from the bead-setting unit, an underbead and overbead stitching unit arranged in spaced relation to the fabric-supplying unit, another fabric-supplying unit arranged in spaced relation to the underbead and overbead stitching unit and adapted to superpose a ply of fabric onto the core after action thereon by the underbead and overbead stitching units, and an underbead stitching unit arranged in spaced relation to the last-mentioned fabric-supplying unit and operable to form the ply of fabric onto the core which had been superposed thereon by the preceding fabric-supplying unit.

244. A machine for simultaneously making a plurality of tires including a unit-support, a conveyor for simultaneously transporting a plurality of core-supports and cores from one operating station to another and comprising a plurality of components, a series of fabric-supplying and stitching units operatively associated with one of the conveyor-components, a transfer-structure between two of the conveyor-components, a bead-setting unit operatively associated with the transfer-structure, a fabric-supplying unit operatively associated with another of the conveyor-components and operable to superpose a ply of fabric onto a core after passing from the bead-setting unit, an underbead and overbead stitching unit arranged in spaced relation to the fabric-supplying unit, another fabric-supplying unit arranged in spaced relation to the underbead and overbead stitching unit and adapted to superpose a ply of fabric onto a core after passing from the bead-setting unit, an underbead and overbead stitching unit arranged in spaced relation to the fabric-supplying unit, another fabric-supplying unit arranged in spaced relation to the underbead and overbead stitching unit and adapted to superpose a ply of fabric onto the core after action thereon by the underbead and overbead stitching units, an underbead stitching unit arranged in spaced relation to the last-mentioned fabric-supplying unit and operable to form the ply of fabric onto the core which had been superposed thereon by the preceding fabric-supplying unit, and means for supporting and rotating a chuck and core in juxtaposition to the last-mentioned underbead stitching unit.

245. A machine for simultaneously building a plurality of tires including a unit-support, a conveyor for transporting a plurality of core-chucks and cores from one operating station to another, a series of fabric-supplying units mounted on the unit-support, a series of stitching-units operatively associated with the conveyor and disposed in related position to the fabric-supplying units, there being a stitching-unit for each fabric-supplying unit, a bead-setting unit mounted on the unit-support for applying beads to opposite sides of each core, a plurality of fabric-supplying units mounted on the unit-support and operable successively to superpose plies of fabric onto the core, an underbead and overbead stitching unit interposed between the last-mentioned fabric-supplying units, an underbead-stitching unit operatively related to the core-conveyor and operable to stitch a ply of fabric onto the core after the same had been superposed thereon and over the beads, and a combined stitching and trimming unit also operatively related to the core-conveyor and operable, first to complete the stitching-operation on the fabric-covered core and, then, to trim superfluous fabric from the core.

246. A machine for simultaneously building a plurality of tires including a unit-support, a conveyor for transporting a plurality of core-chucks and cores from one operation station to another, a series of fabric-supplying units mounted on the unit-support, a series of stitching-units operatively associated with the conveyor and disposed in related position to the fabric-supplying units, there being a stitching-unit for each fabric-supplying unit, a bead-setting unit mounted on the unit-support for applying beads to opposite sides of each core, a plurality of fabric-supplying units mounted on the unit-support and operable successively to superpose plies of fabric onto the core, an underbead and overbead stitching unit interposed between the last mentioned fabric-supplying units, an underbead stitching unit operatively related to the core-conveyor and operable to stitch a ply of fabric onto the core after the same had been superposed thereon and over the beads, a combined stitching and trimming unit also operatively related to the core-conveyor and operable, first, to complete the stitching operation on the fabric-covered core and, then, to trim superfluous fabric from the core, and means for supporting and rotating the core during the action of the combined stitching and trimming unit.

247. A machine for building tires including a unit-support, a fabric-supplying unit on the support, a core-supporting and rotating structure associated therewith, and a combined stitching and trimming unit arranged in juxtaposition to the fabric-supplying unit and comprising standards, means sustained thereby for supporting and rotating a core-chuck and its core, a stitching-mechanism operatively associated with the core-supporting means and including spaced-apart uprights, a cross-piece between the uprights, slides movable on the cross-piece, an eccentric-member interposed between the slides, pitmen connected to the eccentric-member, a lost-motion connection between each pitmen and one of the slides, a spring associated with the lost-motion connection, means for actuating the eccentric-member, stitcher-arms on the slides, stitcher-devices on the arms, fluid-pressure-operated mechanism for actuating the stitcher-arms, means operated by the eccentric-member for controlling the flow of pressure-fluid to the fluid-pressure-operated mechanism, and a trimming-mechanism operatively associated with the stitching-mechanism and actuatable in succession to the action of said stitching-mechanism and including a cross-piece between the standards, bell-cranks pivoted on the cross-piece, trimming-devices on the bell-cranks, and fluid-pressure-operated means for actuating the bell-cranks to effect an engagement of the trimming-devices with the fabric on the core.

248. A machine for building tires including a unit-support, a fabric-supplying unit on the support, a core-supporting and rotating structure associated therewith, and a combined stitching and trimming unit arranged in juxtaposition to the fabric-supplying unit and comprising standards, means sustained thereby for supporting and rotating a core-chuck and its core, a stitching-mechanism operatively associated with the core-supporting means and including spaced-apart uprights, a cross-piece between the uprights, slides movable on the cross-piece, an eccentric-member interposed between the slides, pitmen connected to the eccentric-member, a lost-motion connection between each pitmen and one of the slides, a spring associated with the lost-motion connection, means for actuating the eccentric-member, stitcher-arms on the slides, stitcher-devices on the arms, fluid-pressure-operated mechanism for actuating the stitcher-arms, means operated by the eccentric-member for controlling the flow of pressure-fluid to the fluid-pressure-operated mechanism, and a trimming-mechanism operatively associated with the stitching-mechanism and actuatable in succession to the action of said stitching-mechanism and including a cross-piece between the standards, bell-cranks pivoted on the cross-piece, trimming-devices on the bell-cranks, fluid-pressure-operated means for actuating the bell-cranks to effect an engagement of the trimming-devices with the fabric on the core, and means actuated by said eccentric-member for controlling the flow of pressure-fluid to said last-mentioned fluid-pressure-operated mechanism.

249. In a machine for building tires, a unit-support, a core-supporting and rotating structure sustained thereby, a combined stitching and trimming unit operatively associated with said structure and comprising a set of stitcher devices simultaneously operable on opposite sides of a core positionable in said unit, a set of trimmer devices also simultaneously operative on opposite sides of a core and disposed relatively remote from the stitcher devices for action on the core successive to that of the stitcher devices, means for effecting automatic action of the stitcher devices, independent means for effecting automatic action of the trimmer devices, and instrumentalities common to said means for controlling their successive action.

250. In a machine for building tires, a unit-support, a core-supporting and rotating structure sustained thereby, a combined stitching and trimming unit operatively associated wtih the core-supporting and rotating structure, means for effecting automatic action of the stitcher-mechanism of the unit, means for effecting automatic action of the trimming-mechanism of the unit; said means for operating the stitching and trimming mechanisms including fluid-pressure-operated means; a source of supply for pressure-fluid, and means for controlling its flow through said mechanisms.

251. In a machine for buiding tires, a unit-support, a core-supporting and rotating structure sustained thereby, a combined stitching and trimming unit operatively associated with the core-supporting and rotating structure, means for effecting automatic action of the stitcher-mechanism of the unit, means for effecting automatic action of the trimming-mechanism of the unit; said means for operating the stitching and trimming mechanisms including fluid-pressure-operated means, and a valve common to the stitching and trimming mechanisms for automatically controlling the flow of pressure-fluid to their actuating mechanisms.

252. A machine for building tires including a chuck-and-core supporting structure, fabric-trimming mechanism associated therewith and operable to trim fabric therefrom, said trimming-mechanism being power-operated to effect its automatic action and including levers, a support common to the levers and to which said levers are pivoted, trimming-devices carried by the levers, cylinders sustained by the support for the levers, pistons working in the cylinders and connected to the levers, and means for supplying pressure-fluid to the cylinders.

253. A machine for building tires including a chuck-and-core supporting and rotating structure, fabric-trimming mechanism associated therewith and operable to trim fabric therefrom while the core is rotating, said trimming-mechanism being power-operated to effect its automatic action and including a pair of bell-crank levers, a support common to the levers and to which said levers are pivoted, trimming-devices carried by the levers, cylinders sustained by the support for the levers, pistons working in the cylinders and connected to the levers, and means for supplying pressure-fluid to the cylinders.

254. A machine for building tires including a chuck-and-core supporting and rotating structure, fabric-trimming mechanism associated therewith and operable to trim fabric therefrom while the core is rotating, said trimming-mechanism being power-operated to effect its automatic action and including a pair of bell-crank levers, a support common to the levers and to which they are pivoted, trimming-devices carried by the levers, cylinders sustained by the support for the levers, pistons working in the cylinders and connected to the levers, means for supplying pressure-fluid to the cylinders, and means for controlling the extent of movement of the levers to vary the depth of cut of the trimming-devices.

255. A machine for building tires including a chuck-and-core supporting structure, fabric-trimming mechanism associated therewith and operable to trim fabric therefrom, said trimming-mechanism being power-operated to effect its automatic action and including levers, a support common to the levers, trimming-devices carried by the levers, cylinders sustained by the support for the levers, pistons working in the cylinders and connected to the levers, means for controlling the extent of movement of the levers to vary the depth of cut of the trimming-devices, and means connected to the levers to effect a movement thereof and a quick release of the trimming-devices from engagement with the core.

256. A machine for building tires including a chuck-and-core supporting and rotating structure, fabric-trimming mechanism associated therewith and operable to trim fabric therefrom while the core is rotating, said trimming-mechanism being power-operated to effect its automatic action and including a pair of bell-crank levers, a support common to the levers and to which they are pivoted, trimming-devices carried by the levers, cylinders sustained by the support for the levers, pistons working in the cylinders and connected to the levers, means for supplying pressure-fluid to the cylinders, means for controlling the extent of movement of the levers to vary the depth of cut of the trimming devices, and weight-motors connected to the levers to effect a movement thereof and a quick release of the trimming-devices from engagement with the core.

257. A machine for building tires including a chuck-and-core supporting and rotating structure, fabric-trimming mechanism associated therewith and operable to trim fabric therefrom while the core carried by the supporting structure is rotating, said trimming-mechanism being power-operated to effect its automatic action and including bell-crank levers, a support common to the levers, trimming-devices carried by the levers, cylinders sustained by the support for the levers, pistons working in the cylinders and connected to the levers, means for supplying pressure-fluid to the cylinders, means for controlling the extent of movement of the levers to vary the depth of cut of the trimming-devices, and motors connected to the levers to effect a movement thereof and a quick release of the trimming devices from engagement with the core, in combination with stitching-mechanism disposed in a plane above the trimming-mechanism and operating on the core while the same is in rotation.

258. A machine for building tires including a chuck-and-core supporting and rotating structure, fabric-trimming mechanism associated therewith and operable to trim fabric therefrom while the core carried by said structure is rotating, said trimming-mechanism being power-operated to effect its automatic action and including a pair of bell-crank levers, a support common to the levers and to which said levers are pivoted, trimming-devices carried by the levers, cylinders sustained by the support for the levers, pistons working in the cylinders and connected to the levers, means for supplying pressure-fluid to the cylinders, means for controlling the extent of movement of the levers to vary the depth of cut of the trimming-devices, and means operating on the levers to effect a movement thereof and a quick release of the trimming-devices from engagement with the core, in combination with stitching-mechanism disposed in a plane above the trimming-mechanism and operating on the core while the same is in rotation, and means for actuating said stitcher-mechanism to cause it to operate on the core in advance of the action thereon of the trimming-mechanism.

259. A machine for building tires including a chuck-and-core supporting and rotating structure, fabric-trimming mechanism associated therewith and operable to trim fabric therefrom while the core carried by the structure is rotating, said trimming-mechanism being power-operated to effect its automatic action and including levers, a support common to the levers, trimming-devices carried by the levers, cylinders sustained by the support, pistons working in the cylinders and connected to the levers, means for supplying pressure-fluid to the cylinders, means for controlling the extent of movement of the levers to vary the depth of cut of the trimming-devices, motors connected to the levers to effect a movement thereof and a quick release of the trimming-devices from engagement with the core, in combination with stitching-mechanism disposed in a plane above the trimming-mechanism and operating on the core while the same is in rotation and in advance of the action thereon of the trimming-mechanism, and means for automatically controlling the relative time of operation of the stitching and trimming mechanisms.

260. A machine for building tires including a chuck-and-core supporting and rotating structure, fabric-trimming mechanism associated therewith and operable to trim fabric therefrom while the core on the structure is rotating, said trimming-mechanism being power-operated to effect its automatic action, said trimming-mechanism including levers, a support common to the levers, trimming-devices carried by the levers, cylinders sustained by the support, pistons working in the cylinders, means for controlling the depth of cut of the trimming-devices, means operating the levers to effect movement thereof and a quick release of the trimming-devices from engagement with the core, in combination with stitching-mechanism disposed in a plane above the trimming-mechanism and operating on the core while the same is in rotation and in advance of the action thereon of the trimming-mechanism, and means for automatically controlling the relative time of operation of the stitching and trimming mechanisms including a controlling-valve, an arm juxtaposed thereto, a valve-operating cam associated with the valve and engageable by the arm, and means for actuating the cam.

261. A machine for building tires including a chuck-and-core supporting and rotating structure, fabric-trimming mechanism associated therewith and operable to trim fabric therefrom while the core thereon is rotating and power-operated to effect its automatic action, said trimming mechanism including levers, a support common to the levers, trimming-devices carried by the levers, cylinders sustained by the support for the levers, pistons working in the cylinders and connected to the levers, means for supplying pressure-fluid to the cylinders, means for controlling the extent of movement of the levers to vary the depth of cut of the trimming-devices, motors connected to the levers to effect a movement thereof and a quick release of the trimming-devices from engagement with the core, in combination with stitching-mechanism disposed in a plane above the trimming-mechanism and operating on the core while the same is in rotation and in advance of the action thereon of the trimming-mechanism, means for automatically controlling the relative time of operation of the stitching and trimming mechanisms including a controlling valve, an arm juxtaposed thereto, a valve-operating cam associated with the valve and engageable by the arm, means for actuating the cam, means for maintaining the arm in engagement with the cam, and a valve-actuating handle.

262. A machine for simultaneously building a plurality of tires including a unit-support, a series of units mounted thereon in spaced relation relatively, the units constituting operating stations, some of said units comprising fabric-supplying structures, other of said units comprising fabric-stitching structures, another of the units comprising a bead-setting structure, and still another of the units comprising a fabric-trimming structure, a conveyor for transporting core-chucks and cores from station to station; and a core-supporting device associated with each of the units for mounting each core temporarily independent of the conveyor.

263. A machine for simultaneously building a plurality of tires including a unit-support, a series of units mounted thereon in spaced relation relatively, the units constituting operating stations, some of said units comprising fabric-supplying structures, other of said units comprising fabric-stitching structures, another of the units comprising a bead-setting structure, and still another of the units comprising a fabric-trimming structure, a conveyor for transporting core-chucks and cores from station to station, means independently and stationarily disposed with respect to the conveyor for supporting and rotating the chucks and cores at each of the stations, and means common to the several units and to the conveyor for driving the same.

264. A machine for simultaneously building a plurality of tires including a unit-support, a series of units mounted thereon in spaced relation relatively, the units constituting operating stations, some of said units comprising fabric-supplying structures, other of said units comprising fabric-stitching structures, another of the units comprising a bead-setting structure, and still another of the units comprising a fabric-trimming structure, a conveyor for transporting core-chucks and cores from station to station, means independently and stationarily disposed with respect to the conveyor for supporting and rotating the chucks and cores at each of the stations, means common to the several units and to the conveyor for driving the same, and means for controlling the operation of the conveyor in respect to the operations performed at each of the stations.

265. A machine for simultaneously building a plurality of tires including a unit-support, a series of units mounted thereon in spaced relation relatively, the units constituting operating stations, some of said units comprising fabric-supplying structures, other of said units comprising fabric-stitching structures, another of the units comprising a bead-setting structure, and still another of the units comprising a fabric-trimming structure, a conveyor for transporting core-chucks and cores from station to station, means independently and stationarily disposed with respect to the conveyor for supporting and rotating the chucks and cores at each of the stations, means common to the several units and to the conveyor for driving the same, means for controlling the operation of the conveyor in respect to the operations performed at each of the stations, and safety-controlling appliances associated with the conveyor and its driving means to prevent movement of the same while any of the several units are active.

266. A machine for simultaneously making a plurality of tires including a unit-support, a plurality of floating core-chucks and tire-forming cores, a plurality of fabric-stitching units on the unit-support, means for mounting the cores in operative association with the units, and means normally stationary relatively to the traveling chucks and cores for controlling the travel of the floating chucks and cores successively to and from the stitching units.

267. In a machine for simultaneously making a plurality of tires including a plurality of floating core-chucks and tire-forming cores, a set of fabric-stitching units disposed along the path of travel of the chucks and cores and operable to form tire-material on each of the cores, relatively stationary means for temporarily mounting the cores in operative association with the units, and means normally stationary relatively to the traveling chucks and cores for positioning each chuck and core successively to the different units.

268. In a machine for simultaneously making a plurality of tires including a plurality of floating core-chucks and tire-forming cores, a set of fabric-stitching units disposed along the path of travel of the chucks and cores and operable to form tire-material on each of the cores, relatively stationary means for temporarily mounting the cores in operative association with the units, means normally stationary relatively to the traveling chucks and cores for positioning each chuck and core successively to the different units, and means for effecting rotation of each chuck and core while juxtaposed to each of the respective units.

269. A machine for simultaneously making a plurality of tires including a plurality of floating core-chucks and tire-forming cores, a plurality of tire-stitching units arranged in substantial parallelism with the travel of the chucks and cores and operable to stitch tire-fabric upon each core, means for effecting a traveling movement of the chucks and cores for successively positioning them opposite each stitching-unit, means for automatically mounting the cores independently of said travel-effecting means, and means disposed independently of and relatively stationary to the traveling cores for effecting rotation of the cores at their positions opposite the units and while said positioning means is at rest.

270. A machine for simultaneously making a plurality of tires including a plurality of floating core-chucks and tire-forming cores, a plurality of sets of fabric-supplying units arranged in the path of travel of the chucks and cores, a plurality of fabric-stitching units operatively associated with the fabric-supplying units, means disposed independently of and relatively stationary to the traveling cores for effecting rotation of each of the cores while in juxtaposition to each of the units, means for effecting a positioning of each of the cores in relation to the units simultaneously and successively, and means for mounting the cores independently of the positioning-means and in operative association with the units.

271. A machine for simultaneously making a plurality of tires including a plurality of floating core-chucks and tire-forming cores, means for effecting a step-by-step travel of the chucks and cores, a plurality of fabric-supplying and stitching units associated with the step-by-step means, means for mounting the chucks of the cores in association with said units and independently of said travel-effecting means, and means disposed independently of and relatively stationary to the traveling cores associated with the units for effecting rotative movement of each of the chucks and cores.

272. A tire-building apparatus including a unit-support, a plurality of core-chucks and tire-forming cores operatively associated therewith, a plurality of fabric-supplying units on the support and disposed in the path of travel of the chucks and cores, means for successively positioning each of the chucks and cores in relation to each of the units, such means comprising mechanism disposed independently of and relatively stationary to the core-positioning means for supporting and transporting the chucks and cores for a step-by-step movement from unit to unit, and means for effecting rotation of the cores when at positions of rest in relation to the units.

273. A tire-forming apparatus including a unit-support, a plurality of fabric-supplying units thereon, a fabric-stitching unit associated with each of the fabric-supplying units, a plurality of core-chucks and tire-forming units positionable in relation to the different units, means for moving a plurality of the chucks and cores in a step-by-step manner from unit to unit, and means disposed independently of the chuck-moving means and mounting each core stationary with respect thereto associated with each unit for supporting the chucks and cores independent of the transporting means.

274. A tire-forming apparatus including a unit-support, a plurality of fabric-supplying units thereon, a fabric-stitching unit associated with each of the fabric-supplying units, a plurality of core-chucks and tire-forming units positionable in relation to the different units, means for moving a plurality of the chucks and cores in a step-by-step manner from unit to unit, means disposed independently of the chuck-moving means and mounting each core stationary with respect thereto associated with each unit for supporting the chucks and cores independent of the transporting means, and means for effecting rotation of the cores while the support is independent of the transporting means.

275. A continuous machine for building tires including in combination a core-transporting conveyor, a series of fabric supplying and stitching units operatively associated with the conveyor and in relation to which units the conveyor is adapted to position a plurality of tire-forming cores, means for controlling the travel of the conveyor to bring the same and, thus, the plurality of cores supported thereon to positions of rest opposite the fabric supplying and stitching units; and means for mounting the cores independently of the conveyor and in operative association with said units; in combination with a finishing structure including a unit for applying side-strips to the core.

276. A continuous machine for building tires including in combination a core-transporting conveyor, a series of fabric supplying and stitching units operatively associated with the conveyor and in relation to which units the conveyor is adapted to position a plurality of tire-forming cores, a bead-applying unit interposed between the associated fabric-supplying and stitching units, means for controlling the travel of the conveyor to bring the same and, thus, the plurality of cores supported thereon to positions of rest opposite the fabric supplying, stitching and bead-applying units; and means for mounting a core free of the travelling action of the conveyor when the core is positioned by the conveyor in relation to one of said units in combination with a finishing structure constituting a component of the machine and including a unit for applying side-strips to the core, and a unit for applying a breaker-strip to the core operatively associated with the core and in relation to which unit the conveyor is adapted to successively position a plurality of tire-forming cores, whereby a tire comprising a plurality of plies of fabric, a pair of oppositely disposed bead-elements, and side-strips may be produced in a single machine and by a series of successive operations and whereby a plurality of complete tires may simultaneously be constructed.

277. A continuous machine for building tires including in combination a core-transporting conveyor, a series of fabric supplying and stitching units operatively associated with the conveyor and in relation to which units the conveyor is adapted to position a plurality of tire-forming cores, a bead-applying unit interposed between the associated fabric supplying and stitching units, means for controlling the travel of the conveyor to bring the same and, thus, the plurality of cores supported thereon to positions of rest opposite the fabric supplying and stitching units; and means for mounting a core free of the travelling action of the conveyor when the core is positioned by the conveyor in relation to one of said units in combination with a finishing structure constituting a component of the machine and including a unit for applying side-strips to the core operatively associated with the core and in relation to which unit the conveyor is adapted to successively position a plurality of tire-forming cores, a unit for applying a breaker-strip to the core, and a unit for applying a tread-element to the core; whereby a tire comprising a plurality of plies of fabric, side-strips, and a tread-element may be produced in a single machine and by a series of successive operations and whereby a plurality of complete tires may simultaneously be constructed.

278. A continuous machine for building tires including in combination a core-transporting conveyor, a series of fabric supplying and stitching units operatively associated with the conveyor and in relation to which units the conveyor is adapted to position a plurality of tire-forming cores, a bead-applying unit interposed between the associated fabric-supplying and stitching units, means for controlling the travel of the conveyor to bring the same and, thus, the plurality of cores supported thereon to positions of rest opposite the fabric supplying, stitching and bead-applying units; and means for mounting a core free of the travelling action of the conveyor when the core is positioned by the conveyor in relation to one of said units in combination with a finishing structure constituting a component of the machine and including a unit for applying side-strips to the core operatively associated with the core and in relation to which unit the conveyor is adapted to successively position a plurality of tire-forming cores, a unit for applying a breaker-strip to the core, and a unit for applying a tread-element to the core; whereby a tire comprising a plurality of plies of fabric, a pair of oppositely disposed bead-elements, side strips, and a tread-element may be produced in a single machine and by a series of successive operations and whereby a plurality of complete tires may simultaneously be constructed.

279. A machine for building a plurality of tires simultaneously including a traveling core-transporting conveyor; a series of fabric-supplying units operatively associated with the conveyor and operable simultaneously to apply a plurality of plies of fabric to a plurality of cores; a series of fabric-stitching units operable to stitch the fabric onto a plurality of fabric-covered cores simultaneously; means for mounting a core for action by a stitching unit in disassociated relation to the conveyor when such core is positioned by the conveyor in operative relation to that unit; a bead-setting unit for applying a pair of bead-elements at opposite sides of each core as an action successive to one of the stitching operations; fabric-supplying and stitching units for supplying and stitching the fabric about the bead-elements then on the fabric-covered core; and a finishing structure constituting a component of the machine disposed in the path of movement of the conveyor for successively applying, to each of a series of the fabric-covered cores, a series of side-strips, breaker-strips, and tread-elements and effect a finishing of the tire.

280. A machine for building a plurality of tires simultaneously including a traveling core-transporting conveyor; a series of fabric-supplying units operatively associated with the conveyor and operable simultaneously to apply a plurality of plies of fabric to a plurality of cores; a series of fabric-stitching units operable to stitch the fabric onto a plurality of fabric-covered cores simultaneously; means for mounting a core for action by a stitching unit in disassociated relation to the conveyor when such core is positioned by the conveyor in operative relation to that unit; a bead-setting unit for applying a pair of bead-elements at opposite sides of each core as an action successive to one of the stitching operations; fabric-supplying and stitching units for supplying and stitching the fabric about the bead-elements then on the fabric-covered core; a trimming-unit operatively associated with the conveyor for trimming surplus fabric from the respective cores as an action successive to the final stitching operation; and a finishing structure constituting a component of the machine disposed in the path of movement of the conveyor operatively associated with the trimming-unit for successively applying, to each of a series of the fabric-covered cores, a series of side-strips, breaker-strips, and tread-elements and effect a finishing of the tire.

281. The herein-described method of simultaneously building a plurality of tires, which consists in setting a series of floating tire-forming cores in traveling motion, then bringing them to rest for predetermined intervals at spaced apart operating stations, then mounting each core independently of the conveyor and, while so mounted, effecting its rotation at its respective station, then while in rotative motion superposing successive plies of fabric thereon and successively stitching each ply after being so superposed, then interrupting the travel of each core and positioning for a bead-setting operation, then applying bead-elements to each fabric-covered core, then superposing an additional ply or additional plies of fabric upon the fabric-covered core and over the bead-elements, and then effecting a stitching of each of said additional plies.

282. The herein-described method of simultaneously building a plurality of tires, which consists in setting a series of floating tire-forming cores in traveling motion, then bringing them to rest for predetermined intervals at spaced apart operating stations, then mounting each core independently of the conveyor and, while so mounted, effecting its rotation at its respective station, then while in rotative motion superposing successive plies of fabric thereon and successively stitching each ply after being so superposed, then interrupting the travel of each core and positioning for a bead-setting operation, then applying bead-elements to each fabric-covered core, then superposing an additional ply or additional plies of fabric upon the fabric-covered core and over the bead-elements, then effecting a stitching thereof, and then trimming superfluous fabric from each fabric-covered core.

283. The method of progressively building a tire by a series of successively related steps consisting of setting a tire-forming core in traveling motion, intermittently bringing it to rest, mounting the core for rotative movement, applying to the core when so mounted in a position of rest a ply of fabric, stitching the applied ply, positioning the several cores successively for a bead-setting operation, applying bead-elements to the fabric-covered core, superposing fabric thereon, and stitching such fabric.

284. The method of progressively building a tire by a series of successively related steps consisting of setting a tire-forming core in traveling motion, then intermittently bringing it to rest at spaced apart points in its travel, mounting said core for rotative movement, then applying to the core while in rotation a ply of fabric and, while applying the same, effecting a stretching of the fabric, then stitching the applied ply, then bringing the several cores successively to a bead-setting position, then applying bead-elements to the fabric-covered core, then superposing an additional stretched ply of fabric onto the core, and then stitching such fabric about the core and over the bead-elements.

285. The method of progressively building a tire by a series of successively related steps consisting of setting a tire-forming core in traveling motion, then intermittently bringing it to rest at spaced apart points in its travel, mounting said core for rotative movement, then applying to the core while in rotation a ply of fabric and, while applying the same, effecting a longitudinal stretching of the fabric, then stitching the applied ply, then bringing the several cores successively to a bead-setting position, then applying bead-elements to the fabric-covered core, then superposing an additional stretched ply of fabric to the core, then stretching such fabric about the core and over the bead-elements, and then trimming superfluous fabric from the fabric-covered core.

286. The method of progressively building a tire by a series of successively related steps consisting of setting a tire-forming core in traveling motion, then intermittently bringing it to rest at spaced apart points in its travel, mounting said core for rotative movement, then applying to the core while in rotation a ply of fabric and, while applying the same, effecting a stretching of the fabric, then stitching the applied ply, then applying bead-elements to the fabric-covered core, then superposing an additional stretched ply of fabric to the core, then stitching such fabric about the core and over the bead-elements, then trimming superfluous fabric from the fabric-covered core, and then applying side strips to the fabric-covered core.

287. The method of progressively building a tire by a series of successively related steps consisting of setting a tire-forming core in traveling motion, then intermittently bringing it to rest at spaced apart points in its travel, mounting said core for rotative movement, then applying to the core while in rotation a ply of fabric and, while applying the same, effecting a stretching of the fabric, then stitching the applied ply, then applying bead-elements to the fabric-covered core, then superposing an additional stretched ply of fabric to the core, then stitching such fabric about the core and over the bead-elements, then trimming superfluous fabric from the fabric-covered core, then applying side-strips to the fabric-covered core, and then applying a breaker-strip thereto.

288. The method of progressively building a tire by a series of successively related steps consisting of setting a tire-forming core in traveling motion, then intermittently bringing it to rest at spaced apart points in its travel, mounting said core for rotative movement, then applying to the core while in rotation a ply of fabric and, while applying the same, effecting a stretching of the fabric, then stitching the applied ply, then applying bead-elements to the fabric-covered core, then superposing an additional stretched ply of fabric to the core, then stitching such fabric about the core and over the bead-elements, then trimming superfluous fabric from the fabric-covered core, then applying side-strips to the fabric-covered core, then applying a breaker-strip thereto, and then applying a tread-element circumferentially of the fabric-covered core.

289. The herein-described continuous method of building tires which consists in setting a tire-forming core in motion for a unit-to-unit travel; then stopping the core at an operating station and there first mounting the core for rotative movement and, then, effecting the application to the core of a ply of fabric and simultaneously stretching the fabric preliminary to such application; then advancing the fabric-covered core to a second station and there effecting its rotation and the stitching of the fabric about the core; then advancing the fabric-covered core to a third station and there effecting the application of a second ply of stretched fabric; then advancing the core to a fourth station and there effecting the stitching of the second ply about the core while the latter is rotating; then advancing the core to another station and there applying bead-elements to the fabric-covered core; and then advancing the bead-carrying core to other stations and there successively applying and stitching fabric about the core and over the bead-elements.

290. The herein-described continuous method of building tires which consists in setting a tire-forming core in motion for a unit-to-unit travel; then stopping the core at an operating station and there first mounting the core for rotative movement and, then, effecting the application to the core of a ply of fabric and simultaneously stretching the fabric preliminary to such application; then advancing the fabric-covered core to a second station and there effecting its rotation and the stitching of the fabric about the core; then advancing the fabric-covered core to a third station and there effecting the application of a second ply of stretched fabric; then advancing the core to a fourth station and there effecting the stitching of the second ply about the core while the latter is rotating; then advancing the core to another station and there applying bead-elements to the fabric-covered core; then advancing the bead-carrying core to other stations and there successively applying and stitching fabric about the core and over the bead-elements; and then effecting a trimming of superfluous fabric therefrom.

291. The herein-described continuous method of building tires which consists in setting a tire-forming core in motion for a unit-to-unit travel; then stopping the core at an operating station and there first mounting the core for rotative movement and, then, effecting the application to the core of a ply of fabric; then advancing the fabric-covered core to a second station and there effecting its rotation and the stitching of the fabric about the core; then advancing the fabric-covered core to a third station and there effecting the application of a second ply of fabric; then advancing the core to a fourth station and there effecting the stitching of the second ply about the core while the latter is rotating; then advancing the core to another station and there applying bead-elements to the fabric-covered core; then advancing the bead-carrying core to other stations and there successively applying and stitching fabric about the core and over the bead-elements; then effecting a trimming of superfluous fabric therefrom; and then advancing the core to still other stations for finishing operations, including the application of side-strips, a breaker-strip, and a tread-element.

292. The herein-described continuous method of building tires which consists in setting a tire-forming core in motion for a unit-to-unit travel; then stopping the core at an operating station and there first mounting the core for rotative movement and, then, effecting the application to the core of a ply of fabric; and simultaneously stretching the fabric preliminary to such application; then advancing the fabric-covered core to a second station and there effecting its rotation and the stitching of the fabric about the core; then advancing the fabric-covered core to a third station and there effecting the application of a second ply of fabric; then advancing the core to a fourth station and there effecting the stitching of the second ply about the core while the latter is rotating; then advancing the core to another station and there applying bead-elements to the fabric-covered core; then advancing the bead-carrying core to other stations and there successively applying and stitching fabric about the core and over the bead-elements; then effecting a trimming of superfluous fabric therefrom; and then advancing the core to still other stations for finishing operations, including the application of side-strips, a breaker-strip, and a tread-element.

293. The herein-described continuous method of building a plurality of tires simultaneously which consists in setting a tire-forming core in motion for a unit-to-unit travel; then stopping the core at an operating station and there first mounting the core for rotative movement and, then, effecting the application to the core of a ply of fabric; then advancing the fabric-covered core to a second station and there effecting its rotation and the stitching of the fabric about the core; then advancing the fabric-covered core to a third station and there effecting the application of a second ply of fabric; then advancing the core to a fourth station and there effecting the stitching of the second ply about the core while the latter is rotating; then advancing the core to another station and there applying bead-elements to the fabric-covered core; then advancing the bead-carrying core to other stations and there successively applying and stitching fabric about the core and over the bead-elements; then effecting a trimming of superfluous fabric therefrom; and then advancing the core to still other stations for finishing operations, including the application of side strips, a breaker strip, and a tread-element.

In witness whereof I have hereunto signed my name.

WILLIAM B. HARSEL.